(12) United States Patent
Voss

(10) Patent No.: US 11,993,338 B2
(45) Date of Patent: May 28, 2024

(54) VEHICLE

(71) Applicant: Darrell W. Voss, Vancouver, WA (US)

(72) Inventor: Darrell W. Voss, Vancouver, WA (US)

(*) Notice: Subject to any disclaimer, the term of this patent is extended or adjusted under 35 U.S.C. 154(b) by 163 days.

(21) Appl. No.: 17/617,954

(22) PCT Filed: Jun. 12, 2020

(86) PCT No.: PCT/EP2020/066413
§ 371 (c)(1),
(2) Date: Dec. 10, 2021

(87) PCT Pub. No.: WO2020/254217
PCT Pub. Date: Dec. 24, 2020

(65) Prior Publication Data
US 2022/0177071 A1 Jun. 9, 2022

Related U.S. Application Data

(60) Provisional application No. 62/862,827, filed on Jun. 18, 2019.

(51) Int. Cl.
*B62J 1/02* (2006.01)
*B62K 25/28* (2006.01)
*B62K 25/30* (2006.01)

(52) U.S. Cl.
CPC .............. *B62K 25/30* (2013.01); *B62J 1/02* (2013.01); *B62K 25/286* (2013.01)

(58) Field of Classification Search
CPC ................................ B62J 1/02; B62K 25/286
See application file for complete search history.

(56) References Cited

U.S. PATENT DOCUMENTS

| | | | |
|---|---|---|---|
| 587,672 A * | 8/1897 | Heyl | B62J 1/02 248/404 |
| 5,226,674 A * | 7/1993 | Buell | B62K 25/286 280/285 |
| 5,354,085 A * | 10/1994 | Gally | B62K 25/286 280/285 |

(Continued)

FOREIGN PATENT DOCUMENTS

| | | | | |
|---|---|---|---|---|
| CN | 107512345 A | * | 12/2017 | B62J 1/02 |
| CN | 108238142 A | * | 7/2018 | B62J 1/02 |

(Continued)

OTHER PUBLICATIONS

Machine translation of JP 4689950.

*Primary Examiner* — Faye M Fleming
(74) *Attorney, Agent, or Firm* — Richard A. Baker, Jr.

(57) ABSTRACT

A vehicle (300), comprising: a frame (310) comprising a head tube (314) and a rear driven axle support (312); a motion control system; and a payload support (320) movably connected to the frame (310) via the motion control system such that the payload support (320) moves non-linearly relative to the frame (310), wherein the payload support (320) comprises a seat support, and in a first operating state of the vehicle (300), the motion control system, in response to a driven acceleration of the frame (310) in a forward direction, imparts a force onto the payload support (320) that accelerates the seat support (320) in the forward direction at an acceleration no less than an acceleration of the rear driven axle support (312) in the forward direction.

12 Claims, 16 Drawing Sheets

(56) References Cited

U.S. PATENT DOCUMENTS

| | | | | |
|---|---|---|---|---|
| 6,834,877 | B2* | 12/2004 | Lesage | ................ B62K 25/286 |
| | | | | 280/284 |
| 7,395,892 | B2* | 7/2008 | Alonzo | ............... B62K 25/286 |
| | | | | 180/227 |
| 9,216,791 | B2* | 12/2015 | Hudec | .................... B62K 25/28 |
| 11,312,445 | B2* | 4/2022 | Zubieta Andueza | .. B62K 25/18 |

FOREIGN PATENT DOCUMENTS

| | | | | |
|---|---|---|---|---|
| DE | 20 2015 102757 U1 | 6/2015 | | |
| EP | 0108327 A2 * | 5/1984 | ............... | B62J 1/02 |
| EP | 3 02 182 A1 | 4/2016 | | |
| GB | 2 450 512 A | 12/2008 | | |
| JP | 4689950 B2 | 6/2011 | | |
| KR | 20060003771 A * | 1/2006 | ............... | B62J 1/02 |
| WO | 2010/079093 A1 | 7/2010 | | |

* cited by examiner

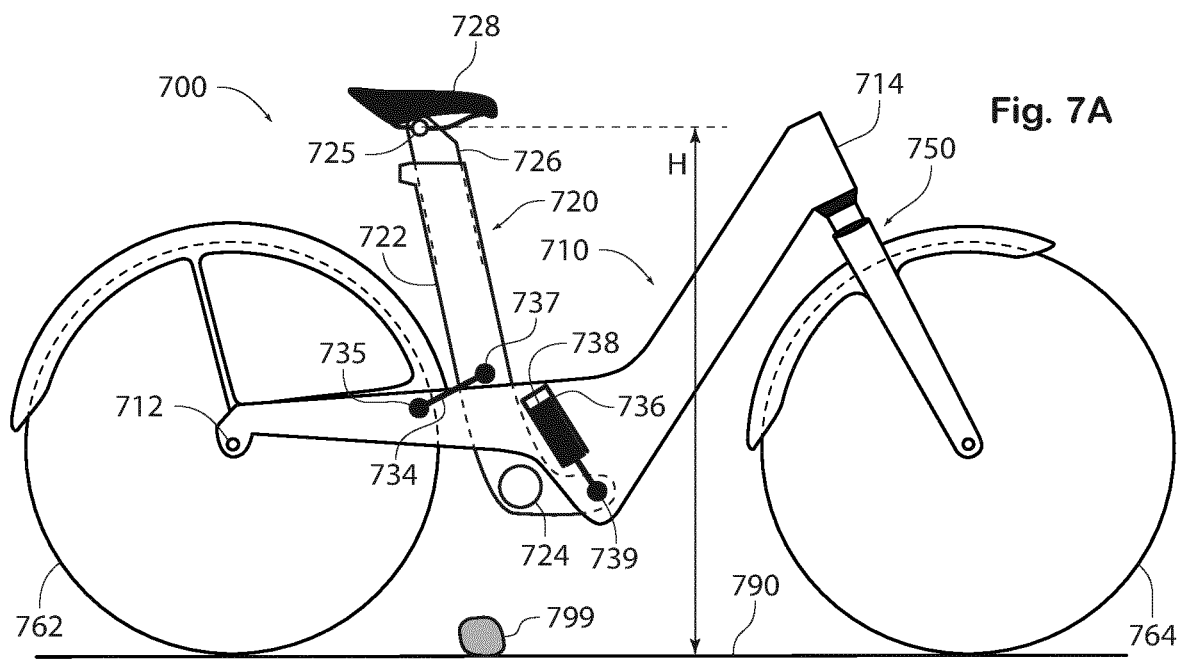
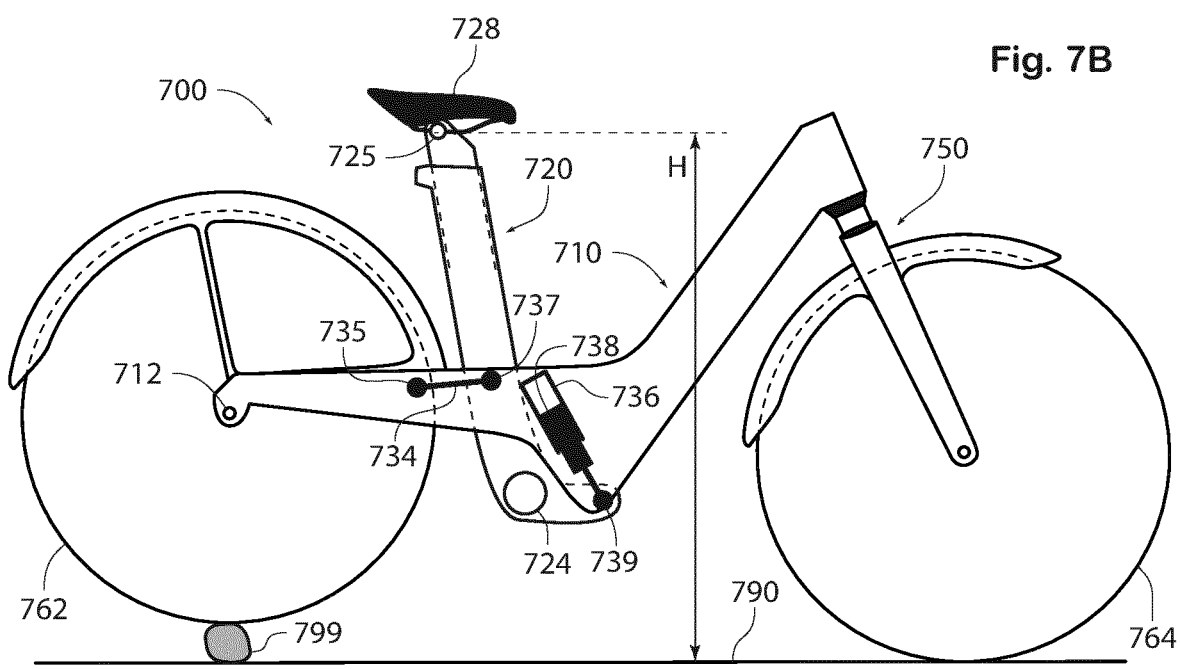

VEHICLE

BACKGROUND OF THE DISCLOSURE

Field of the Disclosure

The present disclosure relates to a vehicle, e.g. to a two-wheeled vehicle such as a bicycle. The present disclosure also relates to a vehicle controller.

Description of the Related Art

A large variety of vehicles and vehicle controllers are known to the prior art. The present disclosure expounds upon this background.

SUMMARY OF THE PRESENT DISCLOSURE

The aim of the present summary is to facilitate understanding of the present disclosure. The summary thus presents concepts and features of the present disclosure in a more simplified form and in looser terms than the detailed description below and should not be taken as limiting other portions of the present disclosure.

Loosely speaking, the present disclosure relates, inter alia, to a bicycle or e-bike comprising a frame that rigidly extends from the head tube to the rear-axle dropouts and a seat column movably attached to the frame in a manner that causes an upper portion of the seat column to accelerate faster than the rear-axle dropouts in response to a driven, forward acceleration of the bicycle.

More specifically, the present disclosure teaches, inter alia, a vehicle, comprising: a frame comprising a head tube and a rear driven axle support; a motion control system; and a payload support movably connected to the frame via the motion control system such that the payload support moves non-linearly relative to the frame, wherein the payload support comprises a seat support, and in a first operating state of the vehicle, the motion control system, in response to a driven acceleration of the frame in a forward direction, imparts a force onto the payload support that accelerates the seat support in the forward direction at an acceleration no less than an acceleration of the rear driven axle support in the forward direction.

Other objects, advantages and embodiments of the present disclosure will become apparent from the detailed description below, especially when considered in conjunction with the accompanying drawings.

BRIEF DESCRIPTION OF THE DRAWINGS

The Figures show:

FIG. 7A a schematic depiction of a fifth exemplary embodiment of a vehicle of the first category in accordance with the present disclosure;

FIG. 7B a schematic depiction of the vehicle of FIG. 7A in another operating state;

DETAILED DESCRIPTION

Figure 1:
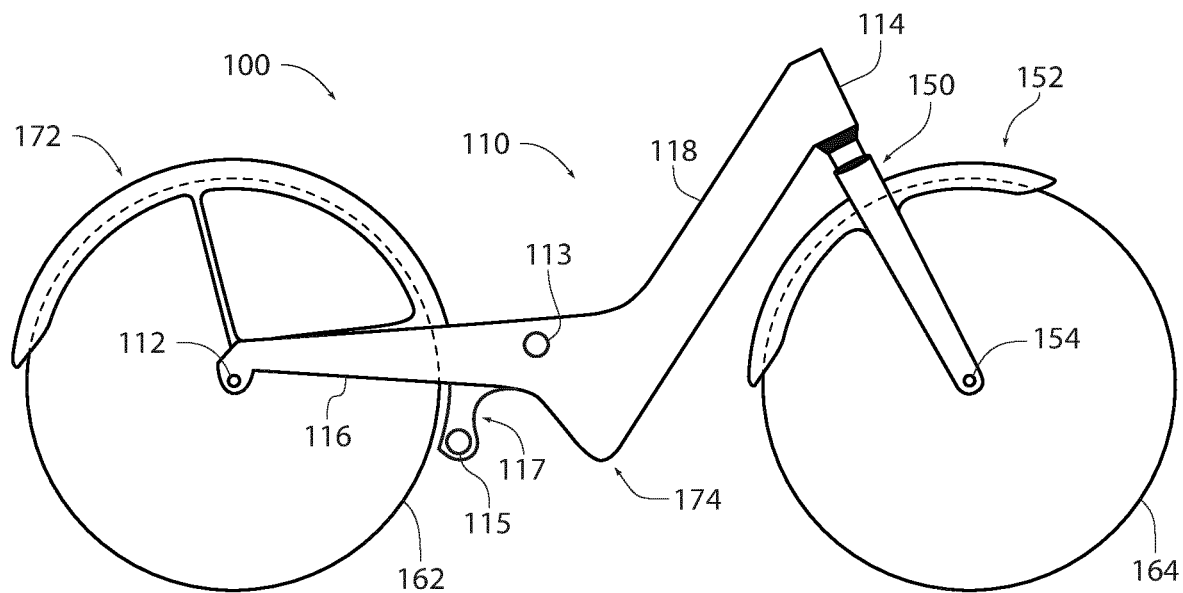
FIG. 1 a schematic depiction of a first exemplary embodiment of a vehicle of the first category in accordance with the present disclosure.

The various embodiments of the present disclosure and of the claimed invention, in terms of both structure and operation, will be best understood from the following detailed description, especially when considered in conjunction with the accompanying drawings.

Before elucidating the embodiments shown in the Figures, the various embodiments of the present disclosure will first be described in general terms.

The present disclosure relates to a vehicle. In the context of the present disclosure, a vehicle may be understood as a system (of interacting elements), which system transfers (at least part of) a gravitational force acting on a payload of a vehicle to at least one (propulsive) element that interacts with an ambient environment of the vehicle, e.g. for the sake of providing a propulsive force and/or for the sake of allowing the vehicle to glide/roll over an ambient surface. The payload may include a driver, a rider and/or a passenger of the vehicle. The payload may include an inanimate payload. The ambient surface may be terrain. Similarly, the ambient surface may be a water surface, e.g. a surface of a body of water. The (propulsive) element may be a terrain-engaging component, e.g. a terrain-engaging component selected from the group consisting of a wheel, a skid, a ski and a (continuous) track. Similarly, the (propulsive) element may be a marine (propulsion) element, e.g. an element selected from the group consisting of a float, a hull, a water ski, a jet nozzle and a propeller. For the sake of conciseness, the term "terrain-engaging component" will be used hereinafter to designate any (propulsive) element as described hereinabove, regardless of whether such element is a marine element. (An elucidation of the term "any" is given in the closing paragraphs of this specification.)

The vehicle may comprise at least one terrain-engaging component as described above. The vehicle may be a vehicle selected from the group consisting of a bicycle, an e-bike, a motorcycle, a moped, a (terrestrial) rover, a snowmobile, a snow scooter and a (personal) watercraft. As such, the vehicle may be a vehicle selected from the group consisting of a human-powered vehicle, a (gasoline and/or electric) motor-powered vehicle and a vehicle powered by both human and (gasoline and/or electric) motor power. Moreover, the vehicle may be a two-wheeled vehicle, e.g. a two-wheeled bike, a two-wheeled e-bike or a two-wheeled motorcycle. Similarly, the vehicle may be a three-wheeled vehicle, e.g. a tricycle, a three-wheeled e-bike or a three-wheeled motorcycle. In the context of the present disclosure, the term "e-bike" may be understood as a bicycle/tricycle comprising an electrically powered motor that contributes a driving force to at least one wheel of the bicycle. As touched upon above, the term "driving force" may be understood in the present disclosure as a propulsive force, e.g. a propulsive force that propels the vehicle relative to the ambient terrain.

As evidenced by the remarks above, the specialized nomenclature typically associated with the various vehicles to which the inventive principles of the present disclosure are applicable impairs both the conciseness and overall readability of the present disclosure. Accordingly, the remainder of this disclosure will, in general, use the nomenclature of a bicycle as a contextual basis for the disclosure. This use of bicycle nomenclature is not intended to exclude other types of vehicles from the scope of that disclosure. Instead, it is trusted that the reader can easily transfer the concepts disclosed herein in the context of a bicycle to other vehicles without inventive skills. Accordingly, the following disclosure will also include occasional references to other types of vehicles to aid the read in understanding how the disclosed teachings may be applied to vehicles other than bicycles.

The vehicle may comprise a frame. As will be elucidated in further detail infra, the frame may comprise a first frame portion and a second frame portion. The first frame portion may be a driving frame portion, e.g. a portion of the frame that supports a terrain-engaging component that propels the vehicle relative to the ambient terrain. Similarly, the second frame portion may be a driven frame portion, e.g. a portion of the frame that is propelled relative to the ambient terrain by (virtue of a mechanical connection to) the driving frame portion. The second frame portion may be movably connected to the first frame portion, e.g. by a motion control system as elucidated in further detail infra. The frame, e.g. the driving frame portion and/or the driven frame portion, may comprise at least one (steel, aluminum and/or carbon fiber) tube and/or at least one (steel, aluminum and/or carbon fiber) beam. As such, at least 80%, at least 90% or (substantially) an entirety of the frame, e.g. the driving/driven frame portion, (by volume and/or by weight) may be a material selected from the group consisting of steel, aluminum and carbon fiber. For example, an entirety of frame, e.g. the driving/driven frame portion, may be of such a material except bushings and/or thread elements, e.g. for interconnecting the driving/driven frame portion with other structures of the vehicle. Such bushings and/or thread elements may demand wear characteristics and/or machining tolerances not achievable with aluminum or carbon fiber.

The teachings of the present disclosure are selectively applicable to two distinct categories of vehicles. Specifically, while the core teachings of the present disclosure are applicable to a first category of vehicles, many of the teachings of the present disclosure are (likewise) applicable to a second category of vehicles. It may be presumed that the teachings of the present disclosure relate to both vehicles of the first category and vehicles of the second category, those teachings of the present disclosure that are applicable only or particularly to one of the first/second category of vehicles being introduced/identified as such.

Vehicles of the first category comprise a frame and a structure movably connected to the frame, the frame comprising a head tube and a (rear) driven axle support, the structure comprising/constituting a payload support. The frame may rigidly connect the head tube and the (rear) driven axle support. The structure may comprise a first axle support, e.g. a driving axle support. As such, vehicles of the first category may be said to comprise (a frame that comprises) a driving frame portion and a driven frame portion, the driven frame portion being movably connected to the driving frame portion, wherein the driving frame portion comprises a head tube and a (rear) driven axle support, and the driven frame portion comprises/constitutes a payload support. For the sake of better readability, the latter nomenclature (driving/driven in lieu of frame/structure) is used more often in the present specification, the former nomenclature being used to emphasize the applicability of certain teachings to vehicles of the first category.

Vehicles of the second category comprise (a frame that comprises) a driving frame portion and a driven frame portion, the driven frame portion being movably connected to the driving frame portion, wherein the driving frame portion comprises a (rear) driven axle support, and the driven frame portion comprises a head tube and a seat support. The driven frame portion may comprise a first axle support, e.g. a driving axle support.

In the context of the present disclosure, the term "driving axle support" may be understood as a support for an axle of a power source, e.g. of a motor and/or a crankset that propels the vehicle. For example, the vehicle may comprise a motor that directly or indirectly—e.g. via a gearbox or a (n internal) gearing—drives an axle, which axle is supported by the driving axle support and to which axle a crankset is affixed. Moreover, the vehicle may comprise a motor that is remote to a rotational axle of a crankset, in which case a support for the axle of the motor and/or of the crankset may be deemed a "driving axle support". Similarly, the term "driving axle support" may be understood as a support for a power source, which power source comprises an axle (that outputs power for propelling the vehicle), e.g. for a motor that propels the vehicle. In the context of the present disclosure, the term "driven axle support" may be understood as a support for an axle, e.g. of a terrain-engaging component, that is driven by a (remote) power source (via a drivetrain). For example, a "driven axle support" may be the rear dropouts of a bicycle that support the axle of a rear wheel and sprockets, which rear wheel and sprockets are driven by a remote, user-powered crankset via a chain. Similarly, a "driven axle support" may be a support for the axle of a (continuous) track, which track is driven by a remote motor via a driveshaft. Similarly, a "driven axle support" may be a support for the axle of a propeller, which propeller is driven by a remote motor via a belt. Furthermore, a driving axle (support) of the vehicle may (simultaneously) be a driven axle (support) of the vehicle. For example, the vehicle may comprise a motor that directly or indirectly—e.g. via a gearbox or a (n internal) gearing— drives an axle of a rear wheel of the vehicle.

For the sake of dispelling possible confusion, it should be noted that the_driven_axle support may be (and typically is) situated on/a constituent element of the_driving_frame portion and that the_driving_axle support may be (and typically is) situated on/a constituent element of the_driven_frame portion.

As touched upon supra, a vehicle (of the first category) may comprise a structure (and a frame). The structure may constitute the driven frame portion of the vehicle. The frame may constitute the driving frame portion of the vehicle. The structure may be distinct from the frame. The structure may have a (generally) tubular shape and/or a (generally) column-like shape. The structure may be termed a "payload support structure", a "seat support column", a "seat column" or a "payload support column". The structure may be movably connected to the frame, e.g. such that the structure moves non-linearly relative to the frame. The structure may comprise at least one component/system selected from the group consisting of an energy management system, a power conversion mechanism, a drive system, a motor and a power supply. Similarly, the structure may comprise at least part of a drivetrain, e.g. a gearbox. The drive system may comprise a motor and, optionally, a power supply. Similarly, the drive system may comprise at least part of a drivetrain. Similarly, the vehicle may comprise an assembly, which assembly comprises the structure and at least one component/system selected from the group consisting of an energy management system, a power conversion mechanism, a drive system, a motor and a power supply. Similarly, the assembly may comprise at least part of a drivetrain. The structure may comprise illumination means, e.g. LED lights. The structure may be a payload support/a payload support structure. The payload support (structure) may be a unitary element. As such, the payload support (structure) may be a single piece of material. The (total) mass of the assembly/structure/payload support (structure) may be at least two/three/four/five times a (total) mass of the frame. The assembly/structure/payload support (structure) may support at least 50%, at least 70%, at least 80% or at least 90% of a mass of the motor. Similarly, the assembly/structure/payload support (structure) may support at least 50%, at least 70%, at least 80% or at least 90% of a mass of the power supply. In other words, at least 50%, at least 70%, at least 80% or at least 90% of a mass of the motor and/or the power supply may be supported via the assembly/structure/payload support (structure). The assembly/structure/payload support (structure) may constitute the driven frame portion of the vehicle.

The payload support (structure) may comprise at least one (payload support) element selected from the group consisting of a pannier, a seat support, a rack, a basket, a cargo carrier, and a pannier support. The (payload support) element may be located in an upper region of the structure, e.g. in an uppermost 50%, an uppermost 40% or an uppermost 30% of the structure. (An outer surface of) the structure/ payload support (structure) may comprise an engagement structure, e.g. a T-slot, for receiving and/or supporting at least a portion of at least one (payload support) element selected from the group consisting of a pannier, a rack, a basket, a cargo carrier, and a pannier support. The assembly/ structure/payload support (structure) may support at least 50%, at least 70%, at least 80% or at least 90% of a mass of at least one (payload support) element selected from the group consisting of a pannier, a seat support, a rack, a basket, a cargo carrier, and a pannier support. As such, the structure/ payload support (structure) may comprise a seat support, e.g. a seat tube and/or a seat post. Moreover, the structure/ payload support (structure) may form a seat tube (of the vehicle). The seat support may be located in an upper region of the structure, e.g. in an uppermost 30%, an uppermost 20% or an uppermost 10% of the structure. The vehicle (of the first category) may comprise a seat/saddle, e.g. for a user selected from the group consisting of a driver, a rider and a passenger of the vehicle. The seat may be mounted on/rigidly connected to the structure. The seat tube may (slidingly) receive the seat post, e.g. such that motion of the seat post is restricted to (substantially) linear motion. The seat post may have an outer circumference that differs from an inner circumference of the seat tube (at any point on said outer circumference) by no more than 2 mm, no more than 1 mm or no more than 0.5 mm. The outer circumference of the seat post and the inner circumference of the seat tube may be shaped so as to inhibit/prevent a rotation of the seat post relative to the seat tube (around a longitudinal axis of the seat tube). Similarly, the outer circumference of the seat post and the inner circumference of the seat tube may be shaped so as to limit a rotation of the seat post relative to the seat tube (around a longitudinal axis of the seat tube) to less than 2°, less than 1° or less than 0.5°. A portion of the seat post may extend inside (and be clamped by) the seat tube. Similarly, the seat post may be integrally formed with the structure. The seat may be connected to the structure via the seat post. The seat post may support the seat/saddle. For example, the seat/saddle may be mounted on/fastened to the seat post.

A power supply of the vehicle may be at least partially housed in the seat tube and/or the seat post. At least one of the seat tube and the seat post may comprise/define a (cylindrical) hollow that (slidingly) receives the power supply. The structure may comprise a first engagement mechanism that (engages the power supply and) inhibits motion of the power supply (relative to the structure/seat tube). The first engagement mechanism may inhibit disengagement of electrical contacts of the power supply from (corresponding) electrical contacts on the structure/seat tube. The first engagement mechanism may comprise a snapping fastener and/or a latch and/or a magnet. Similarly, the power supply may comprise an engagement mechanism, e.g. a snapping fastener and/or a latch and/or a magnet, that (engages/interacts with the structure, e.g. the first engagement mechanism, and) inhibits motion of the power supply (relative to the structure/seat tube). The seat post may comprise a second engagement mechanism that engages (a counterpart) engagement mechanism of) the power supply and disengages the power supply from the first engagement mechanism, e.g. in in response to a motion of the seat post in a direction of disengagement of the seat post from the seat tube beyond a first state of engagement of the seat post and the seat tube. For example, the second engagement mechanism may disengage the power supply from the first engagement mechanism in response to a motion of the second engagement mechanism beyond a (counterpart) engagement mechanism of the power supply in a direction of disengagement of the seat post from the seat tube. The (counterpart) engagement mechanism of the power supply may disengage from the second engagement mechanism in response to a motion of the seat post in a direction of increasing engagement of the seat post and the seat tube (beyond the (aforementioned) first state of engagement of the seat post and the seat tube). For example, the (counterpart) engagement mechanism of the power supply may disengage from the second engagement mechanism in response to a motion of the seat post in a direction of increasing engagement of the seat post and the seat tube beyond a point at which the power supply engages the first engagement mechanism. The second engagement mechanism may comprise a snapping fastener and/or a magnet. The (power supply and seat post may be configured such that the) power supply does not inhibit motion of the seat post at more engaged states of engagement of the seat post and the seat than the (aforementioned) first state of engagement. The (power supply and seat post may be configured such that the) seat post (slidingly) receives the power supply (at least) at more engaged states of engagement of the seat post and the seat than the (aforementioned) first state of engagement. The power supply may comprise a handle, e.g. at an end of the power supply proximate to the seat/seat post. The handle may be positioned so as to facilitate removal of the power supply from the structure, e.g. when the seat post is removed from the seat tube. The handle may be at an end of the power supply opposite the (aforementioned) engagement mechanism. The seat tube may comprise a first portion comprising a first inner diameter and a second portion comprising a second inner diameter that is smaller than the first inner diameter (by at least 2 mm, at least 4 mm or at least 6 mm). The second portion may receive a portion of the power supply, e.g. such that an outer wall of the power supply does not contact the first inner diameter of the first portion. The second portion may be more distal from the seat/seat post than the first portion. The vehicle may comprise a locking mechanism that inhibits removal of the seat post from the seat tube (by unauthorized persons).

As touched upon supra, the driven frame portion (of a vehicle of the second category) may comprise a seat support. The seat support may be located in an upper region of the driven frame portion, e.g. in an uppermost 30%, an uppermost 20% or an uppermost 10% of the driven frame portion. The seat support may be located in rearward region of the driven frame portion, e.g. in a most rearward 30%, a most rearward 20%, a most rearward 10% or a most rearward 5% of the driven frame portion. The seat support may be located at/proximate to an intersection of the seat tube and the top tube. Similarly, a vehicle (of the second category) may comprise a seat/saddle, e.g. for a user selected from the group consisting of a driver, a rider and a passenger of the vehicle. The seat support may support the seat directly. As such, the seat may be mounted on/rigidly connected to the seat support. For example, the seat support may constitute a seat post, e.g. a seat post integrally formed with the driven frame portion (of a vehicle of the second category). Similarly, the seat support may support the seat indirectly. For example, the seat may be mounted on/rigidly connected to a seat post that is mounted/rigidly connected to the seat support. A portion of the seat tube, e.g. the upper seat tube portion (as discussed infra), may constitute the seat support. The seat tube may receive the seat post. A portion of the seat post may extend inside (and be clamped by) the seat tube. The seat may be connected to the driven frame portion via the seat post. The seat post may support the seat/saddle. For example, the seat/saddle may be mounted on/fastened to the seat post.

The assembly/structure/payload support (structure), i.e. the driven frame portion, and the frame may be configured in a manner that allows the driven frame portion to be secured to the frame using no more than two fastening devices. In the present context, the term "secured" can be understood as being sufficiently connected so as to permit safe operation of the vehicle. Accordingly, the above statement does not preclude the use of additional fastening devices that fasten the driven frame portion to the frame, it simply emphasizes that a mere two fastening devices may suffice to secure the driven frame portion to the frame. In other words, the driven frame portion and the frame may be configured in a manner that allows the vehicle to be modified from a first state in which the driven frame portion is detached from the frame to a second state in which the vehicle is safely operable, the modifying requiring assembly/installation/engagement of merely two fastening devices. The fastening device may be a (combination of) nut and bolt. Similarly, the fastening device may be a (combination of) pin and pin retainer. The pin retainer may be a cotter pin, a ring or a clip, e.g. an R-clip or a C-clip/snap ring. Accordingly, the above teaching of a mere two fastening devices to secure the driven frame portion to the frame may be understood as installing a first fastening component, e.g. a bolt or pin, (in a desired arrangement) and ensuring retention of that first fastening component (in the desired arrangement) by engaging a first retention component, e.g. a nut, R-clip or C-clip, onto the first fastening component and then doing the same with a second fastening component and a second retention component. As such, the first/second fastening component (in the installed position) may act (e.g. in cooperation with a motion control device as described infra) to restrict a range of motion of the driven frame portion relative to the frame, whereas the first/second retention component may act to prevent a dislodging of the first/second fastening component from the installed position.

As such, the vehicle may comprise two fastening devices, a transition of the two fastening devices from a detached state (e.g. in which the two fastening devices are detached from the vehicle) to a retainedly installed state (e.g. in which (the respective fastening components of) the two fastening devices are installed in respectively appropriate fastening arrangement/fastening locations (e.g. in suitable mounting holes) with respect to the driven frame portion and/or the frame and retained in those respectively appropriate fastening arrangement/fastening locations (by the respective retention components)) sufficing to transition the vehicle from a non-operative state to a safely operable state. Conversely, the vehicle may comprise two fastening devices, a transition of the two fastening devices from a retainedly installed state (e.g. in which (the respective fastening components of) the two fastening devices are installed in respectively appropriate fastening arrangement/fastening locations (e.g. in suitable mounting holes) with respect to the driven frame portion and/or the frame and retained in those respectively appropriate fastening arrangement/fastening locations (by the respective retention components)) to a detached state (e.g. in which the two fastening devices are detached from the vehicle) to sufficing to transition the vehicle from a safely operable state to a non-operative state.

The assembly/structure/payload support (structure), i.e. the driven frame portion, and/or the frame may comprise a plurality of mounting holes, e.g. mounting holes that receive (the fastening components of) the fastening devices to secure the driven frame portion to the frame (e.g. via respective motion control devices as described infra). The (fastening component of the) first fastening device may extend through at least one mounting hole in the driven frame portion and through at least one motion control device (e.g. as described infra), and (the fastening component of) the second fastening device may extend through at least one other mounting hole in the driven frame portion and through at least one other motion control device (e.g. as described infra). Similarly, (the fastening component of) the first/a third fastening device may extend through at least one mounting hole in the frame and through at least one motion control device (e.g. as described infra), and (the fastening component of) the second/a fourth fastening device may extend through at least one other mounting hole in the frame and through at least one other motion control device (e.g. as described infra).

As touched upon supra, the driven frame portion (of a vehicle of the first or second category), i.e. the frame (of a vehicle of the first category), may comprise a head tube. The head tube may be a component/structure that (rotatably) supports a portion of a (front) fork, e.g. in a manner that allows a steering of the (front) fork (and a terrain-engaging component (e.g. a (front) wheel) supported by the (front) fork). Although traditionally called a "head tube" in the art, the head tube need not be (purely) tubular in shape. The vehicle may furthermore comprise a front fork, a steering tube of the front fork being rotatably mounted in the head tube.

As touched upon supra, the driven frame portion (of a vehicle of the first or second category), i.e. the structure (of a vehicle of the first category), may comprise a (driving) axle support. The driven frame portion, e.g. the assembly/structure/payload support (structure), may rigidly interconnect the seat support and the (driving) axle support. The (driving) axle support may support a (driving) axle of a drivetrain of the vehicle, e.g. an axle of a crankarm and/or an axle of a driving sprocket (as opposed to a driven sprocket) and/or an axle of a (driving) motor. The (driving) axle support may be a bottom bracket shell. The (driving) axle support may define a (first) axis of rotation, i.e. a (first) rotational axis.

The (driving) axle support may be located in a lower portion of the structure/driven frame portion, e.g. in a lowermost 30%, a lowermost 20%, a lowermost 10% or a lowermost 5% of the structure/driven frame portion. (The terms "lower" and "lowermost" are described in further detail infra.) Similarly, the (driving) axle support may be located in a rearward region of the driven frame portion (of a vehicle of the second category), e.g. in a most rearward 30%, a most rearward 20%, a most rearward 10% or a most rearward 5% of (the aforementioned lower (most) portion of) the driven frame portion. (The term "rearward" is described in further detail infra.) Such a lower portion and/or rearward region may constitute a bottom bracket region.

The frame of a vehicle (of the first category) may comprise/consist of a forward portion and a rearward portion. The rearward portion may comprise the (rear) driven axle support. The forward portion may comprise the head tube. The rearward portion may comprise a structurally relevant portion. The structurally relevant portion may be a portion, an absence of which would reduce the maximal (forward) force transmittable (via the rearward portion) from the (rear) driven axle support to the forward portion/head tube by at least 20%, at least 40%, at least 60%, at least 80% or at least 95%. For example, the rearward portion may comprise mudguards and/or fairings that do not constitute part of the structurally relevant portion. The remainder of the present disclosure pertaining to the rearward portion may understood as applying exclusively to the structurally relevant portion of the rearward portion. Similarly, the disclosure in the remainder of this paragraph pertaining to the rearward portion may understood as applying to the rearward portion as a whole. For the sake readability, however, the term "rearward portion" will be used in the remainder of the present disclosure in lieu of the awkward phase "(structurally relevant portion of the) rearward portion".

The rearward portion may comprise a first arm, a second arm and a joining portion. The first arm and the second arm may be rearward of/extend rearward from the joining portion and may be joined (exclusively) by the joining portion. The first/second arm may comprise a first/second portion of the (rear) driven axle support. The first/second portion may be situated in a region of the first/second arm distal from the joining portion. The rearward portion may support a terrain-engaging component, e.g. a wheel, of the vehicle between the first arm and the second arm. An axle of the terrain-engaging component may be supported (exclusively) by/extend between the first portion and the second portion of the (rear) driven axle support. As such, the joining portion may be forward of the terrain-engaging component.

The frame may a unitary element. As such, the frame may be of a single piece of material. Similarly, the rearward portion may a unitary element. As such, the rearward portion may be of a single piece of material. Moreover, the forward portion may a unitary element. As such, the forward portion may be of a single piece of material. Similarly, the frame may comprise a first half and a second half, the first half comprising the first arm, half of the joining portion and half of the forward portion, the second half comprising the second arm, another half of the joining portion and another half of the forward portion. The first half may be fastened to the second half, e.g. by an adhesive and/or fastening components.

The rearward portion, e.g. the joining portion, may comprise an opening that receives a portion of the structure/assembly. The opening may extend through the rearward portion and may have a (minimal) cross-section of at least 5 cm×8 cm. The structure/assembly may extend through the opening, i.e. through the rearward portion. Similarly, (a portion of) the structure/assembly may extend between the first arm and the second arm (from above an upper side of the rearward portion to below a lower side of the rearward portion).

The rearward portion may comprise a mount. The mount may protrude downward from the rearward portion. The mount may be situated forward of a rear terrain-engaging component and/or rearward of the structure and/or rearward of the opening.

The rearward portion may extend from (rearward of) the driven axle support to forward of (an intersection of an uppermost edge of the rearward portion and) the structure. The rearward portion may extend forward of (an intersection of an uppermost edge of the rearward portion and) the structure by at least 10 cm, at least 20 cm, or at least 30 cm. As such, (an entirety of) the forward portion may be situated at least 10 cm, at least 20 cm, or at least 30 cm forward of (an intersection of an uppermost edge of the rearward portion and) the structure. The rearward portion may extend forward of the opening by at least 10 cm, at least 20 cm, or at least 30 cm. As such, (an entirety of) the forward portion may be situated at least 10 cm, at least 20 cm, or at least 30 cm forward of the opening. The rearward portion may extend to at least 10 cm, at least 20 cm, or at least 30 cm forward of (a vertical plane (substantially) orthogonal to a longitudinal axis of the rearward portion and intersecting) the (driving) axle support. As such, (an entirety of) the forward portion may be situated at least 10 cm, at least 20 cm, or at least 30 cm forward of (a vertical plane (substantially) orthogonal to a longitudinal axis of the rearward portion and intersecting) the (driving) axle support.

An entirety of the rearward portion may be situated in a lowermost 30%, a lowermost 40%, a lowermost 50% or a lowermost 60% of the vehicle, e.g. where a contact point of a terrain-engaging component and the ambient terrain is taken as a lowermost point of the vehicle and/or an uppermost (possible) point of the structure/frame is taken as the uppermost point of the vehicle. The uppermost possible point of the structure may be defined as the most distant point from the ambient terrain achievable by the structure in the (limited) range of motion permitted by the motion control system as described in further detail infra.

The rearward portion may extend (substantially) horizontally from the (rear) driven axle support to the forward portion. As such, the rearward portion may extend (substantially) horizontally from the (rear) driven axle support to at least 10 cm, at least 20 cm, or at least 30 cm forward of the opening. An intersection of the rearward portion and the forward portion (substantially) horizontally forward from the (rear) driven axle support may constitute a sole connection of the rearward portion and the forward portion.

In the present disclosure, the expression "forward of the opening" may be understood as a forward distance relative to any part of the opening. Similarly, the expression "forward of the opening" may be understood as a forward distance relative to a rearmost portion of an edge of the opening forward of the structure/assembly.

The forward portion may extend from the rearward portion to the head tube. A longitudinal axis of the rearward portion may be angled relative to a longitudinal axis of the forward portion by an angle of more than 40° and less than 80°, e.g. by an angle of more than 50° and less than 70°. The vehicle, in particular the forward and rearward portions, may be configured such that at least 80%, at least 90%, or at least 95% of the maximal (forward) force transmittable from the (rear) driven axle support to the head tube is transmitted (exclusively) by the rearward portion from the (rear) driven axle support to the forward portion and (exclusively) by the forward portion from the rearward portion to the head tube. The vehicle, in particular the rearward portion, may be configured such that at least 80%, at least 90%, or at least 95% of the maximal (forward) force transmittable from the (rear) driven axle support to the driven frame portion, i.e. to the structure/assembly, is transmitted (exclusively) by the rearward portion from the (rear) driven axle support to the structure/assembly.

The structure and/or assembly (of a vehicle of the first category) may fit within a bounding box in the shape of a parallelepiped, the bounding box having dimensions of 15 cm×20 cm×100 cm. The forward portion may fit within a bounding box in the shape of a parallelepiped, the bounding box having dimensions of 15 cm×30 cm×80 cm. The (structurally relevant portion of the) rearward portion may fit within a bounding box in the shape of a parallelepiped, the bounding box having dimensions of 30 cm×30 cm×80 cm.

As touched upon supra, the driving frame portion (of a vehicle of the first or second category), i.e. the frame (of a vehicle of the first category), may comprise a (rear/driven) axle support that may be a (rear) driven axle support. The (rear/driven) axle support may support a (driven) axle (of a driven sprocket) of a (rear) wheel. Similarly, (rear/driven) axle support may support a (driven) axle of a guide of a (continuous) track. The (rear/driven) axle support may define a (second) axis of rotation, i.e. a (second) rotational axis.

The (rear/driven) axle support may be located in a rearward region of the frame/driving frame portion, e.g. in a most rearward 30%, a most rearward 20%, a most rearward 10% or a most rearward 5% of the frame/driving frame portion. Similarly, the (rear/driven) axle support may be located in a lower region of the frame/driving frame portion, e.g. in a lowermost 30%, a lowermost 20%, a lowermost 10% or a lowermost 5% of (the aforementioned (most) rearward region of) the frame/driving frame portion.

In the present disclosure, "forward" and/or "rear" (as well as related terms such as fore, aft, front and back) may be defined, as known in the art, by an orientation and/or location of a steering wheel and/or handlebars and/or an orientation and/or location of seats (of the vehicle) relative to the vehicle (as a whole). Similarly, "forward" and/or "rear" (and related terms) may be defined, as known in the art, by (other) characteristics of the vehicle. Such characteristics may include a shape of the frame/chassis, a configuration of a drivetrain, etc. For example, the seat may be "forward" of a propulsive terrain-engaging component. A (dominant) direction of propulsion and/or motion of the vehicle may be a "forward" direction. (For the sake of conciseness, the term "propulsion direction" will be used hereinafter to designate the (dominant) direction of the vehicle regardless of whether the vehicle comprises a motor or other means of propulsion). In the present disclosure, "forward" and/or "rear" (and related terms) may designate a (relative) location with respect a "horizontal" axis (when the vehicle is on level terrain). Such designation may be independent of a "vertical" location, i.e. is not to be invariably construed as implying a "vertical" location.

In the present disclosure, "upward" and/or "downward" (as well as related terms such as above, below, upper, higher and lower) may be defined, as known in the art, by an orientation and/or location of seats (of the vehicle) relative to the vehicle (as a whole) and/or a location of a steering wheel and/or handlebars relative to a seat (of the vehicle). Similarly, "upward" and/or "downward" (and related terms)

may be defined, as known in the art, by (other) characteristics of the vehicle. Such characteristics may include a shape of the frame/chassis, a configuration of a drivetrain, a location of at least one terrain-engaging component as described above, etc. In the present disclosure, "upward" and/or "downward" (and related terms) may designate a (relative) location with respect a "vertical" axis (when the vehicle is on level terrain). Such designation may be independent of a "horizontal" location, i.e. is not to be invariably construed as implying a "horizontal" location.

In the nomenclature of a bicycle, the driven frame portion (of a vehicle of the first category) may comprise a seat tube, a top tube, a head tube and a down tube. The seat tube may be distinct from the structure/payload support (structure). The seat tube, top tube, head tube and down tube may constitute the four sides of a quadrilateral. Such a quadrilateral is often referred to in the art as a "(front) triangle". The seat tube may rigidly connect (a rearward portion of) the top tube and (a rearward/lower portion of) the down tube. Still using the nomenclature of a bicycle, the driven frame portion may comprise a first chain stay, a first seat stay, a second chain stay and a second seat stay. The first/second chain stay may interconnect (a rearward/lower portion of) the down tube and (a first/second side of) the (rear) driven axle support. The first/second seat stay may interconnect (the first/second side of) the (rear) driven axle support and (a rearward portion of) the top tube. Similarly, the first/second seat stay may interconnect (the first/second side of) the (rear) driven axle support and (an upper portion of) the seat tube. The first/second chain stay, the first/second seat stay and the seat tube may form a (first/second) (rear) triangle. The structure/payload support (structure) may extend through the seat tube. As such, the structure/payload support (structure) may protrude from an upper opening of the seat tube and from a lower opening of the seat tube. The seat tube may be dimensioned (relative to the structure/payload support (structure)) such that the structure/payload support (structure) has freedom to move non-linearly within the seat tube. The seat tube may be dimensioned (relative to the structure/payload support (structure)) such that the structure/payload support (structure) is restricted to motion within/parallel to a major plane of symmetry of the vehicle. In the present disclosure, the phrase "major plane of symmetry of the vehicle" may be understood as designating a major plane of symmetry of the driven frame portion and/or the driving frame portion and/or of a terrain-engaging component. In the context of a pivotally/rotationally mounted component, the phrase "major plane of symmetry of the vehicle" may be particularly understood as designating a major plane of symmetry of the driven/driving frame portion to which the respective component is pivotally/rotationally mounted.

In the nomenclature of a bicycle, the driven frame portion (of a vehicle of the second category) may comprise a seat tube, a top tube, a head tube and a down tube. The driven frame portion may have the shape of a quadrilateral. The seat tube, top tube, head tube and down tube may constitute the four sides of the quadrilateral. The seat tube may rigidly connect the top tube and the down tube. Similarly, the seat tube need not rigidly connect the top tube and the down tube. For example, the seat tube may comprise at least one of an upper seat tube portion and a lower seat tube portion. The upper seat tube portion may be (rigidly) connected to the top tube. The lower seat tube portion may be (rigidly) connected to at least one of (a lower region of) the down tube and the (driving) axle support. In the case of both an upper seat tube portion and a lower seat tube portion, the upper seat tube portion may lack a direct connection to the lower seat tube portion. As such, the driven frame portion may have the shape of a partial quadrilateral. The top tube, head tube and down tube may constitute three sides of the partial quadrilateral and at least one of the upper/lower seat tube portion may constitute a fourth side of the partial quadrilateral. In such a configuration, the top tube, head tube and down tube may (collectively) act as a spring. (For the sake of readability, the term "seat tube" is used throughout the present disclosure to designate any of the seat tube, the upper seat tube portion and the lower seat tube portion.)

The driving frame portion (of a vehicle of the second category), i.e. the frame (of a vehicle of the first category), may comprise a (rear) fork, e.g. a (rear) fork that supports (rear) terrain-engaging component, for example a (rear) wheel, of the vehicle. The fork may comprise/consist (substantially) of a first arm, a second arm and a yoke portion. Each of the first and second arms may comprise a dropout, opening or bore (in a rearmost 10% of the respective arm) that receives a (respective) end of an axle (of the terrain-engaging component). The first and second arms, e.g. the dropouts, openings or bores thereof, may constitute/define the (rear/driven) axle support. The yoke portion may interconnect the first and second arms (at a (respective) forward portion of each of the first and second arms). The fork may comprise a space between the first and second arms that accommodates a (forward) portion of the (rear) wheel (as known in the art). The fork may be a monolithic/unitary structure. The fork may be termed a "swingarm". The fork may constitute an elevated chain stay.

As touched upon supra, the vehicle (of the first or second category) may comprise a (power conversion) mechanism for converting (leg and/or arm) motion of a user/rider into mechanical power. The mechanism may comprise a (driving) sprocket. The mechanism may comprise a crankset (that comprises the sprocket) and/or (pivotally mounted) levers (that drive the sprocket). The mechanism may be mounted on the driven frame portion (of a vehicle of the first or second category), i.e. on the structure (of a vehicle of the first category). The mechanism may be mounted on the driven frame portion via a bottom bracket mounted on the (driving) axle support.

As touched upon supra, the vehicle (of the first or second category) may comprise a drivetrain, e.g. for transmitting a driving force from the (power conversion) mechanism/the (driving) sprocket to (a driven sprocket connected to) at least one terrain-engaging component of the vehicle. The drivetrain may transfer driving energy from a driving axle supported by the driven frame portion to a driven axle supported by the driving frame portion. For example, in the case of a vehicle of the first category, the drivetrain may transfer driving energy from a driving axle supported by the structure to a driven axle supported by the frame. The drivetrain may comprise a chain and/or a belt. The drivetrain may transfer driving energy from the driving axle to the driven axle by a tensioning of a drivetrain element, e.g. a tensioning of the chain/belt.

As touched upon supra, the vehicle (of the first or second category) may comprise a (gasoline and/or electric) motor. As described supra, the motor may be mounted on/in the driven frame portion. More specifically, the motor may be mounted on/in the structure and may be located on/in a lower portion of the structure in the case of a vehicle of the first category. As such, the structure/payload support (structure) may comprise a mount that receives the motor. Similarly, the motor may be located on/in a lower and/or rearward portion of the driven frame portion in the case of a vehicle of the second category. The motor may contribute a driving force to at least one terrain-engaging component of the vehicle, e.g. via the drivetrain. The drivetrain may transmit a driving force from the motor (mounted on/in the driven frame portion) to (a driven sprocket connected to) at least one terrain-engaging component (mounted on the driving frame portion) of the vehicle. The drivetrain may comprise a gearbox (driven by the motor). The gearbox may drive the driving sprocket (that engages and drives a chain/belt of the drivetrain). The motor may be mounted to the driving frame portion. For example, the motor may be integrated into a hub of a terrain-engaging component, e.g. the hub of a rear wheel of the vehicle, which hub is mounted to the driving frame portion. The motor may drive the terrain-engaging component directly or indirectly—e.g. via a gearbox or a (n internal) gearing (i.e. located within a housing of the motor and/or the hub). An axle/terrain-engaging component driven by the motor may be (simultaneously) driven by a user-powered crankset. The crankset (that may be mounted to the driven frame portion) may be remote to the motor and may drive the axle/terrain-engaging component via a drivetrain, e.g. via a belt or chain.

As touched upon supra, the vehicle (of the first or second category) may comprise a power supply, e.g. an electrical energy storage system (comprising, for example, a (re-chargeable) battery or a (super) capacitor) and/or a fuel storage system (comprising, for example, a fuel tank or a fuel cartridge). The power supply may supply power, e.g. electrical energy and/or fuel to the motor. Similarly, the power supply may supply power, e.g. fuel, to an intermediate component, e.g. a fuel cell and/or an (electronic) power regulator (circuit), that (regulates and) supplies power to the motor. The power supply and/or the intermediate component may be mounted on/in the driven frame portion.

The vehicle may comprise at least one panel. The panel may snappingly fasten to the frame, e.g. in a (manually) releasable manner. As such, the panel and/or the frame may be configured such that the panel snappingly fastens to the frame. In the nomenclature of a bicycle, the panel may snappingly fasten to a down tube and/or chain stay of the frame. The panel and/or the frame may comprise a fastening element that snappingly engages a counterpart element on the other of the frame/panel (and retains the panel on the frame (during normal use of the vehicle)). The fastening element may snappingly engage the counterpart element in a manner that is (manually) releasable. The panel and/or the frame may (cooperatively) form a (tubular) channel. More specifically, the panel and/or the frame may be configured to (cooperatively) form a (tubular) channel between the panel and the frame, e.g. when the panel is fastened to the frame. The (tubular) channel may open to an ambient exterior environment of the vehicle at a forward and/or rearward end of the panel. The panel may have a length that is at least 70%, at least 80% or at least 90% of a (n overall) length of the down tube. The panel may extend at least 70%, at least 80% or at least 90% of a distance (along the frame) from the head tube to the driven axle support. A major surface of the panel may be (substantially) parallel to a major plane of symmetry of the frame. For example, a major surface of the panel may be within 5°, within 10° or within 15° of parallel to a major plane of symmetry of the frame.

The panel and/or the frame may comprise illumination means, e.g. LED lights. Similarly, the panel may comprise at least one translucent/transparent region, i.e. at least one region of translucent/transparent material. The translucent/transparent region may align with illumination means on the frame when the panel is fastened to the frame. As such, the panel and/or the frame may be configured such that the translucent/transparent region aligns with illumination means on the frame when the panel is fastened to the frame.

The vehicle may comprise cabling and/or wiring that is routed (at least partially) through the (tubular) channel. The cabling may transmit mechanical forces (from one region of the vehicle to another region of the vehicle), e.g. a mechanical force that controls a (rear) derailleur (in response to an actuation of a shift mechanism) and/or a mechanical force that controls a (rear) brake (in response to an actuation of a brake lever). The wiring may transmit electrical power and/or electrical signals for powering/controlling/communicating with at least one device selected from the group consisting of a motor, a drivetrain (component), illumination means, a user device interface (e.g. an interface for interfacing with a user's cell phone), and a device belonging to an energy management system.

The vehicle (of the first or second category), e.g. a bicycle or a motorized bicycle, may comprise a vehicle controller. Indeed, the present disclosure may be understood as disclosing such a vehicle controller per se. The vehicle controller may be mounted on/in the structure. The vehicle controller may comprise an electronic data processing system, e.g. an electronic data processing system that generates a motor drive signal (that influences/controls operation of the (vehicle) motor). For example, the motor drive signal may influence/control a speed and/or a power output and/or a transmission ratio/gearing of the (vehicle) motor. As such, the electronic data processing system may comprise/consist of a motor controller and/or an (electronic) power regulator (circuit) that controls/regulates a supply of power to the motor. The electronic data processing system may generate the motor drive signal using first data indicative of a first power input into a first vehicle drivetrain by a first user and second data indicative of a second power input into a second vehicle drivetrain by a second user. The drivetrain of the vehicle (that comprises the vehicle controller) may constitute the first vehicle drivetrain. The drivetrain of another vehicle (distinct from the vehicle that comprises the vehicle controller) may constitute the second vehicle drivetrain. The vehicle controller may comprise a sensor system for sensing a power input into the first vehicle drivetrain by the first user and/or for sensing at least one vehicle characteristic (collectively) indicative of a power input into the first vehicle drivetrain by the first user. The sensor system may comprise a component selected from the group consisting of a strain gauge, a pressure gauge and a torque sensor. The sensor system may acquire/derive the first data from the sensed power input and/or the at least one sensed vehicle characteristic. The sensor system may provide the first data to the electronic data processing system. The vehicle controller may comprise a (wireless) receiver that receives the second data (from the other vehicle) (and provides the second data to the electronic data processing system). The receiver may receive the second data indirectly from the other vehicle, e.g. via (a wireless or wired connection to) a cell phone (of the first user). The electronic data processing system may generate a motor drive signal that influences/controls operation of the (vehicle) motor in such a manner that the total power input into the first vehicle drivetrain by the first user and the motor differs by no more than 20%, by no more than 10% or by no more than 5% from the power input into the second vehicle drivetrain by the second user. The electronic data processing system may use third data indicative of a location and/or velocity of the first user relative to a location and/or velocity of the second user to generate the motor drive signal. The vehicle controller may comprise a location determination system that determines a location and/or velocity of the vehicle, i.e. of the first user. The location determination system may comprise a GPS receiver. Similarly, the location determination system may comprise a (wireless) data interface that receives (first) location information indicative of a location and/or velocity of the vehicle/the first user from a separate device, e.g. (via a wireless or wired connection) from a cell phone (of the first user). Similarly, the (wireless) receiver may receive (second) location information indicative of a location and/or velocity of the other vehicle/the second user, e.g. from a cell phone (of the second user). The (wireless) receiver may receive the (second) location information indirectly, e.g. via (a wireless or wired connection to) a cell phone (of the first user). The (wireless) receiver may provide the (second) location information to the electronic data processing system and/or to the location determination system. The location determination system may derive the third data from the (first and second) location information. The location determination system may provide the third data and/or the (first) location information to the electronic data processing system. The electronic data processing system may derive the third data from the (first and second) location information. The electronic data processing system may generate a motor drive signal that influences/controls operation of the (vehicle) motor in such a manner that a (predicted) speed of the first user differs by no more than 20%, by no more than 10% or by no more than 5% from a (predicted) speed of the second user. The predicted speed of the first user may be a speed predicted from the total power input into the first vehicle drivetrain by the first user and the motor. The predicted speed of the second user may be a speed predicted from the (total) power input into the second vehicle drivetrain by the second user (and a motor of the other vehicle). As such, the (wireless) receiver may receive fourth data indicative of a power input into the second vehicle drivetrain by a motor of the other vehicle (and provide the fourth data to the electronic data processing system). The receiver may receive the fourth data indirectly from the other vehicle, e.g. via (a wireless or wired connection to) a cell phone (of the first user). The electronic data processing system may generate a motor drive signal that influences/controls operation of the (vehicle) motor in such a manner that a (predicted future) distance between the first user and the second user does not exceed a (maximum) value stored in a data storage device of the vehicle controller. The vehicle controller may comprise a data interface and/or a user interface that receives/generates data to be stored in the data storage device as the (maximum) value. As a parameter in calculating the (predicted future) distance between the first user and the second user, the electronic data processing system may use the current location and/or velocity of the first user and the current location and/or velocity of the second user. As a parameter in calculating the (predicted future) distance between the first user and the second user, the electronic data processing system may use at least one previous location and/or velocity of the first user and at least one previous location and/or velocity of the second user. As a parameter in calculating the (predicted future) distance between the first user and the second user, the electronic data processing system may use a current and/or at least one previous power input into the first vehicle drivetrain by the first user. As a parameter in calculating the (predicted future) distance between the first user and the second user, the electronic data processing system may use a current and/or at least one previous (total) power input into the second vehicle drivetrain by the second user (and a motor of the other vehicle).

Except where a specific distinction is made, the following disclosure relating to a motion control system apply both to a vehicle of the first category and to a vehicle of the second category. Accordingly, the terms "driving frame portion" and "driven frame portion", as elsewhere in the present disclosure, also respectively designate the frame and structure of a vehicle of the first category.

The vehicle may comprise a motion control system, e.g. a motion control system that movably interconnects the driving frame portion and the driven frame portion. As such, the motion control system may connect the driving frame portion and the driven frame portion such that the driving frame portion is movable (within a limited range of motion defined by the motion control system) relative to the driven frame portion (and vice versa). The motion control system may movably interconnect the driving frame portion and the driven frame portion such that the driven frame portion moves non-linearly relative to the driving frame portion (and vice versa). The motion control system may connect to the driving frame portion solely in a lowermost 50%, a lowermost 40%, a lowermost 30% or a lowermost 20% of the driving frame portion.

In the case of a vehicle of the first category, the driven frame portion may be movably connected to the frame (by the motion control system) such that a first angle between a first imaginary straight line defined by the driving frame portion and a second imaginary straight line defined by the driven frame portion in a first operating state of the vehicle differs from a second angle between the first imaginary straight line and the second imaginary straight line in a second operating state of said vehicle by at least 1°, by at least 2° or by at least 3°. Similarly, the driven frame portion may be movably connected to the frame (by the motion control system) such that a third angle between the first imaginary straight line and the second imaginary straight line in any third operating state of the vehicle differs from a fourth angle between the first imaginary straight line and the second imaginary straight line in any fourth operating state of the vehicle by no more than 15°, by no more than 12°, by no more than 10°, by no more than 8° or by no more than 5°. The first imaginary straight line may be an imaginary straight line between (a center of) the driven axle support and a region of the driving frame portion most distal from the driven axle support. The first imaginary straight line may be defined by a straight/flat longitudinal portion of the driving frame portion. The second imaginary straight line may be an imaginary straight line between (a center of) the first axle support, e.g. the driving axle support, and a region of said seat support most distal from the first axle support. The second imaginary straight line may be defined by a straight/flat longitudinal portion of the driven frame portion.

Motion of the motion control system may be constrained to a limited range, e.g. by virtue of the construction of the motion control system and/or interaction of the motion control system with at least one of the driving frame portion and the driven frame portion. For example, the motion control system may be movable between a first end-of-range position/operating state and a second end-of-range position/operating state. More specifically, motion of the motion control system may be constrained between a first end-of-range position/operating state and a second end-of-range position/operating state. As such, the motion control system may be constrained to (a plurality of) operating states intermediate a first end-of-range operating state and a second end-of-range operating state. (Although the present specification often uses the term "operating state" 10 emphasize that the motion control system is a dynamic system, the term "state" may be used in lieu of the term "operating state")

More specifically, motion of the motion control system may be constrained such that (at least one portion of) at least one component of the motion control system moves (along a linear or curved path) between a (respective) first end-of-range position (when the motion control system is in the first end-of-range position/operating state) and a (respective) second end-of-range position (when the motion control system is in the second end-of-range position/operating state). Moreover, motion of the motion control system may be constrained such that (at least one portion of) at least one component of the motion control system moves (exclusively) along a (respective) path relative to at least one of the driving frame portion and the driven frame portion. For example, a connection point of the motion control system to the driven frame portion may (be constrained to) move (exclusively) along a linear or curved path relative to the driving frame portion. Similarly, a connection point of the motion control system to the driving frame portion may (be constrained to) move (exclusively) along a linear or curved path relative to the driven frame portion. The path traveled by the (at least one portion of) at least one component of the motion control system (relative to at least one of the driving frame portion and the driven frame portion) as the (at least one portion of) at least one component of the motion control system transitions from the (respective) first end-of-range position to the (respective) second end-of-range position may be identical to the path traveled by the (at least one portion of) at least one component of the motion control system (relative to at least one of the driving frame portion and the driven frame portion) as the (at least one portion of) at least one component of the motion control system transitions from the (respective) second end-of-range position to the (respective) first end-of-range position.

The motion control system may limit the range of motion of the driven frame portion relative to the driving frame portion such that a difference between a minimum distance from (a central axis of) the driven axle support to (a central axis of) the first axle support, e.g. the driving axle support, in the range of motion and a maximum distance from (the central axis of) the driven axle support to (the central axis of) the first axle support in the range of motion is less than 4 cm, less than 3.5 cm, less than 3 cm or less than 2.5 cm.

In the case of a vehicle of the first category, the second end-of-range position/operating state may be a position/operating state in which the difference in vertical height between the (rear/driven) axle support and the seat support/an uppermost portion of the payload support is at a minimum. Similarly, the second end-of-range position/operating state may be a position/operating state in which, on level terrain, the lowermost region of the structure is closest to the terrain. In other words, the second end-of-range position/operating state may be a position/operating state achieved, starting from a non-dynamic unladen state with the terrain-engaging components of the vehicle contacting a level surface, by moving solely the structure downward until the motion control system reaches an end-of-range (and the lowermost region of the structure is closest to the terrain).

In the case of a vehicle of the second category, the second end-of-range position/operating state may be a position/operating state in which a rear wheel of the vehicle is closest to a seat support of the driven frame portion. The second end-of-range position/operating state may be a position/operating state achieved, starting from a non-dynamic unladen state with the terrain-engaging components of the vehicle contacting a level surface, by moving solely the driving frame portion until the motion control system reaches an end-of-range (and the rear wheel is a maximum distance from the level surface).

In the present disclosure, a position/operating state of the motion control system may be designated by a fraction/percentage of the total range of travel of the motion control system from the first end-of-range position/operating state in the direction of the second end-of-range position/operating state. The fraction/percentage of travel may be determined e.g. as a function of an angle between any two components of the motion control system, as a function of an angle between any component of the motion control system and a portion of the driving/driven frame portion, and/or as a function of a distance along a (linear/curved) path of motion of (the) (at least one portion of) at least one component of the motion control system.

An operating state of the motion control system when the vehicle is in a non-dynamic, payload-bearing state on a level surface (with the terrain-engaging components of the vehicle contacting the level surface) may be termed a "neutral, payload-bearing state". The payload-bearing state may be a state in which the vehicle is bearing a payload in the range of 50 kg to 150 kg, e.g. the range of 50 kg to 100 kg. Similarly, a position/operating state that differs from the neutral, payload-bearing state by less than 25%, less than 20%, or less than 10% of the total range of travel of the motion control system, may be termed a "near neutral, payload-bearing state". The neutral, payload-bearing state may be a position/operating state in the range of 15% to 35% (of the total range of travel of the motion control system) from the first end-of-range position/operating state.

In the present disclosure, the term "rise" (a.k.a. "jacking" or "anti-squat") may be understood as designating an operating state in which the (driving) axle support/bottom bracket shell is higher (i.e. farther from the terrain) than the (driving) axle support/bottom bracket shell in the neutral, payload-bearing state. Similarly, the term "sag" (a.k.a. "squat") may be understood as designating an operating state in which the (driving) axle support/bottom bracket shell is lower (i.e. closer to the terrain) than the (driving) axle support/bottom bracket shell in the neutral, payload-bearing state. Nonetheless, the term "sag" may likewise designate a position/operating state relative to the first end-of-range position/operating state, whence the neutral, payload-bearing state may be designated as being in the range of 15% to 35% sag.

The motion control system may (be configured and arranged to) adopt an equilibrium state, i.e. an operating state in which (at least two/all) forces acting on/imparted onto the motion control system are in equilibrium, e.g. the forces imparted onto the motion control system (exclusively) by (optionally, dependent e.g. on whether the vehicle is a vehicle of the second category and comprises such a tensioned drivetrain element) a tensioning of a drivetrain element (e.g. a chain or belt) that transfers driving energy from (a driving axle supported by) the driven frame portion to (a driven axle supported by) the driving frame portion, a forward acceleration of the driving frame portion, and an acceleration of a payload supported by (a payload support element and/or the seat support portion of) the driven frame portion.

The motion control system may adopt the equilibrium state in response to the forward acceleration of the driving frame portion, e.g. in response to the forces effecting and resulting from such acceleration. For example, (the motion control system may be configured and arranged such that) the forces imparted onto the motion control system (may) act on (at least one component of) the motion control system in a manner that moves the motion control system into the equilibrium state (if not already in the equilibrium state). The forward acceleration of the driving frame portion may be a (smooth, substantially neutral/smooth neutral) forward acceleration (e.g. as described infra) resulting from a driving force imparted by the terrain-engaging component, e.g. a wheel, supported by the driving frame portion.

The adopting of the equilibrium state in response to a forward acceleration of the driving frame portion may depend on the instantaneous position/operating state of the motion control system at the onset of the forward acceleration. The motion control system may adopt the equilibrium state in response to the forward acceleration of the driving frame portion if the motion control system, at the onset of the forward acceleration, is in the neutral, payload-bearing state or the near neutral, payload-bearing state, which (driven) acceleration imparts a force onto the driving frame portion (at the second rotational axis) in a purely forward direction. Similarly, the motion control system may adopt the equilibrium state in response to a forward acceleration of the driving frame portion regardless of the instantaneous position/operating state of the motion control system at the onset of the forward acceleration.

The motion control system may adopt the equilibrium state by virtue of a geometric arrangement of (the components constituting the) motion control system relative to the driven frame portion and the driving frame portion. For example, the motion control system may be geometrically configured and arranged (relative to the driven frame portion and the driving frame portion) such that the forces imparted onto the motion control system act on (at least one component of) the motion control system in a manner that moves the motion control system into the equilibrium state (if not already in the equilibrium state).

The (components constituting the) motion control system may be (geometrically) configured and arranged (relative to the driven frame portion and the driving frame portion) such that a range of motion of the motion control system is constrained in such a fashion that the motion control system, in response to the (driven) forward acceleration of the driving frame portion (e.g. in response to the forces effecting and resulting from such acceleration), will move toward the equilibrium state (until in the equilibrium state).

In particular in the case of a vehicle of the second category, the tensioning of a drivetrain element may (in the (near) neutral, payload-bearing state or in any position/operating state of the motion control system) impart a force onto the motion control system (that urges/moves the motion control system) in a direction of a third position/operating state. The drivetrain element may be a drivetrain element (e.g. a chain or belt) that transfers driving energy from (a driving axle supported by) the driven frame portion to (a driven axle supported by) the driving frame portion. The third position/operating state may be the first end-of-range position/operating state. Similarly, the third position/operating state may differ from both the first end-of-range position/operating state and the second end-of-range position/operating state. The third position/operating state may be less than 10% or less than 5% of the total range of travel of the motion control system away from the first end-of-range position/operating state. The percentage of travel may be determined e.g. as a function of an angle between any two components of the motion control system, as a function of an angle between any component of the motion control system and a portion of the driven/driving frame portion, and/or as a function of a distance along a (linear/curved) path of motion of (the) (at least one portion of) at least one component of the motion control system. The (instantaneous) magnitude of the force imparted onto the motion control system (in a direction of the third position/operating state) by the tensioning of the drivetrain element may depend on the (instantaneous) magnitude of the tensioning force effecting the tensioning of the drivetrain element. Similarly, the (instantaneous) magnitude of the force imparted onto the motion control system (in a direction of the third position/operating state) by the tensioning of the drivetrain element may depend on the (instantaneous) operating state of the motion control system. The (instantaneous) magnitude of the force imparted onto the motion control system (in a direction of the third position/operating state) by the tensioning of the drivetrain element as a function of the (instantaneous) operating state of the motion control system may exhibit a minimum, e.g. zero, at the third position/operating state. More specifically, the (components constituting the) motion control system may be (geometrically) configured and arranged such that the (instantaneous) magnitude of the force imparted onto the motion control system (in a direction of the third position/operating state) by the tensioning of the drivetrain element as a function of the (instantaneous) operating state of the motion control system exhibits a minimum, e.g. zero, at the third position/operating state (that is different from at least one of the first end-of-range position/operating state and the second end-of-range position/operating state). In an operating state of the motion control system between the second end-of-range position/operating state and the third position/operating state, a tensioning of the drivetrain element may impart a force onto the motion control system that urges the motion control system toward the first end-of-range position/operating state. In an operating state of the motion control system between the first end-of-range position/operating state and the third position/operating state, a tensioning of the drivetrain element may impart a force onto the motion control system that urges the motion control system toward the second end-of-range position/operating state. The instantaneous position/operating state of the third position/operating state may be variable. The instantaneous position/operating state of the third position/operating state may depend on the instantaneous angle of the force imparted onto the motion control system by the tensioning of the drivetrain element. The instantaneous direction of the force imparted onto the motion control system by the tensioning of the drivetrain element may depend on a size of a front and/or rear sprocket of the drivetrain evoking the tensioning. The tensioning of the drivetrain element may induce a first force at the first rotational axis in a direction parallel to the (tensioned) drivetrain element (and having a rearward component). As such, the first force may induce a force on the driven frame portion that, in turn, may impart a force onto the motion control system (that urges/moves the motion control system) in a direction of the third position/operating state. Moreover, the tensioning of the drivetrain element/the first force may induce a torque on the driven frame portion relative to an instantaneous center (e.g. as described in further detail infra) of the motion control system. Similarly, the tensioning of the drivetrain element may induce a second force at the second rotational axis in a direction parallel to the (tensioned) drivetrain element (and having a forward component). As such, the second force may induce a force on the driving frame portion that, in turn, may impart a force onto the motion control system (that urges/moves the motion control system) in a direction of the third position/operating state. Moreover, the tensioning of the drivetrain element/the second force may induce a torque on the driving frame portion relative to the instantaneous center of the motion control system. For a given tensioning of the drivetrain element, the motion control system may impart a first force onto the motion control system in the direction of the third position/operating state. At the same time, an acceleration of the payload by virtue of a driving force associated with the tensioning of the drivetrain element may a second force onto the motion control system in a direction of the second end-of-range position/operating state. The relationship between the driving force and the tensioning of the drivetrain element may depend on a current combination of driving sprocket and driven sprocket. In the present disclosure, as in the art, the ratio of first force to the second force may be designated as the "anti-squat value".

The acceleration of the driving frame portion resulting from a driving force imparted by the terrain-engaging component supported by the driving frame portion may impart a force onto the driving frame portion (at the second rotational axis) in a direction (opposite to the driving force imparted by the terrain-engaging component onto the ambient terrain and) perpendicular to an imaginary line connecting the second rotational axis and an (instantaneous) contact point of the terrain-engaging component with the ambient terrain. As such, the (instantaneous) direction of a force imparted onto the driving frame portion as a result of a driven acceleration of the driving frame portion may depend on the contour of the ambient terrain and/or the position/operating state of the motion control system and may have a forward/horizontal component. In the present disclosure, the term "forward acceleration" may be understood as a (driven) acceleration of the driving frame portion that imparts a force onto the driving frame portion (at the second rotational axis), the magnitude of the vertical component of said force being less than 20%, less than 10%, or less then 5% of the magnitude of the forward/horizontal component of said force. In the present disclosure, the term "smooth, substantially neutral forward acceleration" may be understood as a (driven) acceleration of the driving frame portion when the vehicle is on a (substantially) smooth surface and when the motion control system is in the (near) neutral, payload-bearing state (e.g. as defined supra, albeit with the distinction that the driving frame portion, in the present context, is experiencing acceleration, whereas the above definition of the neutral, payload-bearing state defines a "location" of the neutral, payload-bearing state in the context of a non-dynamic environment. As such, the term "neutral" in contexts involving acceleration may be understand as expressing that the motion control system is in a "location" corresponding to a (non-dynamic) neutral position/operation state.), which (driven) acceleration imparts a force onto the driving frame portion (at the second rotational axis) in a purely forward direction. In the present disclosure, the term "smooth neutral forward acceleration" may be understood as a (driven) acceleration of the driving frame portion when the vehicle is on a (substantially) smooth level surface and when the motion control system is in the neutral, payload-bearing state (e.g. as defined supra), which (driven) acceleration imparts a force onto the driving frame portion (at the second rotational axis) in a purely forward/horizontal direction.

A forward acceleration of the driving frame portion may impart a force onto the motion control system (that urges/moves the motion control system) in a direction of a fourth position/operating state (when the motion control system is in the (near) neutral, payload-bearing state). More specifically, a smooth neutral forward acceleration of the driving frame portion may impart a force onto the motion control system (that urges/moves the motion control system) in a direction of a fourth position/operating state. The fourth position/operating state may be the first end-of-range position/operating state. Similarly, the fourth position/operating state may differ from both the first end-of-range position/operating state and the second end-of-range position/operating state. The fourth position/operating state may be less than 10% or less than 5% of the total range of travel of the motion control system away from the first end-of-range position/operating state. The percentage of travel may be determined e.g. as a function of an angle between any two components of the motion control system, as a function of an angle between any component of the motion control system and a portion of the driven/driving frame portion, and/or as a function of a distance along a (linear/curved) path of motion of (the) (at least one portion of) at least one component of the motion control system. The instantaneous position/operating state of the fourth position/operating state may be variable. The instantaneous position/operating state of the fourth position/operating state may depend on at least one of the instantaneous direction and the instantaneous magnitude of the forward acceleration of the driving frame portion. The (instantaneous) magnitude of the force imparted onto the motion control system (in a direction of the fourth position/operating state) by the forward acceleration may depend on the (instantaneous) magnitude and/or direction of the forward acceleration. Similarly, the (instantaneous) magnitude and/or direction of the force imparted onto the motion control system (in a direction of the fourth position/operating state) by the forward acceleration may depend on the (instantaneous) operating state of the motion control system. The (instantaneous) magnitude of the force imparted onto the motion control system (in a direction of the fourth position/operating state) by the forward acceleration as a function of the (instantaneous) operating state of the motion control system may exhibit a minimum, e.g. zero, at the fourth position/operating state. More specifically, the (components constituting the) motion control system may be (geometrically) configured and arranged such that the (instantaneous) magnitude of the force imparted onto the motion control system (in a direction of the fourth position/operating state) by the forward acceleration as a function of the (instantaneous) operating state of the motion control system exhibits a minimum, e.g. zero, at the fourth position/operating state. In the fourth position/operating state, the vector of the forward acceleration may point at the instantaneous center of the motion control system (e.g. as described infra). In an operating state of the motion control system between the second end-of-range position/operating state and the fourth position/operating state, a (smooth, substantially neutral) forward acceleration may impart a force onto the motion control system that urges the motion control system toward the first end-of-range position/operating state.

The forward acceleration of the driving frame portion (e.g. resulting from a driving force imparted by terrain-engaging component supported by the driving frame portion) may likewise impart a force onto the motion control system (that urges/moves the motion control system) in a direction of the second end-of-range position/operating state. The (instantaneous) magnitude of the force imparted onto the motion control system (in a direction of the second end-of-range position/operating state) by the forward acceleration of the driving frame portion may depend on the (instantaneous) magnitude of the acceleration of the user mass. Similarly, the (instantaneous) magnitude of the force imparted onto the motion control system (in a direction of the second end-of-range position/operating state) by the forward acceleration of the driving frame portion may depend on the (instantaneous) operating state of the motion control system.

The (components constituting the) motion control system may be (geometrically) configured and arranged (relative to the driven frame portion and the driving frame portion) such that, in an equilibrium position/operating state (that differs from at least one of the first end-of-range position/operating state and the second end-of-range position/operating state), the sum of the (aforementioned) forces urging/moving the motion control system in a direction of the first end-of-range position/operating state (e.g. as a result of the tensioning of the drivetrain element and/or the forward acceleration of the driving frame portion) and the (aforementioned) forces urging/moving the motion control system in a direction of the second end-of-range position/operating state (e.g. as a result of the payload acceleration) are in equilibrium.

The motion control system may be (mechanically) self-stabilizing, e.g. when the vehicle is on a smooth, level surface and a driving acceleration force is imparted onto the driving frame portion. The motion control system may be self-stabilizing in the sense that the motion control system, in response to (a respective totality of) forces (momentarily) exerted onto the motion control system (via the driven and/or driving frame portions) e.g. by a user, a motor/drive system, the ambient terrain of the vehicle and/or gravity, is capable of adopting/adopts a respective (stable) operating state (without the aid of (any) other systems/without the aid of an energy management device such as a spring and/or fluid-based shock absorber). The statement that the motion control system is capable of adopting/adopts a respective (stable) operating state without the aid of (any) other systems does not preclude the presence (and aid) of any such other system. Instead, that statement simply emphasizes the ability of the motion control system to adopt such a respective (stable) operating state without the aid of (any) other systems, regardless of whether such other system is present/such aid occurs. The respective (stable) operating state may differ from at least one of the first end-of-range operating state and the second end-of-range operating state. The respective (stable) operating state may be stable in the sense that the forces imparted onto the motion control system by 1) a (smooth, substantially neutral) forward acceleration of the driving frame portion, and 2) an acceleration of a payload supported by the driven frame portion are in equilibrium. Similarly, the respective (stable) operating state may be stable in the sense that the forces imparted onto the motion control system by 1) a tensioning of a drivetrain element (that transfers driving energy from a driving axle supported by the driven frame portion to a driven axle supported by the driving frame portion), 2) a (smooth, substantially neutral) forward acceleration of the driving frame portion, and 3) an acceleration of a payload supported by the driven frame portion are in equilibrium. In such an (equilibrium) operating state, a driven acceleration of the driving frame portion may impart no forces on an energy management system (as described below, e.g. a spring and/or fluid-based shock absorber). In such an (equilibrium) operating state, transmission of all driving forces to the payload support resulting from a driven acceleration of the driving frame portion may impart no forces on the energy management system (by virtue of the fact that the driving forces are in equilibrium with other forces not emanating from the energy management system). In such an (equilibrium) operating state, energy imparted into a component of the motion control system, e.g. into a first/second motion control device as described infra, as a result of a driven acceleration of the driving frame portion may be instantaneously transmitted to the driven frame portion by the component of the motion control system. The self-stabilization of the motion control system may be mechanical in the sense that the motion control system (passively) adopts the respective (stable) operating state by virtue of the mechanical kinematics of the motion control system.

The motion control system may (be configured and arranged to) impart, in response to a (smooth, substantially neutral) forward acceleration of the driving frame portion, a force onto the driven frame portion that (immediately) accelerates the seat support portion and/or payload support element in a forward direction. Moreover, the motion control system may (be configured and arranged to) impart, in response to a (smooth, substantially neutral) forward acceleration of the driving frame portion, a force onto the driven frame portion that (immediately) accelerates the seat support portion and/or payload support element in a forward direction at an acceleration no less than an acceleration of a first axle support (of the driven frame portion) in the forward direction. As such, the motion control system may impart the force such that acceleration of the seat support portion and/or payload support element does not lag behind/is not less than acceleration of the first axle support. As touched upon supra, the first axle support may be a driving axle support, e.g. the bottom bracket (shell). Similarly, the motion control system may (be configured and arranged to) impart, in response to a (smooth, substantially neutral) forward acceleration of the driving frame portion, a force onto the driven frame portion that (immediately) accelerates the seat support portion and/or payload support element in a forward direction at an acceleration no less than an acceleration of the (rear) drive axle support (of the driving frame portion) in the forward direction. As such, the motion control system may impart the force such that acceleration of the seat support portion and/or payload support element does not lag behind/is not less than acceleration of the (rear) driven axle support. The motion control system may (be configured and arranged to) impart, in response to a (smooth, substantially neutral) forward acceleration of the driving frame portion, a force onto the driven frame portion that (immediately) accelerates the seat support portion and/or payload support element in (both a forward and) an upward direction. The forward acceleration of the driving frame portion may be a forward acceleration resulting from a (terrain-engaging) driving force imparted by a wheel supported by the driving frame portion. The acceleration of the seat support portion may be "immediate" in the sense that the forward acceleration of the driving frame portion and the acceleration of the seat support portion and/or payload support element commence (essentially) simultaneously (aside from a time lag attributable to machining tolerances/(designed) fitting tolerances of components that (must) interact to impart the force onto the driven frame portion and/or to convert forces of the forward acceleration of the driving frame portion into the force onto the driven frame portion). The acceleration of the seat support portion and/or payload support element may be "immediate" in the sense that the motion control system, in response to the forward acceleration of the driving frame portion, need not move (relative to the driven/driving frame portion) to impart the force onto the driven frame portion that accelerates the seat support portion and/or payload support element (in the forward/upward direction). Moreover, the acceleration of the seat support portion and/or payload support element may be "immediate" in the sense that the forward acceleration of the driving frame portion will induce a motion (of components) of the motion control system (relative to the driven/driving frame portion), which motion imparts the force onto the driven frame portion, the forward acceleration of the driving frame portion, the motion (of components) of the motion control system and the acceleration of the seat support portion and/or payload support element commencing (essentially) simultaneously (aside from a time lag attributable to machining tolerances/(designed) fitting tolerances of components that (must) interact to impart the force onto the driven frame portion and/or to convert forces of the forward acceleration of the driving frame portion into the force onto the driven frame portion).

The motion control system may impart the force (onto the driven frame portion) in a plurality of operating states of the motion control system. In other words, the motion control system may be capable of imparting the force (onto the driven frame portion) in each of a plurality of operating states. The plurality of operating states may include a mid-range position of the motion control system, e.g. a position halfway between the first end-of-range position and the second end-of-range position. The plurality of operating states may include the neutral, payload-bearing state and/or a (near) neutral, payload-bearing state (e.g. as described supra). Similarly, the motion control system may impart the force irrespective of an operating state of said motion control system. In other words, the motion control system may be capable of imparting the force (onto the driven frame portion) in any/every operating state (of the motion control system).

In the present disclosure, (minimum) distances, (acute) angles, relative positions, etc. that may depend on a state of the motion control system may be (narrowly) understood as being valid (i.e. measured/determined) when the vehicle is (in an unladen, neutral state) on a level surface (with the terrain-engaging components of the vehicle contacting the level surface). Similarly, such distances, angles, relative positions, etc. may also be understood as being valid in a neutral, payload-bearing state of the motion control system (e.g. as defined supra). Moreover, such distances, angles, relative positions, etc. may also be understood as being valid at a mid-range position of the motion control system, e.g. as described supra. Furthermore, such distances, angles, relative locations, etc. may also be broadly understood as being valid throughout the entire operating range of the motion control system.

The motion control system may comprise a first motion control device. The first motion control device may movably interconnect the driven frame portion and the driving frame portion. Similarly, the motion control system may comprise a second motion control device. The second motion control device may movably interconnect the driven frame portion and the driving frame portion. At least one of the first motion control device and the second motion control device may constitute a component of the motion control system. The motion control system may consist (exclusively) of the first motion control device and the second motion control device. The first motion control device may be located above the second motion control device. As such, a location of (at least one of an uppermost portion and a lowermost portion of) the first motion control device may be higher than a location of (an uppermost portion of) the second motion control device as measured in a vertical direction. The first motion control device may (pivotally/rigidly) connect to the driving frame portion at a first location. The second motion control device may (pivotally/rigidly) connect to the driving frame portion at a second location that is a fixed distance from the first location.

The motion control system may be configured such that (regardless of a position/operating state of the motion control system) at least one of the first motion control device and the second motion control device is under tension whenever a forward acceleration is imparted onto the driving frame portion (at the second rotational axis). Similarly, the motion control system may be configured such that (regardless of a position/operating state of the motion control system) at least one of the first motion control device and the second motion control device is under compression whenever a forward acceleration is imparted onto the driving frame portion (at the second rotational axis).

The motion control system may be a 4-bar linkage. A portion of the driven frame portion may constitute a first bar of the 4-bar linkage, the first motion control device may constitute a second bar of the 4-bar linkage, a portion of the driving frame portion may constitute a third bar of the 4-bar linkage, and the second motion control device may constitute a fourth bar of said 4-bar linkage.

The first motion control device and/or the second motion control device may comprise at least one rigid link. The rigid link may have the (general) shape of straight (flat) bar or the (general) shape of an "L". In the case of an "L"-shaped rigid link, the rigid link may be pivotally connected to the driven/driving frame portion at the (major) corner of the "L". The rigid link may be "rigid" in the sense that a distance between a connection of the rigid link to the driven frame portion and a connection of the rigid link to the driving frame portion is invariable, does not vary by more than 5%, or does not vary by more than 1% (when the vehicle is subject to (typical) use). The rigid link may have a length (between connection points) of at least 8 cm, at least 10 cm, at least 15 cm or at least 20 cm. The rigid link may have a length (between connection points) of not more than 10 cm, not more than 15 cm, not more than 20 cm or not more than 25 cm. The rigid link may have a width (perpendicular to the length) of at least 2 cm, at least 3 cm or at least 4 cm. The rigid link may have a width (perpendicular to the length) of not more than 5 cm, not more than 8 cm or not more than 10 cm. The rigid link may have a thickness (perpendicular to the length and the width) of at least 2 mm, at least 3 mm or at least 5 mm. The rigid link may have a thickness (perpendicular to the length and the width) of not more than 5 mm, not more than 10 mm or not more than 20 mm.

The motion control system may be configured such that a longitudinal axis of the rigid link, e.g. an axis between two connection points of the rigid link (to the frame of the vehicle), remains aligned with an imaginary straight line through (a center of) the first axle support, e.g. the driving axle, and the driven axle over at least 20%, at least 30% or at least 40% of a range of travel of the motion control system. In the present context, "aligned" may be understood as stipulating that the longitudinal axis of the rigid link is skewed from the imaginary straight line (through (the center of) the first axle support and the driven axle) by no more than 5°, no more 10° or no more than 20° (if at all). In the present context, "aligned" may alternatively/additionally be understood as stipulating that the longitudinal axis of the rigid link is offset from the imaginary straight line (through (the center of) the first axle support and the driven axle) by no more than 1 cm, no more than 2 cm, no more than 3 cm or no more than 5 cm. The at least 20%, at least 30% or at least 40% of the range of travel of the motion control system may include the neutral, payload-bearing state as described infra.

The motion control system may comprise at least one pair of parallel rigid links in mirror symmetric arrangement with respect to a major plane of symmetry of the vehicle. Each rigid link of the at least one pair of parallel rigid links may be offset from a major plane of symmetry of the vehicle by at least 2 cm, by at least 3 cm or by at least 4 cm. Each rigid link of the at least one pair of parallel rigid links may pivot in a plane offset from the major plane of symmetry of the vehicle by at least 2 cm, by at least 3 cm or by at least 4 cm.

One rigid link of a pair of parallel rigid links may be at least 50%, at least 100% or at least 200% stronger than the other rigid link of the pair. In the present context, 50%/100%/200% stronger may be understood as meaning that the one rigid link can endure (e.g. without permanent deformation) a compressive force and/or a tensioning force (in a longitudinal direction of the one rigid link and/or between two connection points of the one rigid link) of at least 1.5/2/4 times the magnitude of a maximum compressive/tensioning force (in a longitudinal direction of the other rigid link and/or between two (corresponding) connection points of the other rigid link) that the other rigid link can endure (e.g. without permanent deformation). The stronger rigid link may be situated on the same side of the vehicle (relative to the major plane of symmetry of the vehicle) as a tensioned portion of the drivetrain, e.g. a tensioned portion of a chain/belt, (that transmits power from the driving axle to the driven axle).

The motion control system may comprise an asymmetric arrangement of rigid links. The motion control system may comprise, in total, an odd number of rigid links, e.g. three or five rigid links. The motion control system may comprise at least one rigid link, the vehicle being devoid of a (rigid) link parallel to (and in mirror symmetric arrangement with respect to the major plane of symmetry of the vehicle relative to) the at least one rigid link. The motion control system may comprise at least one rigid link, the vehicle being devoid of a (rigid) link in mirror symmetric arrangement to the at least one rigid link with respect to the major plane of symmetry of the vehicle. The at least one rigid link may be offset from the major plane of symmetry of the vehicle by at least 2 cm, by at least 3 cm or by at least 4 cm. The at least one rigid link may pivot in a plane offset from the major plane of symmetry of the vehicle by at least 2 cm, by at least 3 cm or by at least 4 cm.

In the case of a vehicle of the first category, the rigid link may be pivotally connected to the driven frame portion, e.g. at a location in a lowermost 30%, a lowermost 20%, a lowermost 10% or a lowermost 5% of the driven frame portion. Similarly, the rigid link may be pivotally connected to the driving frame portion, e.g. in a central 40% of the driving frame portion as determined in a horizontal direction. The rigid link may be pivotally connected to the driving frame portion at a location no more than 15 cm, no more than 10 cm, no more than 8 cm or no more than 5 cm from the opening. A pivot axis of a pivotal connection of the rigid link to the driven frame portion may be coaxial to the first rotational axis. Similarly, a pivot axis of a pivotal connection of the rigid link to the driven frame portion may be offset from the first rotational axis by no more than 8 cm, no more than 5 cm or no more than 3 cm. In the neutral, payload-bearing state, (a major longitudinal axis of) the rigid link may be horizontal, no more than 5° from horizontal or no more than 10° from horizontal. In the neutral, payload-bearing state, (a major longitudinal axis of) the rigid link may be no more than 10 cm, no more than 8 cm or no more than 5 cm from the second rotational axis in a vertical direction.

In the present disclosure, the expression "from the opening" may be understood as a distance relative to any part of the opening. Similarly, the expression "from the opening" may be understood as a distance relative to a major longitudinal axis of the structure.

For example, the motion control system of a vehicle of the first category may comprise a first rigid link as a first motion control device and a second rigid link as a second motion control device. The first rigid link may be pivotally connected to the driving frame portion, e.g. to a mount as described supra, at a location no more than 15 cm, no more than 10 cm, no more than 8 cm or no more than 5 cm from the opening and may be pivotally connected to the driven frame portion at a pivot axis that is either coaxial to the first rotational axis or offset from the first rotational axis by no more than 8 cm, no more than 5 cm or no more than 3 cm. The second rigid link may be "L"-shaped. A first end of the second rigid link may be pivotally connected to the driving frame portion at a location higher than the first rigid link and forward of the opening, e.g. no more than 10 cm, no more than 8 cm or no more than 5 cm from the opening. The (major corner of the) second rigid link may likewise be pivotally connected to the driven frame portion at a location higher than the first rigid link and forward of the opening, e.g. no more than 10 cm, no more than 8 cm or no more than 5 cm from the opening. A second end of the second rigid link may be pivotally connected to a component of an energy management system, e.g. as described infra, the second rigid link thus acting as a lever between the energy management system and the driving frame portion with the driven frame portion as a fulcrum. In the neutral, payload-bearing state, (a major longitudinal axis of) each of the first rigid link and the second rigid link may be horizontal, no more than 5° from horizontal or no more than 10° from horizontal. In the neutral, payload-bearing state, (a major longitudinal axis of) the second rigid link (between the pivotal connection to the driven frame portion and the pivotal connection to the driving frame portion) may be no more than 10 cm, no more than 8 cm or no more than 5 cm from the second rotational axis in a vertical direction.

The first motion control device and/or the second motion control device may comprise a sheet-shaped component, e.g. a leaf spring. The sheet-shaped component may constitute a flexing element. A first edge portion of the sheet-shaped component may be (pivotally/rigidly) connected to the driven frame portion, e.g. to the seat tube, and a second edge portion of the sheet-shaped component may be (pivotally/rigidly) connected to the driving frame portion. The sheet-shaped component may be (substantially) of a material selected from the group consisting of steel and carbon fiber. The sheet-shaped component may resist torsion applied to the sheet-shaped component via the first and second edge portions with a force at least five, at least ten or at least twenty times larger than a force with which the sheet-shaped component resists a bending applied to the sheet-shaped component via the first and second edge portions. In the present context, bending may be understood as a motion of the first edge portion toward the second edge portion (in a direction not coplanar with the sheet-shaped component) without altering an orientation of the first edge portion relative to the second edge portion. In the present context, torsion may be understood as a motion of the first edge portion toward the second edge portion (in a direction not coplanar with the sheet-shaped component) that alters an orientation of the first edge portion relative to the second edge portion. The sheet-shaped component may have a length (between connection portions) of at least 10 cm, at least 15 cm or at least 20 cm. The sheet-shaped component may have a length (between connection portions) of not more than 12 cm, not more than 15 cm or not more than 20 cm. The sheet-shaped component may have a width (perpendicular to the length) of at least 7 cm or at least 10 cm. The sheet-shaped component may have a width (perpendicular to the length) of not more than 10 cm or not more than 15 cm. The sheet-shaped component may have a thickness (perpendicular to the length and the width) of at least 2 mm and/or not more than 8 mm.

In the case of a vehicle of the first category, the sheet-shaped component may be (pivotally/rigidly) connected to the driven frame portion, e.g. at a location in a lowermost 30%, a lowermost 20%, a lowermost 10% or a lowermost 5% of the driven frame portion. Similarly, the sheet-shaped component may be (pivotally/rigidly) connected to the driving frame portion, e.g. in a central 40% of the driving frame portion as determined in a horizontal direction. The sheet-shaped component may be (pivotally/rigidly) connected to the driving frame portion at a location no more than 15 cm, no more than 10 cm, no more than 8 cm or no more than 5 cm from the opening. A (pivot axis of a pivotal) connection of the sheet-shaped component to the driven frame portion may be coaxial to the first rotational axis. Similarly, a (pivot axis of a pivotal) connection of the sheet-shaped component to the driven frame portion may be offset from the first rotational axis by no more than 8 cm, no more than 5 cm or no more than 3 cm. In the neutral, payload-bearing state, (a plane through the first and second edge portions of) the sheet-shaped component may be horizontal, no more than 5° from horizontal or no more than 10° from horizontal. In the neutral, payload-bearing state, (a plane through the first and second edge portions of) the sheet-shaped component may be no more than 10 cm, no more than 8 cm or no more than 5 cm from the second rotational axis in a vertical direction.

The first motion control device and/or the second motion control device may comprise at least one eccentric. The eccentric may comprise/define a first axis of rotation and a second axis of rotation, the second axis of rotation being parallel to and offset from the first axis of rotation. The second axis of rotation may be offset from the first axis of rotation by at least 1 cm and/or by no more than 8 cm. The eccentric (or a portion of the eccentric) may be rotatably mounted on/rotatably connected to the driven frame portion, e.g. such that a location of the first axis of rotation is fixed relative to at least one component of the driven frame portion. Similarly, (a portion of) the eccentric may be rotatably mounted on/rotatably connected to the driving frame portion, e.g. such that a location of the second axis of rotation is fixed relative to at least one component of the driving frame portion. A distance between the first and second axis of rotation may be at least 4 cm, at least 6 cm or at least 8 cm. The distance between the first and second axis of rotation may be not more than 8 cm or not more than 12 cm.

The motion control system may comprise at least one pair of parallel eccentrics in mirror symmetric arrangement with respect to a major plane of symmetry of the vehicle. Each eccentric of the at least one pair of parallel eccentrics may be offset from a major plane of symmetry of the vehicle by at least 2 cm, by at least 3 cm or by at least 4 cm. Each rigid link of the at least one pair of parallel eccentrics may rotate in a plane offset from the major plane of symmetry of the vehicle by at least 2 cm, by at least 3 cm or by at least 4 cm.

The motion control system may comprise a sliding element, e.g. a component configured to slidingly engage another component (of at least one of the motion control system, the driven frame portion and the driving frame portion). The sliding element may slidingly engage the other component such that the sliding element slides parallel to a longitudinal axis of the other component. The sliding element may be/comprise a cylindrical structure and may be termed a "slider". The other component may be/comprise a (generally) tubular structure and may be termed a "sleeve". The sleeve may (at least partially) encircle/surround an outer circumference of the slider. The sleeve may comprise an inner wall that engages an outer wall of the slider. The slider may be shaped to slidingly engage the sleeve in a manner that inhibits rotation of the slider in a circumferential direction relative to (a longitudinal axis of) the sleeve. The slider may have an outer shape that, e.g. aside from fitting tolerances, matches an inner shape of the sleeve. The slider may have a constant cross-section relative to a longitudinal/sliding axis (of the slider). The sleeve may define a lumen (that (slidingly) receives the slider). The lumen may have a constant cross-section relative to a longitudinal axis (of the sleeve)/a sliding axis (of the slider). The cross-section (of the slider/sleeve) may be a circular, oval or (rounded) polygonal, e.g. (rounded) rectangular or (rounded) triangular, cross-section. The slider may extend into/through the lumen of the sleeve, e.g. along a longitudinal axis of the sleeve.

In particular in the case of a vehicle of the first category, the slider may be (pivotally/rigidly) connected to the driving frame portion, the sleeve being (rigidly/pivotally, i.e. in a manner opposite to the slider) connected to the driven frame portion. Similarly, the slider may be (pivotally/rigidly) connected to the driven frame portion the sleeve being (oppositely, i.e. rigidly/pivotally) connected to the driving frame portion. In the present context "rigidly connected" can be understood as encompassing embodiments in which the "rigidly connected" components are integrally formed. The sleeve/slider may be rigidly connected to the driven frame portion such that the sliding axis is at an (acute) angle of at least 5° and/or of no more than 30° from a major longitudinal axis of the driven frame portion. The sleeve/slider may be rigidly connected to the driving/driven frame portion such that the sliding axis is at an (acute) angle of at least 40° and/or of no more than 85° from horizontal. The sliding axis may be angled to slope downwardly to the front. The sleeve/slider may be (pivotally/rigidly) connected to a lowermost 40%, a lowermost 30% or a lowermost 20% of the driven frame portion. The sleeve/slider may be (pivotally/rigidly) connected to a lowermost 20% or a lowermost 10% of the driving frame portion. The sleeve/slider may be (pivotally/rigidly) connected to the driving frame portion at a location no more than 10 cm from/forward of the opening.

The sleeve/slider may comprise a first (circular) protrusion and a second (circular) protrusion (diametrically opposite the first protrusion). The driving/driven frame portion may (pivotally) connect to at least one of the first and second protrusions. For example, the driving/driven frame portion may comprise at least one (circular) opening/hollow configured to (rotatably) engage the first/second protrusion. Similarly, the sleeve/slider may comprise a first (circular) opening/hollow and a second (circular) opening/hollow (diametrically opposite the first opening/hollow). The driving/driven frame portion may comprise at least one (circular) protrusion configured to (rotatably) engage the first/second protrusion.

A portion of the slider that slidingly engages the sleeve may have a length of at least 8 cm, at least 12 cm or at least 16 cm. The length may be measured in a direction/along a path parallel to a longitudinal axis of the sleeve. The portion of the slider that slidingly engages the sleeve may have a (minimum) diameter of at least 3 cm, at least 6 cm, at least 9 cm or at least 12 cm. The diameter may be measured from a first location on a wall/surface of the slider that slidingly engages the sleeve to a second location on the wall/surface of the slider that slidingly engages the sleeve. The first location may be opposite the second location. For example, the second location may be located at an intersection of the wall/surface and a line that passes through the first location and is perpendicular to a plane tangent to the wall/surface at the first location.

The motion control system may comprise a sliding element and at least one rigid link, e.g. at least one rigid link as described above. The rigid link may be pivotally connected to the driven frame portion at a first connection point and be pivotally connected to the driving frame portion at a second connection point such that an (acute) angle between the sliding axis and an imaginary straight line through the first and second connection points is no less than 45°, e.g. no less than 65°.

In the case of a vehicle of the first category, the rigid link may be pivotally connected to a lowermost 40%, a lowermost 30% or a lowermost 20% of the driven frame portion. The rigid link may be pivotally connected to the driving frame portion no more than 20 cm, no more than 15 cm or no more than 10 cm from the opening. Similarly, the rigid link may be pivotally connected to the driving frame portion no more than 20 cm, no more than 15 cm or no more than 10 cm from a major longitudinal axis of the driven frame portion. The sliding element and the rigid link may be configured such the seat support moves forward (relative to the frame and/or the first/driving axle support) in response to a motion of the driven frame portion toward the first end-of-range position/operating state (from the neutral, payload-bearing state).

In the case of a vehicle of the first category, the motion control system may comprise a bushing and a rigid link. The bushing may be fastened to the driving frame portion. For example, the bushing may be located in an uppermost 30%, an uppermost 20%, or an uppermost 10% of the seat tube. The bushing may be located no more than 10 cm, no more than 8 cm or no more than 5 cm from an intersection of a top tube and a seat post. The bushing may be a slide bushing and may slidably receive a portion of the driven frame portion, e.g. a portion of the structure/assembly. Similarly, the bushing may be an elastomeric bushing and may elastically interconnect the driving frame portion and the driven frame portion. The bushing may constrain a range of motion of (the received portion of) the driven frame portion in a horizontal direction (to within 1 mm). The rigid link may be pivotally connected to the driven frame portion, e.g. at a location in a lowermost 20%, a lowermost 10% or a lowermost 5% of the driven frame portion. A pivot axis of a pivotal connection of the rigid link to the driven frame portion may be coaxial to the first rotational axis. Similarly, a pivot axis of a pivotal connection of the rigid link to the driven frame portion may be offset from the first rotational axis by no more than 8 cm, no more than 5 cm or no more than 3 cm. The rigid link may be pivotally connected to the driving frame portion, e.g. at a location in a lowermost 20%, a lowermost 10% or a lowermost 5% (of a down tube) of the driving frame portion. The rigid link may be pivotally connected to the driving frame portion at a location forward of a rear terrain-engaging component and/or forward of a seat tube of the driving frame portion, e.g. at a location no more than 20 cm, no more than 15 cm or no more than 10 cm from the rear terrain-engaging component/the seat tube. The rigid link may be pivotally connected to the driving frame portion at a location forward and upward of the (first) rotational axis, e.g. at a location no more than 20 cm, no more than 15 cm or no more than 10 cm from the (first) rotational axis. The rigid link may rotate (on bearings) on a (radially outward-facing) surface of a structure that engages a chain/belt of the drivetrain. The surface (and/or the bearings on which the rigid link rotates on the surface) may be situated more distant from a major plane of symmetry of the vehicle than bearings of a bottom bracket and/or (of a driving axle) of a motor (that provides driving power to the vehicle). The surface and/or the bearings may be situated less distant from a major plane of symmetry of the vehicle than a crankarm of the drivetrain. The surface and/or the bearings may be situated coplanar with and/or radially outward of toothing engaged by a gear of (a gearbox driven by) a motor (that provides driving power to the vehicle).

The motion control system may comprise at least one clutch, e.g. a clutch that influences (the freedom of) motion of the driven frame portion relative to the driving frame portion, e.g. by exerting a (frictional) force on the driven frame portion and/or the driving frame portion. For example, the clutch may inhibit, with a (frictional) force not more than a first force, motion of the driven frame portion relative to the driving frame portion that moves the motion control system in a direction of the second end-of-range position/operating state. Similarly, the clutch may inhibit, with a (frictional) force not less than a second force, motion of the driven frame portion relative to the driving frame portion that moves the motion control system in a direction of the first end-of-range position/operating state. The second force may be larger than the first force, e.g. at least two times as large, at least five times as large or at least ten times as large.

The magnitude of the (frictional) force with which the clutch inhibits motion of the driven frame portion relative to the driving frame portion (that moves the motion control system in a direction of the first end-of-range position/operating state) may depend on a force exerted on the driven frame portion as a result (of an acceleration) of a (total) mass supported by the driven frame portion. As such, the clutch may comprise an active, e.g. electronic, and/or passive, e.g. mechanical, mechanism that alters (the configuration of the clutch to alter) the magnitude of the (frictional) force with which the clutch inhibits motion of the driven frame portion relative to the driving frame portion (that moves the motion control system in a direction of the first end-of-range position/operating state), e.g. as a function of a force exerted on the driven frame portion as a result (of an acceleration) of a (total) mass supported by the driven frame portion. For example, the clutch may comprise at least one sensor that senses a vehicle characteristic indicative of a weight born by the driven frame portion, e.g. the assembly/structure/payload support (structure). The sensor may sense an angular or linear displacement of a component of the motion control system, e.g. relative to another component of the motion control system and/or relative to the driven and/or driving frame portion. Similarly, the sensor may sense a stress imparted on a component of the motion control system. The sensor may output a sensor signal (indicative of a weight born by the driven frame portion) to an electronic mechanism that alters (the configuration of the clutch to alter) the magnitude of the (frictional) force with which the clutch inhibits motion of the driven frame portion relative to the driving frame portion as a function of the sensor signal.

The magnitude of the (frictional) force with which the clutch inhibits motion of the driven frame portion relative to the driving frame portion (that moves the motion control system in a direction of the first end-of-range position/operating state) may depend on a drivetrain force, e.g. on a tensioning force imparted on a chain/belt of the drivetrain. As such, the clutch may comprise an active, e.g. electronic, and/or passive, e.g. mechanical, mechanism that alters (the configuration of the clutch to alter) the magnitude of the (frictional) force with which the clutch inhibits motion of the driven frame portion relative to the driving frame portion (that moves the motion control system in a direction of the first end-of-range position/operating state), e.g. as a function of such a drivetrain force. For example, the clutch may comprise at least one sensor that senses a vehicle characteristic indicative of such a drivetrain force. The sensor may be biased (e.g. by a spring) against a drivetrain component, e.g. a chain/belt, a magnitude of a force exerted against the sensor by the drivetrain component and/or an amount of displacement of the sensor (against the biasing force) being indicative of the drivetrain force. The sensor may output a (mechanical and/or electronic) sensor signal (indicative of a magnitude of a force exerted against the sensor by the drivetrain component and/or an amount of displacement of the sensor) to a mechanism that alters (the configuration of the clutch to alter) the magnitude of the (frictional) force with which the clutch inhibits motion of the driven frame portion relative to the driving frame portion as a function of the sensor signal.

At least 80%, at least 90% or (substantially) an entirety of the motion control system, e.g. of at least one of the first motion control device and the second control device, (by volume and/or by weight) may be a material selected from the group consisting of steel, aluminum and carbon fiber. Similarly, at least 80%, at least 90% or (substantially) an entirety of at least one of the first motion control device and the second control device (by volume and/or by weight) may be a material selected from the group consisting of steel, aluminum and carbon fiber. For example, an entirety of the motion control system/first motion control device/second motion control device may be of such a material except bushings and/or thread elements, e.g. for interconnecting the driven/driving frame portion with other structures of the vehicle. Such bushings and/or thread elements may demand wear characteristics and/or machining tolerances not achievable with aluminum or carbon fiber.

The vehicle may comprise a drivetrain tensioning device, e.g. a chain/belt tensioning device. The drivetrain tensioning device may comprise a spring and/or a roller. The spring may (resiliently) bias the roller against a drivetrain element, e.g. against a chain or belt. The drivetrain tensioning device may comprise an arm (portion) that act as the spring. The drivetrain tensioning device may be connected to (the driving/driven frame portion (exclusively) via) the first motion control device and/or the second motion control device. The drivetrain tensioning device may be connected to the first/second motion control device such that at least a portion of the drivetrain tensioning device moves in conjunction with the first/second motion control device. As such, a position (of the roller) of drivetrain tensioning device may be dependent on a position of the first/second motion control device. The drivetrain tensioning device may be connected to the first/second motion control device such that a magnitude of a (biasing) force imparted by the drivetrain tensioning device against the drivetrain element is dependent on a position of the first/second motion control device. The drivetrain tensioning device may be connected to the first/second motion control device such that a magnitude of a (biasing) force imparted by the drivetrain tensioning device against the drivetrain element increases as the motion control system moves in a direction of the second end-of-range position/operating state. Similarly, the drivetrain tensioning device may be connected to the first/second motion control device such that a magnitude of a (biasing) force imparted by the drivetrain tensioning device against the drivetrain element decreases as the motion control system moves in a direction of the second end-of-range position/operating state.

The vehicle may comprise a chain guard and/or a mudguard. The chain guard and/or mudguard may be connected to (the driving/driven frame portion (exclusively) via) the first motion control device and/or the second motion control device.

The motion control system may movably interconnect the driven frame portion and the driving frame portion such that motion of the driving frame portion relative to the driven frame portion is restricted to substantially in-plane motion. For example, motion of the driving frame portion relative to the driven frame portion may be restricted to a plane orthogonal to a (first) axis of rotation defined by the (driving) axle support. Similarly, motion of the driving frame portion relative to the driven frame portion may be restricted to a (major) plane of symmetry of the driven frame portion.

Motion of the driving frame portion relative to the driven frame portion may be restricted (by the motion control system) to such in-plane motion by at least one of the sliding element, the sheet-shaped component, the eccentric and the rigid link. For example, motion of the driving frame portion relative to the driven frame portion may be restricted (by the motion control system) to such in-plane motion by virtue of a relative shape of the sliding element to the aforementioned other component (of at least one of the motion control system, the driven frame portion and the driving frame portion) slidingly engaged by the sliding element. As touched upon above, the sliding element may have a (partially) oval or (rounded) polygonal cross-section (that slidingly engages the other component). Similarly, the motion of the driving frame portion relative to the driven frame portion may be restricted to such in-plane motion by (virtue of) the at least one pair of parallel rigid links in mirror symmetric arrangement with respect to a major plane of symmetry of the vehicle.

The forward acceleration of the driving frame portion (e.g. resulting from a (terrain-engaging) driving force imparted by a terrain-engaging component supported by the driving frame portion) may, e.g. in the neutral, payload-bearing state, impart a first force onto a component of the motion control system, e.g. onto the first motion control device, and/or a second force onto the second motion control device. (The motion control system may be configured and arranged such that) an obstacle-avoiding motion of the driving frame portion, e.g. in the neutral, payload-bearing state, may impart a third force onto component of the motion control system, e.g. onto the first motion control device, that is (orthogonal or) no more than 45°, no more than 30°, no more than 20° or no more than 15° from perpendicular to the first force. Similarly, (the motion control system may be configured and arranged such that) an obstacle-avoiding motion of the driving frame portion, e.g. in the neutral, payload-bearing state, may impart a fourth force onto the second motion control device that is (orthogonal or) no more than 45°, no more than 30°, no more than 20° or no more than 15° from perpendicular to the second force.

The vehicle (of the first or second category) may comprise an energy management system. The energy management system may be (at least partially) interposed between the driven frame portion and the driving frame portion. The energy management system may be (interposed between the driven frame portion and the driving frame portion by being) (pivotally) connected to the driven frame portion (at at least one connection point) and may be (pivotally) connected to the driving frame portion (at at least one connection point).

As touched upon supra, in the case of a vehicle of the first category, the energy management system may be a constituent component of the structure/assembly. The energy management system may be (interposed between the driven frame portion and the driving frame portion by being) (pivotally) connected to the driven frame portion (at at least one connection point) and may be (pivotally) connected to the first/second motion control device (at at least one connection point), which first/second motion control device may be (pivotally) connected to the driving frame portion (at at least one connection point). For example, (one end of) the energy management system may be (pivotally) connected to the driven frame portion and (another end of) the energy management system may be (pivotally) connected to a first end of the first/second motion control device, where a second end of the first/second motion control device may be (pivotally) connected to the driving frame portion and an intermediate portion of the first/second motion control device intermediate the first and second ends may be (pivotally) connected (in the manner of a fulcrum) to the driven frame portion, the first/second motion control device thus acting as a lever (that transfers forces between the energy management system and the driving frame portion).

The energy management system may (directly/indirectly) impart forces (of user-adjustable magnitude) on the driven frame portion and the driving frame portion that define, inter alfa, the neutral, payload-bearing state. The energy management system may be configured such that the vehicle, in the neutral, payload-bearing state, exhibits in the range of 15% to 35% sag. The energy management system may be configured such that, when the vehicle is in a neutral (i.e. non-dynamic), unladen state, the motion control system adopts the first end-of-range position/operating state. In other words, the first end-of-range position/operating state may correspond to the neutral, unladen state of the vehicle.

The energy management system may influence an exchange of kinetic energy between the driven frame portion and the driving frame portion. The energy management system may effect a time delay in a transfer of kinetic energy from the driven frame portion to the driving frame portion. Similarly, the energy management system may effect a time delay in a transfer of kinetic energy from the driving frame portion to the driven frame portion. The energy management system may receive a first amount of kinetic energy from the driven frame portion and/or the driving frame portion and output, in total in response to the receipt of the first amount of kinetic energy, a second amount of kinetic energy (with a time delay) to the driven frame portion and/or the driving frame portion, the second amount of kinetic energy being less than the first amount. The energy management system may dissipate an amount of energy equal to a difference between the first amount of kinetic energy and the second amount of kinetic energy as heat. The energy management system may be a (purely) mechanical system. The energy management system may be a (purely) passive system.

The energy management system may comprise a shock absorber. The shock absorber may interconnect/be interposed between the driven frame portion and the driving frame portion, e.g. in the manner described above for the (overall) energy management system. The shock absorber may be configured such that a shortening/lengthening of a distance between a pivot axis at/via which the shock absorber is linked to the driving frame portion and a pivot axis at/via which the shock absorber is linked to the driven frame portion induces (shock absorbing, linear) travel of the shock absorber.

An operating state exhibited by the energy management system when no external forces (that would induce a (substantial) change in operating state) are applied to the energy management system may be termed a "neutral state". Similarly, the neutral state may be an operating state in which the energy management system stores no potential energy (that can be converted by the energy management system into kinetic energy). In the present disclosure, the "neutral state" of the energy management system may likewise be understood as the non-dynamic operating state adopted by the energy management system when the vehicle is in the neutral, payload-bearing state. As such, the energy management system, in the neutral, payload-bearing state, may store (substantially) no potential energy other than the energy imparted by the payload as the vehicle transitions from the first end-of-range position/operating state to the neutral, payload-bearing state, which potential energy is not lastingly released until the payload is removed/the user dismounts.

The motion control system and the energy management system may be configured such that (the (inherently) limited range of motion of) the motion control system restricts motion of the energy management system to within the (designed/permissible) range of travel of the energy management system. Similarly, the energy management system may limit the range of motion of the motion control system. The energy management system may comprise a (first) chamber/reservoir, a size of the (first) chamber/reservoir restricting an amount of a fluid/liquid that can be transferred into the (first) chamber/reservoir (e.g. via a conduit) in response to a change of state of the energy management system, e.g. in response to a motion of the motion control system. As such, the size of the (first) chamber/reservoir may limit the range of motion of the motion control system. The energy management system may comprise a (second) chamber/reservoir. The (second) chamber/reservoir may be in (selective) fluid connection with the (first) chamber/reservoir, e.g. via a valve. The combined size of the first and second chambers/reservoirs may limit the range of motion of the motion control system when the first and second chambers/reservoirs are in fluid connection. The range of motion of the motion control system when the first and second chambers/reservoirs are not in fluid connection, e.g. when the valve is closed, may be less that the range of motion of the motion control system when the first and second chambers/reservoirs are in fluid connection, e.g. when the valve is open.

The energy management system may comprise at least one material and/or component that absorbs and stores energy, i.e. converts kinetic energy into potential energy, e.g. by elastic deformation, as the energy management system transitions to a first operating state different from the neutral state. The material may be an elastic material. The component may be a (steel/air) spring. The energy management system may comprise a chamber, an amount of fluid in the chamber altering a position (of an end) of the (steel/air)

spring and/or a biasing force exerted against the (steel/air) spring. The vehicle may comprise a pump, an operation of the pump altering the amount of fluid in the chamber. The (at least one material and/or component of the) energy management system may be configured to convert the stored (potential) energy into kinetic energy as the energy management system transitions to the neutral state from the first operating state. More generally, the energy management system may comprise at least one material and/or component that converts kinetic energy into potential energy as the energy management system transitions to any operating state (within the range of travel of the energy management system) different from the neutral state, which at least one material and/or component converts said potential energy into kinetic energy as the energy management system transitions to the neutral state from said any operating state. The energy management system may comprise at least one material and/or component that converts kinetic energy into potential energy as the energy management system transitions "away from" the neutral state, i.e. from any operating state (within the range of travel of the energy management system) to any other (within the range of travel of the energy management system) more removed from the neutral state, which at least one material and/or component converts said potential energy into kinetic energy as the energy management system transitions "toward" the neutral state, i.e. to said any operating state from said any other operating state. For the sake of conciseness, such conversion of kinetic energy to potential energy and such conversion of potential energy into kinetic energy will be termed "lossless conversion" as a shorthand notation.

Similarly, the energy management system may comprise at least one material and/or component that converts kinetic energy into heat as the energy management system transitions to a first operating state different from the neutral state. The material may be a (viscous) oil. The component may be/comprise a friction surface. The component may be/comprise a nozzle. The (at least one material and/or component of the) energy management system may be configured to convert kinetic energy into heat as the energy management system transitions to the neutral state from the first operating state. More generally, the energy management system may comprise at least one material and/or component that converts kinetic energy into heat as the energy management system transitions to any operating state (within the range of travel of the energy management system) different from the neutral state, which at least one material and/or component may moreover convert kinetic energy into heat as the energy management system transitions to the neutral state from said any operating state. The energy management system may comprise at least one material and/or component that converts kinetic energy into heat as the energy management system transitions "away from" the neutral state, i.e. from any operating state (within the range of travel of the energy management system) to any other (within the range of travel of the energy management system) more removed from the neutral state, which at least one material and/or component may moreover convert kinetic energy into heat as the energy management system transitions "toward" the neutral state, i.e. to said any operating state from said any other operating state. For the sake of conciseness, such conversion of kinetic energy to heat will be termed "lossy conversion" as a shorthand notation.

A ratio of lossless conversion to overall (i.e. lossy plus lossless) conversion exhibited by the energy management system may depend, inter alia, on an operating state of the energy management system, e.g. on a "distance" of the instant operating state from the neutral state (in terms of travel) and/or on whether the energy management system is transitioning "away from" or "toward" the neutral state. The ratio of lossless conversion to overall (i.e. lossy plus lossless) conversion exhibited by the energy management system may be user adjustable, e.g. by means of switches and/or dials (as known in the art). Accordingly, the ratio of lossless conversion to overall conversion exhibited by the energy management system may depend, inter alia, on a (user adjustable) mode of the energy management system.

As touched upon above, the characteristics of the energy management system may be direction dependent. For example, the characteristics of the energy management system when transitioning "away from" the neutral state may differ from characteristics of the energy management system when transitioning "toward" the neutral state. Hereinbelow, an imparting of "kinetic energy of sag-inducing motion" into the energy management system may be understood as kinetic energy imparted into the energy management system as a result of motion (of elements of the vehicle) that yields further sag, i.e. an imparting of kinetic energy into the energy management system as the energy management system transitions in a sag direction, i.e. in a direction of a state of the energy management system corresponding to (full) sag. Similarly, an imparting of "kinetic energy of motion inducing less rise" into the energy management system may be understood as kinetic energy imparted into the energy management system as a result of motion (of elements of the vehicle) that yields less rise, i.e. an imparting of kinetic energy into the energy management system as the energy management system transitions in a direction of a state of the energy management system corresponding to (full) sag. These remarks apply, mutatis mutandis, to similar expressions such as "kinetic energy of motion inducing less sag" and "kinetic energy of rise-inducing motion".

The vehicle may be configured such that, at 25% sag, at least 60%, at least 70%, at least 80% or at least 90% of kinetic energy (of sag-inducing motion) imparted, e.g. via the first and/or second rotational axis, into the energy management system is converted into potential energy. The vehicle may be configured such that, in a range of 0% to 60% sag, at least 60%, at least 70%, at least 80% or at least 90% of kinetic energy (of sag-inducing motion) imparted, e.g. via the first and/or second rotational axis, into the energy management system is converted into potential energy. The vehicle may be configured such that, in a range of 40% to 75% sag, at least 50%, at least 60%, at least 70% or at least 80% of kinetic energy (of sag-inducing motion) imparted, e.g. via the first and/or second rotational axis, into the energy management system is converted into potential energy. The vehicle may be configured such that, in a range of 70% to 90% sag, at least 30%, at least 40%, at least 50% or at least 60% of kinetic energy (of sag-inducing motion) imparted, e.g. via the first and/or second rotational axis, into the energy management system is converted into potential energy. The vehicle may be configured such that, in a range of 90% to 0% sag, e.g. a range of 70% to 0% sag, not more than 15%, not more than 10% or not more than 5% of kinetic energy (of motion inducing less sag) imparted, e.g. via the first and/or second rotational axis, into the energy management system is converted into heat.

The vehicle may comprise at least one sensor that senses a vehicle characteristic indicative of a weight born by the driven frame portion, e.g. the assembly/structure/payload support (structure). The sensor may sense an angular or linear displacement of a component of the motion control system, e.g. relative to another component of the motion control system and/or relative to the driven and/or driving frame portion. Similarly, the sensor may sense a stress imparted on a component of the motion control system. The sensor may output a sensor signal (indicative of a weight born by the driven frame portion) to a vehicle controller. The vehicle controller may control the energy management system as a function of the sensor signal such that, for a first range of payloads, e.g. for payloads in the range of 50 kg to 100 kg, the vehicle adopts (to within an accuracy of 5% or an accuracy of 10% of the full range of motion of the motion control system) a predetermined amount of sag in the neutral, payload-bearing state. For example, the vehicle controller may output a control signal, e.g. a control signal that controls an operation of a pump, a value of the control signal being a function of the sensor signal. Operation of the pump may influence the amount of fluid in a chamber of the energy management system, e.g. in a manner that, for a first range of payloads, compensates a change in payload and maintains (within a certain accuracy) a predetermined amount of sag in the neutral, payload-bearing state (by altering a position/biasing of a spring of the energy management system).

The vehicle controller may comprise a sensor system for sensing vehicle characteristics indicative of a deceleration to a stopped condition and/or an acceleration from a stopped condition. The sensor system may comprise an accelerometer. Similarly, the vehicle controller may comprise a (wireless) data interface that receives information indicative of a deceleration to a stopped condition and/or an acceleration from a stopped condition from a separate device, e.g. (via a wireless or wired connection) from a cell phone (of the user). The vehicle controller may use the sensed vehicle characteristics and/or the received information to determine whether the vehicle is nearing a stopped condition and/or has decelerated to a stopped condition. Similarly, the vehicle controller may use the sensed vehicle characteristics and/or the received information to determine whether the vehicle has accelerated from a stopped condition. The vehicle controller may control a mechanism, e.g. the energy management system, in response to a determination that the vehicle is nearing a stopped condition and/or has decelerated to a stopped condition to effect a lowering of the seat support, e.g. a lowering of the assembly/structure/payload support (structure). For example, the vehicle controller may output a control signal that controls an operation of a pump, operation of the pump influencing the amount of fluid in a chamber of the energy management system, e.g. in a manner that increases the amount of sag (by altering a position/biasing of a spring of the energy management system). Similarly, the vehicle controller may output a control signal that controls an operation of a (motor of a motor-driven) actuator, e.g. a (motor-driven) cam and/or ball screw, that effects the lowering of the seat support. Likewise, the vehicle controller may control a mechanism, e.g. the energy management system, in response to a determination that the vehicle is nearing a stopped condition and/or has decelerated to a stopped condition to effect a decrease in the overall length of a front fork of the vehicle, e.g. a lowering of the head tube/handlebars of the vehicle. For example, the vehicle controller may output a control signal that controls an operation of a pump, operation of the pump influencing the amount of fluid in a chamber of the energy management system, e.g. in a manner that decreases the overall length of a front fork of the vehicle (by altering a position/biasing of a spring of the energy management system). The vehicle controller may control a mechanism, e.g. the energy management system, in response to a determination that the vehicle has accelerated from a stopped condition to effect a raising of the seat support, e.g. a raising of the assembly/structure/payload support (structure). For example, the vehicle controller may output a control signal that controls an operation of a pump, operation of the pump influencing the amount of fluid in a chamber of the energy management system, e.g. in a manner that decreases the amount of sag (by altering a position/biasing of a spring of the energy management system). Similarly, the vehicle controller may output a control signal that controls an operation of a (motor of a motor-driven) actuator that effects the raising of the seat support. Likewise, the vehicle controller may control a mechanism, e.g. the energy management system, in response to a determination that the vehicle has accelerated from a stopped condition to effect an increase in the overall length of a front fork of the vehicle, e.g. a raising of the head tube/handlebars of the vehicle. For example, the vehicle controller may output a control signal that controls an operation of a pump, operation of the pump influencing the amount of fluid in a chamber of the energy management system, e.g. in a manner that increases the overall length of a front fork of the vehicle (by altering a position/biasing of a spring of the energy management system).

The motion control system may be configured such that a forward acceleration of the driving frame portion, e.g. a forward acceleration resulting from a driving force imparted by a wheel supported by the driving frame portion, does not reduce an obstacle-avoiding range of motion of the motion control system. In the present disclosure, the obstacle-avoiding range of motion of the motion control system may be understood as a range of motion available to the motion control system between the (respective, current) operational state (at the time of (initially) encountering a respective obstacle, e.g. a rock, log or bump) and a respective end-of-range position (to which the motion control system is constrained as discussed supra), e.g. as the motion control system transitions from the (respective, current) operational state toward the respective end-of-range position in response to a (rear) terrain-engaging component, e.g. a rear wheel, of the vehicle encountering the respective obstacle. Similarly, the obstacle-avoiding range of motion of the motion control system may be understood as a distance between the (respective, current) position (of at least one component) of the motion control system (at the time of (initially) encountering a respective obstacle) and the respective end-of-range position (of the at least one component) of the motion control system). The encountering of a respective obstacle may impart a force (on the (rear) terrain-engaging component that, in turn, imparts a force) on (the driving frame portion at) the second rotational axis in an upward and rearward direction. Moreover, the motion control system may be configured such that (such) a forward acceleration of the driving frame portion, e.g. when traveling on a (substantially) smooth surface, increases an obstacle-avoiding range of motion of the motion control system. As such, the motion control system may be configured such that a forward acceleration of the driving frame portion, e.g. when traveling on a (substantially) smooth surface, induces a movement of the motion control system toward an end-of-range position opposite the (aforementioned) end-of-range position (toward which the motion control system moves in response to a (rear) terrain-engaging component of the vehicle encountering a respective obstacle).

As touched upon above, the motion control system may be configured such that, when the driving frame portion is accelerated, e.g. by a driving force of a rear wheel supported by the driving frame portion against the ambient terrain, the motion control system adopts a state of equilibrium by virtue of a geometric arrangement of the motion control system. The motion control system may be configured to adopt/move to the state of equilibrium (by virtue of a geometric arrangement and) with the aid of an energy management device/the energy management system. Similarly, the motion control system may be configured to adopt/move to the state of equilibrium without the aid of an energy management device/the energy management system. The motion control system may be configured to adopt/move to the state of equilibrium without any elements of the vehicle (per se) providing (non-negligible) energy storage and/or (non-negligible) energy damping. The motion control system may be configured to adopt/move to the state of equilibrium without any elements of the motion control system (per se) providing (non-negligible) energy storage and/or (non-negligible) energy damping. In the present context, (non-negligible) energy storage/damping may be understood as a storage/damping of more than 1%, more than 2% or more than 5% of a kinetic energy transferred into the motion control system from the driving frame portion. The motion control system may be configured to adopt/move to the state of equilibrium without any elements of the vehicle (per se), with the exception of the flexing element, providing (non-negligible) energy storage and/or (non-negligible) energy damping. The motion control system may be configured to adopt/move to the state of equilibrium without any elements of the motion control system (per se), with the exception of the flexing element, providing (non-negligible) energy storage and/or (non-negligible) energy damping.

The motion control system may be distinct from and/or devoid of an energy management device (as described supra) such as a spring and/or fluid-based shock absorber. As such, the motion control system may be devoid of an energy storage device. The motion control system may constitute a suspension mechanism. Similarly, the motion control system may, in combination with the energy management device, constitute a suspension mechanism.

The motion control system may be configured (relative to the driven and/or driving frame portions) such that, in the (near) neutral, payload-bearing state and/or the state of equilibrium, at least 80%, at least 90% or at least 95% of a forward component of a force imparted (at the second rotational axis) into the driving frame portion, e.g. in reaction to a driving force of a wheel supported by the driving frame portion against the ambient terrain, is imparted into the driven frame portion via the motion control system.

The motion control system may be configured (relative to the driven and/or driving frame portions) such that, in the (near) neutral, payload-bearing state and/or the state of equilibrium, at least 80%, at least 90% or at least 95% of a kinetic energy imparted into the driving frame portion by a forward component of an acceleration force imparted (at the second rotational axis) into the driving frame portion, e.g. in reaction to a driving force of a wheel supported by the driving frame portion against the ambient terrain, is transmitted (without delay) to the driven frame portion (via the motion control system).

The vehicle may be configured such that, in the (near) neutral, payload-bearing state and/or the state of equilibrium, at least 70%, at least 80% or at least 90% of an upward component of a force imparted (at the second rotational axis) into the driving frame portion, e.g. in reaction to a driving force of a wheel supported by the driving frame portion against the ambient terrain, is imparted (by virtue of the motion control system) into an energy management system, e.g. in a direction that effects compression of a spring of the energy management system.

The present disclosure furthermore relates to a vehicle modification method, e.g. to a method of modifying a vehicle of the first category. The method may comprise disassembling the assembly/structure/payload support (structure), i.e. the driven frame portion, from the frame, i.e. the driving frame portion. As touched upon supra, the driven frame portion may comprise a seat support and an axle support. The method may comprise modifying the driven frame portion and (re)assembling the modified driven frame portion to the frame. Similarly, the method may comprise assembling another assembly/structure/payload support (structure), i.e. another driven frame portion, to the frame (in lieu of the driven frame portion disassembled from the frame). The modified/another driven frame portion may comprise at least one component not comprised by the driven frame portion disassembled from the frame. In the present context, the expression "at least one component not comprised by the driven frame portion disassembled from the frame" may be understood as meaning that the (disassembled) driven frame portion is/was devoid of a corresponding component. For example, the (disassembled) driven frame portion may be devoid of a motor and the modified/another driven frame portion may comprise a motor. Similarly, the expression "at least one component not comprised by the driven frame portion disassembled from the frame" may be understood as meaning that the at least one component has been modified, has been replaced, or otherwise differs from the corresponding component of the (disassembled) driven frame portion. The at least one component may be a component selected from the group consisting of a seat support, a axle support, a battery, a motor, a motor controller, and a suspension assembly. As described in detail supra, the assembling may comprise securing the modified/another driven frame portion to the frame using no more than two fastening devices. As described in detail supra, the preceding statement does not preclude the use of additional fastening devices that fasten the driven frame portion to the frame, it simply emphasizes that a mere two fastening devices may suffice to secure the driven frame portion to the frame.

The various embodiments of the present disclosure having been described above in general terms, the embodiments shown in the Figures will now be elucidated.

FIG. 1 schematically depicts a first exemplary embodiment of a vehicle 100 of the first category in accordance with the present disclosure, e.g. as described above.

In the illustrated embodiment, vehicle 100 comprises a frame 110, i.e. a driving frame portion, a front fork 150, a rear wheel 162 and a front wheel 164. Frame 110 comprises a driven axle support 112 that supports an axle of rear wheel 162, a head tube 114, a rearward portion 116 and a forward portion 118 in the form of a down tube. Frame 110 moreover comprises mounting holes 113, 115, e.g. for receiving fastening devices that secure a driven frame portion (not shown in FIG. 1) to frame 110, as well as a mount 117 that extends from rearward portion 116 to support mounting holes 115. Frame 110 furthermore comprises a mudguard 172 and a fairing 174, either of which may be integrally formed with other elements of frame 110. Front fork 150 comprises a mudguard 152 and a front axle support 154 that supports front wheel 164.

Figure 2A:
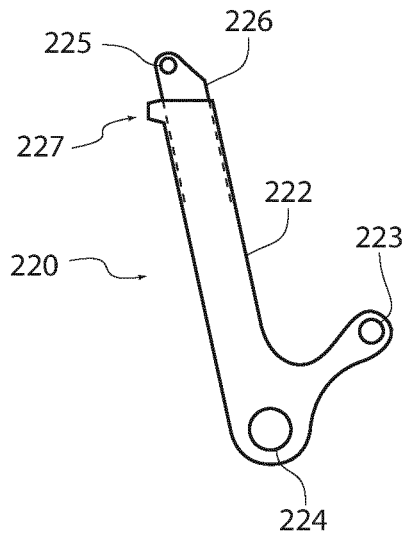
FIG. 2A a schematic depiction of a first exemplary embodiment of a payload support structure in accordance with the present disclosure.

FIG. 2A schematically depicts a first exemplary embodiment of a payload support structure 220, i.e. of a driven frame portion, in accordance with the present disclosure, e.g. as described above.

In the illustrated embodiment, payload support structure 220 comprises a seat tube 222 and a seat post 226. Seat tube 222 comprises a receptacle 223, e.g. for receiving a shaft that pivotally connects a rigid link (not shown in FIG. 2A) to payload support structure 220, a driving axle support 224, i.e. a bottom bracket, as well as a light 227. Seat post 226 comprises a mounting hole 225 for mounting a saddle (not shown) to seat post 226.

Figure 2B:
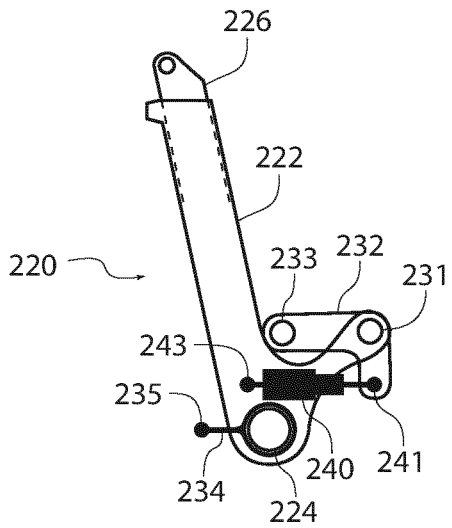
FIG. 2B a schematic depiction of the payload support structure of FIG. 2A in conjunction with an exemplary embodiment of a motion control system and an energy management system in accordance with the present disclosure.

FIG. 2B schematically depicts payload support structure 220 of FIG. 2A, i.e. of a driven frame portion, in conjunction with an exemplary embodiment of a motion control system and an energy management system 240 in accordance with the present disclosure, e.g. as described above.

In the illustrated embodiment, the motion control system comprises a first rigid link 232 and a second rigid link 234. First rigid link 232 is L-shaped and is pivotally connected to payload support structure 220 via a pivot 231 situated at the bend in L-shaped rigid link 232. First rigid link 232 is moreover pivotally connectable to the driving frame portion (not shown in FIG. 2B) via a pivot 233 situated at a first end of first rigid link 232.

A first end of energy management system 240 is pivotally connected to first rigid link 232 via a pivot 241 situated at a second end of first rigid link 232. A second end of energy management system 240 is pivotally connected to payload support structure 220 via a pivot 243. A first end of second rigid link 234 is mounted to payload support structure 220 so as to pivot around driving axle support 224. A second end of second rigid link 234 is pivotally connectable to the driving frame portion (not shown in FIG. 2B) via a pivot 235.

Figure 3A:
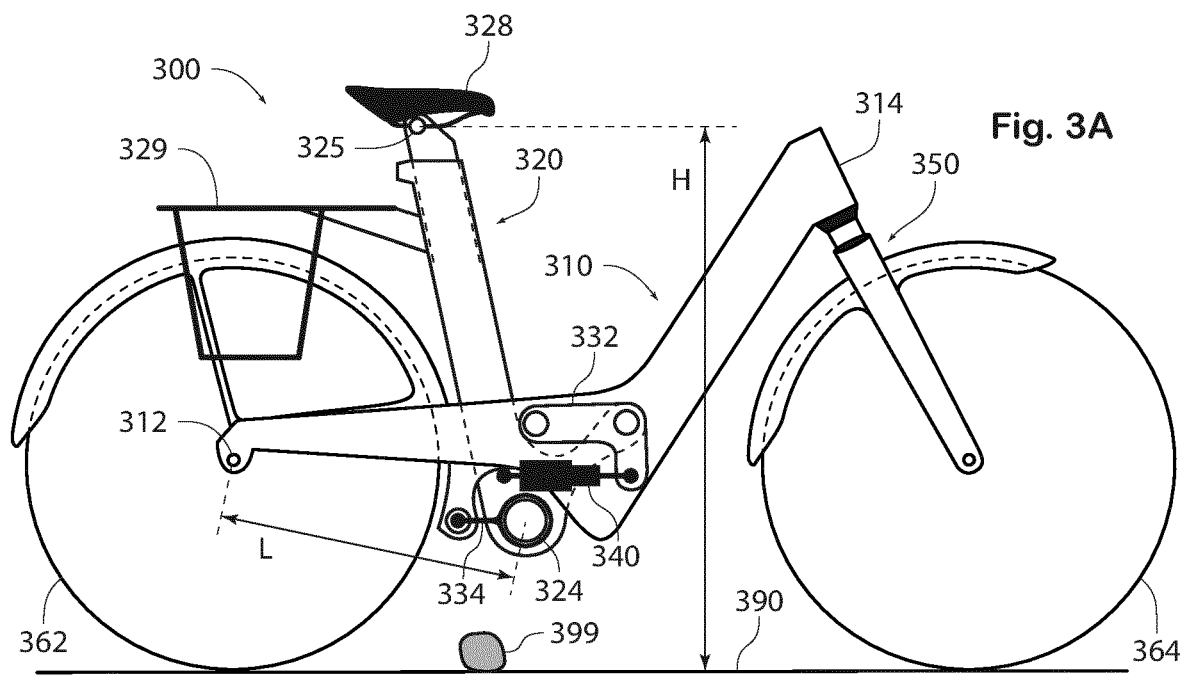
FIG. 3A a schematic depiction of a second exemplary embodiment of a vehicle of the first category in accordance with the present disclosure.

FIG. 3A schematically depicts a second exemplary embodiment of a vehicle 300 of the first category in accordance with the present disclosure, e.g. as described above.

In the illustrated embodiment, vehicle 300 comprises a frame 310 as depicted in FIG. 1, a payload support structure 320, a motion control system and an energy management system 340 as depicted in FIG. 2B, a rear fork 350, a rear wheel 362 and a front wheel 364. Frame 310 comprises a head tube 314 and a driven axle support 312 that supports an axle of rear wheel 362. Payload support structure 320 is essentially identical to payload support structure 220 depicted in FIG. 2A, albeit comprising a rack 329 and a saddle 328 in the embodiment of FIG. 3A. The motion control system comprises a first rigid link 332 and a second rigid link 334. First rigid link 332 is L-shaped and is pivotally connected to payload support structure 320 via a pivot situated at the bend in L-shaped rigid link 332. First rigid link 332 is moreover pivotally connected to a first end of energy management system 340 via a pivot situated at a first end of first rigid link 332 and is pivotally connected to frame 310 via a pivot situated at a second end of first rigid link 332. A second end of energy management system 340 is pivotally connected to first rigid link 332. A first end of second rigid link 334 is mounted to payload support structure 320 so as to pivot around driving axle support 324. A second end of second rigid link 334 is pivotally connected to frame 310.

In the operating state illustrated in FIG. 3A, vehicle 300 is traveling on level terrain 390, approaching an obstacle 399. A distance between a central axis of driven axle support 312 and a central axis of driving axle support 324 is L, and a mounting point 325 of saddle 328 is a height H above terrain 390.

Figure 3B:
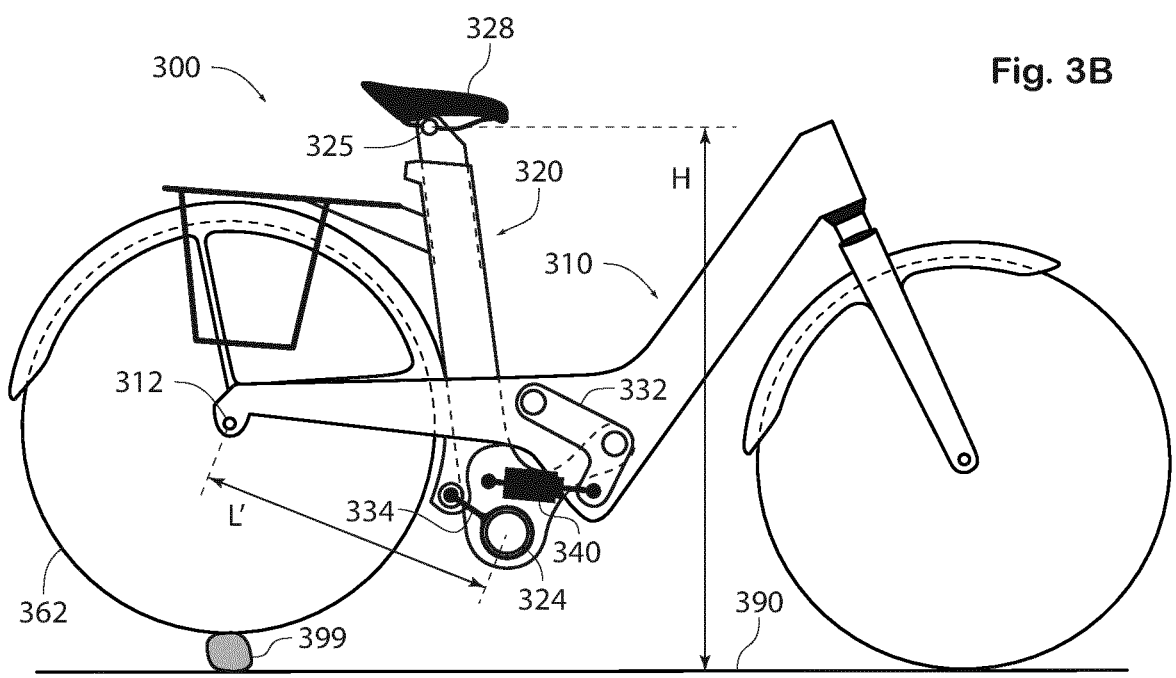
FIG. 3B a schematic depiction of the vehicle of FIG. 3A in another operating state.

FIG. 3B schematically depicts vehicle 300 of FIG. 3A in another operating state. In the operating state illustrated in FIG. 3B, rear wheel 362 of vehicle 300 is passing over obstacle 399. The motion control system allows frame 310 to move relative to payload support structure 320, thereby compressing energy management system 340 and storing potential energy. Due to the ability of frame 310 to move relative to payload support structure 320, mounting point 325 of saddle 328 remains essentially at height H above terrain 390. As such, the encounter with obstacle 399 does not substantially disrupt the inertial trajectory of the payload mass supported by payload support structure 320. To the respect that the distance between the central axis of driven axle support 312 and the central axis of driving axle support 324 changes on account of the motion of frame 310 relative to payload support structure 320 to L', the configuration of the motion control system may limit such a change in distance to less then 4 cm, less then 3 cm or less then 2.5 cm.

Figure 3C:
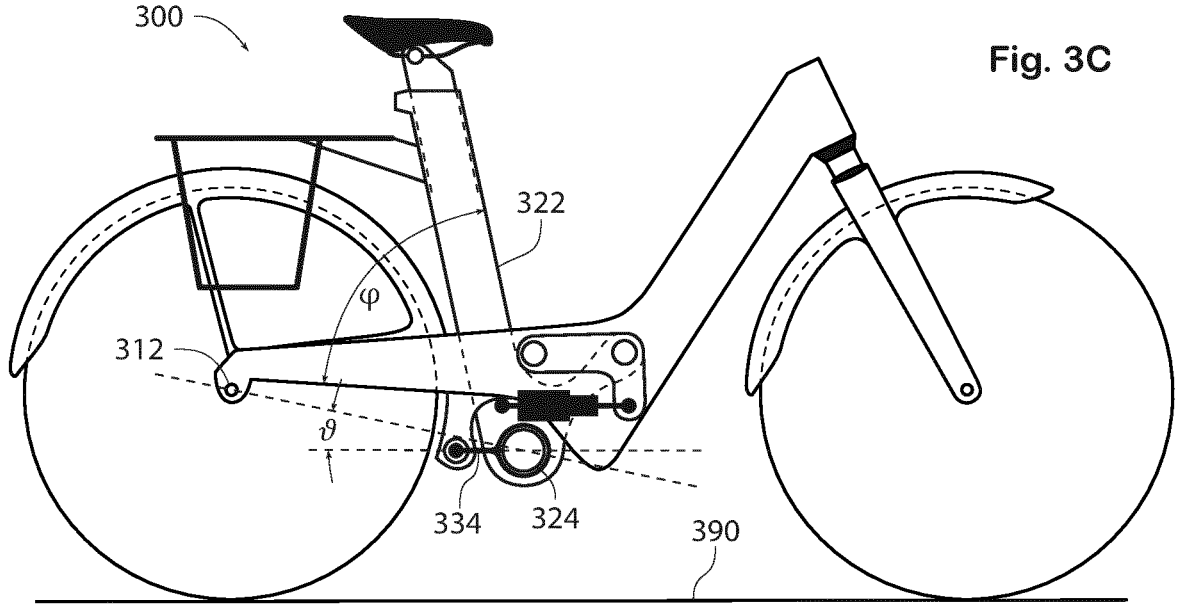
FIG. 3C a further schematic depiction of the vehicle of FIG. 3A in the operating state of FIG. 3A.

FIG. 3C schematically depicts vehicle 300 in the operating state of FIG. 3A, i.e. as vehicle 300 is traveling on level terrain 390. As depicted in FIG. 3C, a longitudinal axis of rigid link 334 is aligned (to within) 20° with an imaginary straight line through the driving axle and the driven axle in the operating state of FIG. 3A. In other words, in the operating state of FIG. 3A an angle ϑ between a longitudinal axis of rigid link 334 and an imaginary straight line through the driving axle and the driven axle is less than 20°.

Figure 3D:
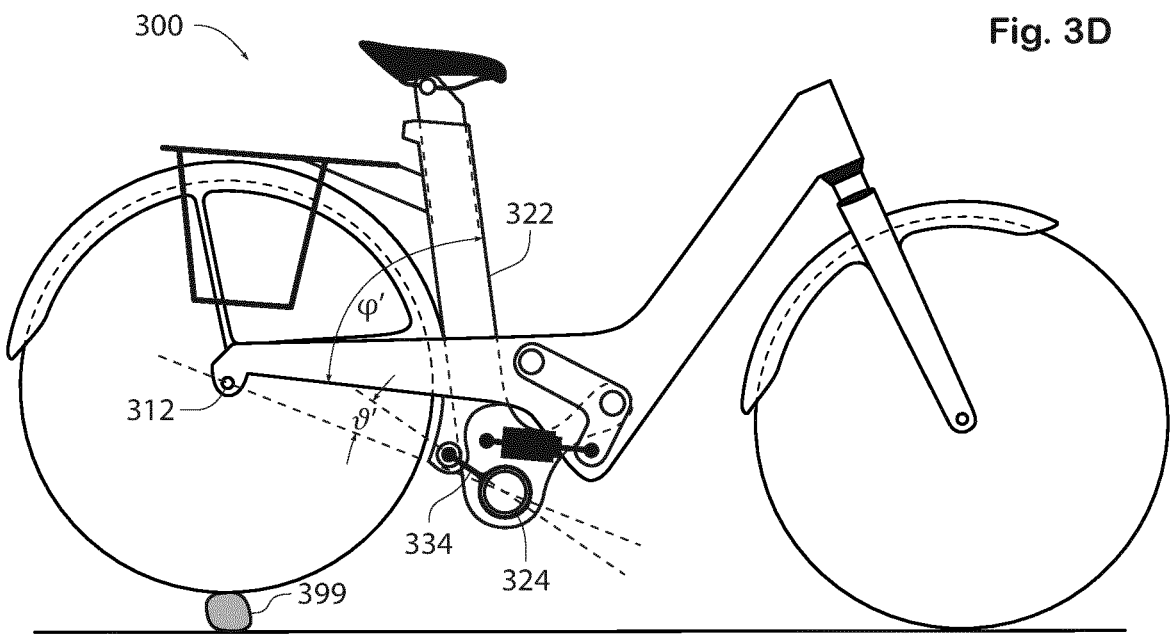
FIG. 3D a further schematic depiction of the vehicle of FIG. 3A in the operating state of FIG. 3B.

FIG. 3D schematically depicts vehicle 300 in the operating state of FIG. 3B, i.e. as rear wheel 362 of vehicle 300 is passing over obstacle 399. As depicted in FIG. 3D, a longitudinal axis of rigid link 334 is aligned (to within) 20° with an imaginary straight line through the driving axle and the driven axle in the operating state of FIG. 3B. In other words, in the operating state of FIG. 3B an angle ϑ' between a longitudinal axis of rigid link 334 and an imaginary straight line through the driving axle and the driven axle is less than 20°.

As moreover reflected in FIGS. 3C and 3D, an angle φ between a first imaginary straight line defined by the driving frame portion and a second imaginary straight line defined by the driven frame portion in the operating state of FIG. 3A differs from an angle φ' between the first imaginary straight line defined by the driving frame portion and the second imaginary straight line defined by the driven frame portion in the operating state of FIG. 38 by at least 1° and by no more than 15°. In FIGS. 3C and 3D, the first imaginary straight line is defined by a straight lower edge of the rearward portion of frame 310, and the second imaginary straight line is defined by a straight forward edge of seat tube 322.

Figure 3E:
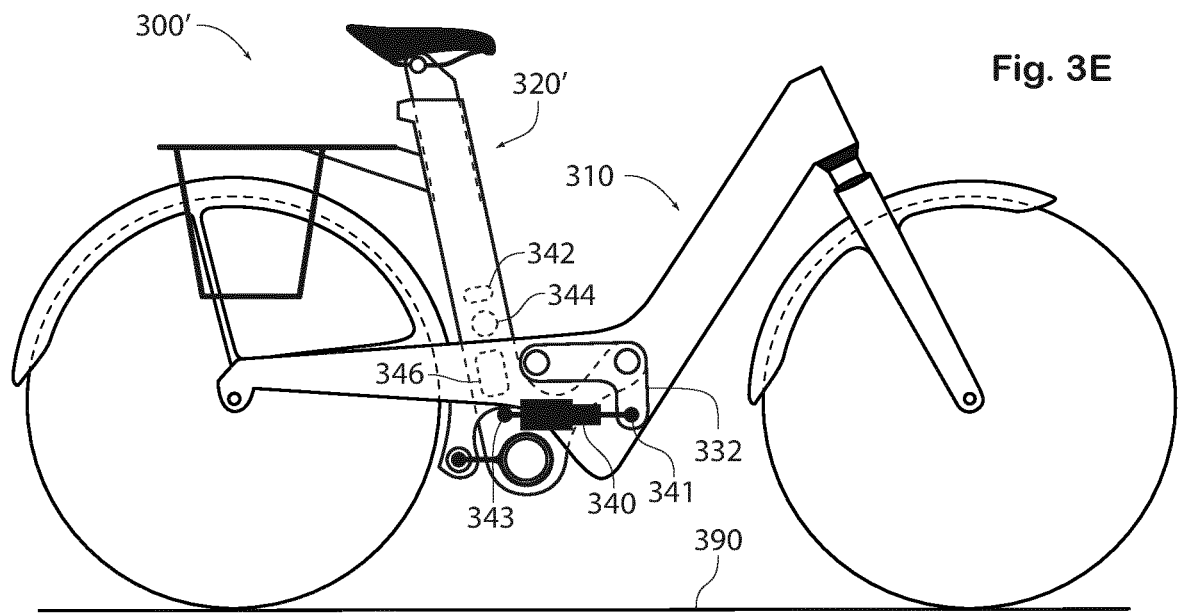
FIG. 3E a schematic depiction of the vehicle of FIG. 3A in a first operating state and comprising additional, optional features.

FIG. 3E schematically depicts the vehicle of FIG. 3A in a first operating state, albeit comprising additional, optional features.

In the illustrated embodiment, vehicle 300' differs from vehicle 300 of FIG. 3A in that payload support structure 320' additionally comprises a vehicle controller 342, a pump 344 and a reservoir 346. Vehicle controller 342 comprises an accelerometer and a wireless data interface (not shown), e.g. as described supra, that allows vehicle controller 342 to determine whether vehicle 300' is nearing a stopped condition and/or has decelerated to a stopped condition. In response to a determination that vehicle 300' is nearing a stopped condition and/or has decelerated to a stopped condition, vehicle controller 342 effects actuation of pump 344 such that fluid is pumped from a chamber of energy management system 340 via flexible conduits (not shown) to reservoir 346, thus reducing a length of energy management system 340, i.e. reducing a distance between pivot 341 and pivot 343, energy management system 340 being pivotally connected to first rigid link 332 via pivot 341 and being pivotally connected to payload support structure 320 via a pivot 343. The reduction of the length of energy management system 340, in turn, effects a lowering of payload support structure 320 toward terrain 390.

In response to a determination that the vehicle has accelerated from a stopped condition, vehicle controller 342 effects actuation of pump 344 such that fluid is pumped from reservoir 346 via flexible conduits (not shown) to the aforementioned chamber of energy management system 340, thus increasing a length of energy management system 340, i.e. increasing a distance between pivot 341 and pivot 343. The increase of the length of energy management system 340, in turn, effects a raising of payload support structure 320 away from terrain 390.

Figure 3F:
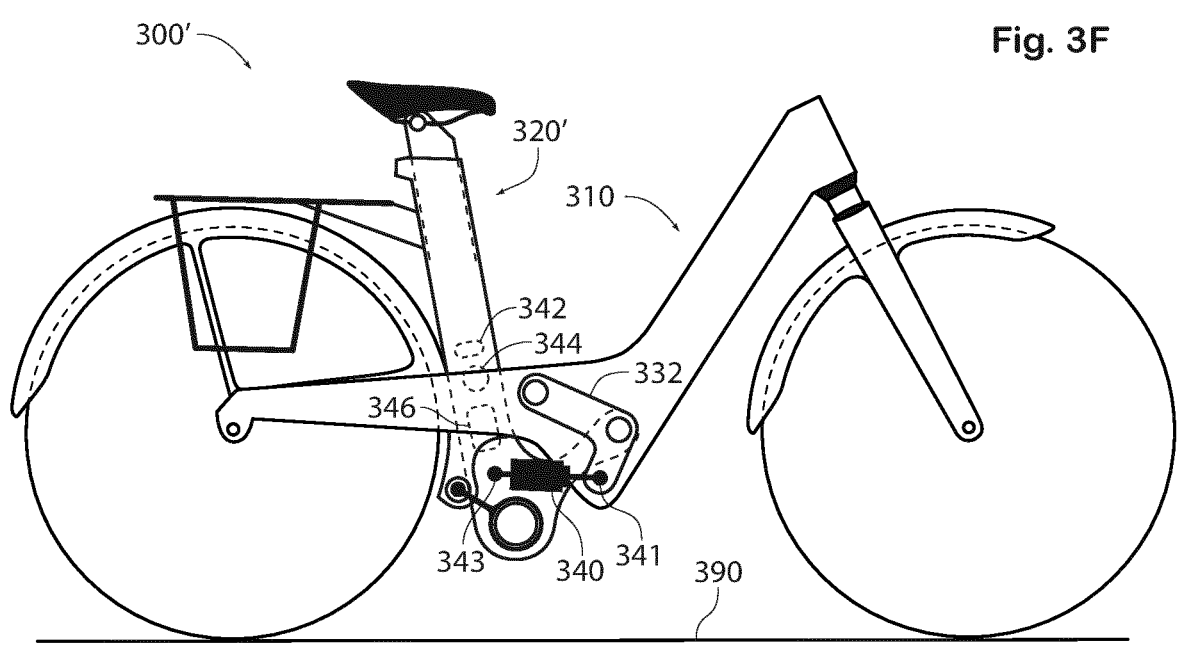
FIG. 3F a schematic depiction of the vehicle of FIG. 3E in a second operating state.

FIG. 3F schematically depicts vehicle 300' of FIG. 3E in a second operating state, i.e. a state in which payload support structure 320 has been lowered toward terrain 390 as described above.

Figure 3G:
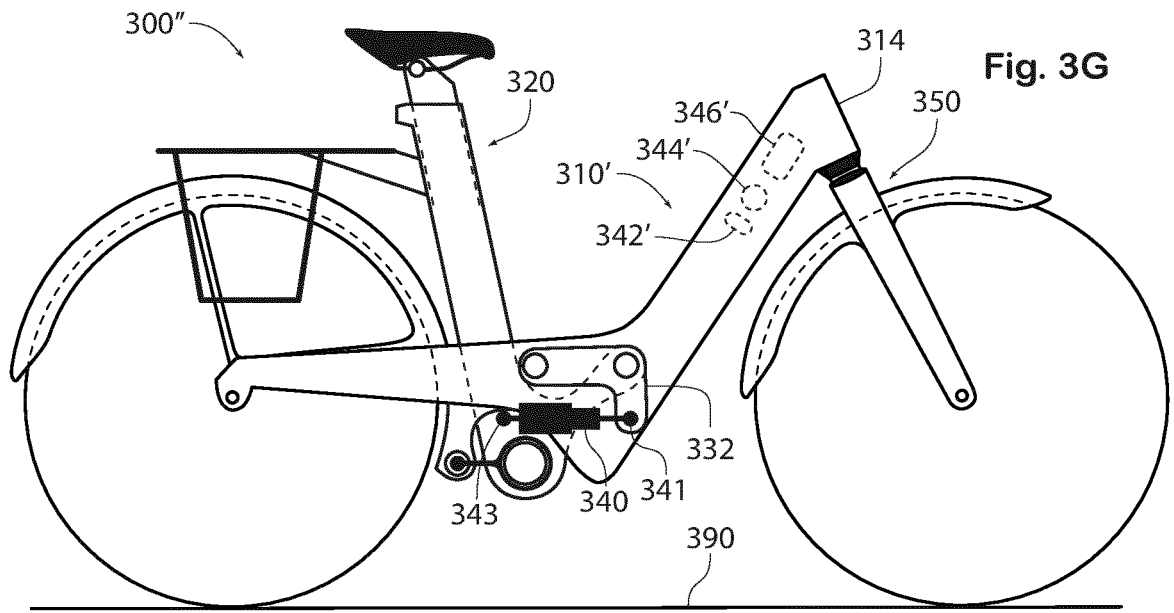
FIG. 3G a schematic depiction of the vehicle of FIG. 3A in a third operating state and comprising additional, optional features.

FIG. 3G schematically depicts the vehicle of FIG. 3A in a third operating state, albeit comprising additional, optional features.

In the illustrated embodiment, vehicle 300" differs from vehicle 300 of FIG. 3A in that frame 310' additionally comprises a vehicle controller 342', a pump 344' and a reservoir 346'. Vehicle controller 342' comprises an accelerometer and a wireless data interface (not shown), e.g. as described supra, that allows vehicle controller 342' to determine whether vehicle 300" is nearing a stopped condition and/or has decelerated to a stopped condition. In response to a determination that vehicle 300" is nearing a stopped condition and/or has decelerated to a stopped condition, vehicle controller 342' effects actuation of pump 344' such that fluid is pumped from a chamber of an energy management system/shock absorber of front fork 350' via flexible conduits (not shown) to reservoir 346', thus decreasing a length of front fork 350'. The reduction of the length of front fork 350, in turn, effects a lowering of head tube 314 toward terrain 390.

In response to a determination that the vehicle 300" has accelerated from a stopped condition, vehicle controller 342' effects actuation of pump 344' such that fluid is pumped from reservoir 346' via flexible conduits (not shown) to the aforementioned chamber of the energy management system/shock absorber of front fork 350', thus increasing a length of front fork 350' and, in turn, effects a raising of head tube 314 from terrain 390.

Figure 3H:
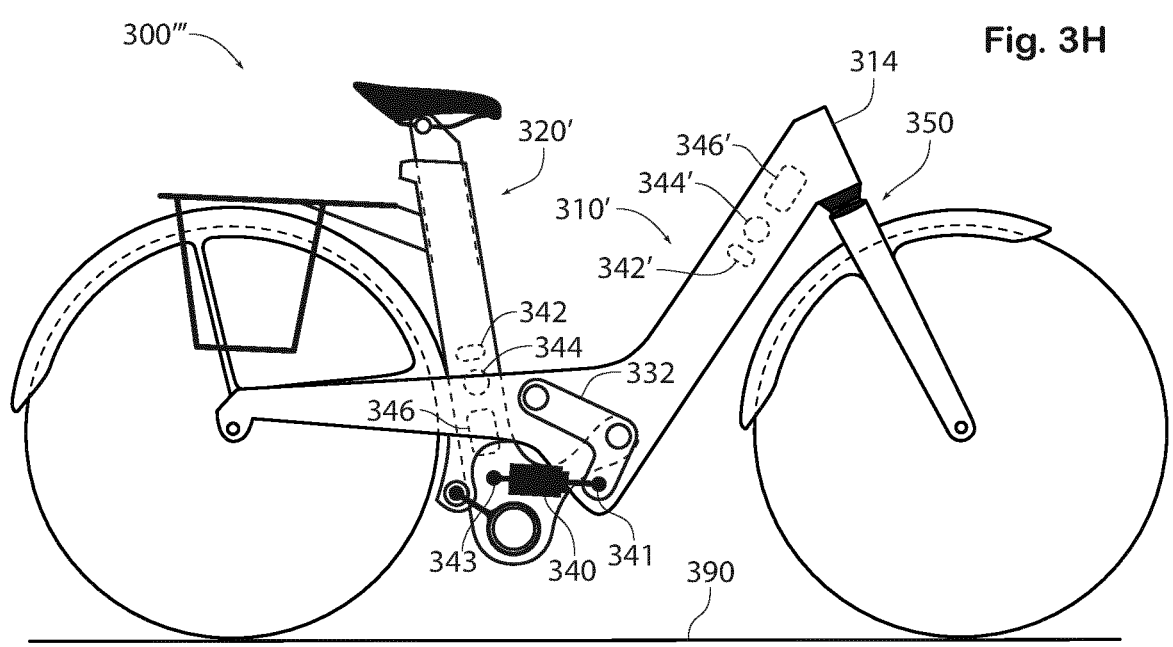
FIG. 3H a schematic depiction of the vehicle of FIG. 3A in a fourth operating state and comprising additional, optional features.

FIG. 3H schematically depicts the vehicle of FIG. 3A in a fourth operating state, albeit comprising additional, optional features.

In the illustrated embodiment, vehicle 300''' differs from vehicle 300 of FIG. 3A in that payload support structure 320' additionally comprises a vehicle controller 342, a pump 344 and a reservoir 346 and that frame 310' additionally comprises a vehicle controller 342', a pump 344' and a reservoir 346'. Vehicle controller 342/342' comprises an accelerometer and a wireless data interface (not shown), e.g. as described supra, that allows vehicle controller 342/342' to determine whether vehicle 300''' is nearing a stopped condition and/or has decelerated to a stopped condition. In response to a determination that vehicle 300''' is nearing a stopped condition and/or has decelerated to a stopped condition, vehicle controller 342 effects actuation of pump 344 such that fluid is pumped from a chamber of energy management system 340 via flexible conduits (not shown) to reservoir 346, thus reducing a length of energy management system 340, i.e. reducing a distance between pivot 341 and pivot 343, energy management system 340 being pivotally connected to first rigid link 332 via pivot 341 and being pivotally connected to payload support structure 320 via a pivot 343. The reduction of the length of energy management system 340, in turn, effects a lowering of payload support structure 320 toward terrain 390. Similarly, in response to a determination that vehicle 300''' is nearing a stopped condition and/or has decelerated to a stopped condition, vehicle controller 342' effects actuation of pump 344' such that fluid is pumped from a chamber of an energy management system/shock absorber of front fork 350' via flexible conduits (not shown) to reservoir 346', thus decreasing a length of front fork 350'. The reduction of the length of front fork 350, in turn, effects a lowering of head tube 314 toward terrain 390.

In response to a determination that the vehicle 300''' has accelerated from a stopped condition, vehicle controller 342 effects actuation of pump 344 such that fluid is pumped from reservoir 346 via flexible conduits (not shown) to the aforementioned chamber of energy management system 340, thus increasing a length of energy management system 340, i.e. increasing a distance between pivot 341 and pivot 343. The increase of the length of energy management system 340, in turn, effects a raising of payload support structure 320 away from terrain 390. Similarly, in response to a determination that the vehicle 300''' has accelerated from a stopped condition, vehicle controller 342' effects actuation of pump 344' such that fluid is pumped from reservoir 346' via flexible conduits (not shown) to the aforementioned chamber of the energy management system/shock absorber of front fork 350', thus increasing a length of front fork 350' and, in turn, effects a raising of head tube 314 from terrain 390.

Figure 4A:
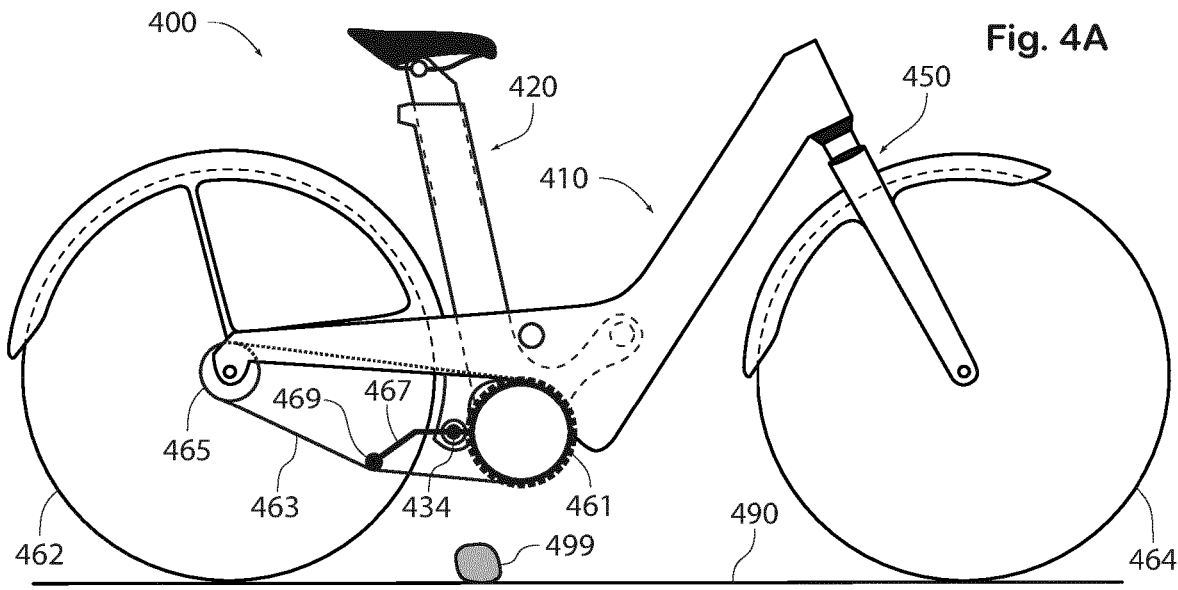
FIG. 4A a schematic depiction of a third exemplary embodiment of a vehicle of the first category in accordance with the present disclosure.

FIG. 4A schematically depicts a third exemplary embodiment of a vehicle 400 of the first category in accordance with the present disclosure, e.g. as described above.

In the illustrated embodiment, vehicle 400 comprises a frame 410 as depicted in FIG. 1, a payload support structure 420, a motion control system, an energy management system (not shown), a front fork 450, a rear wheel 462, a front wheel 464, a drivetrain and a drivetrain tensioning device 467. Frame 410 comprises a driven axle support that supports an axle of rear wheel 462. The motion control system comprises a first rigid link (not shown in FIG. 4A) and a second rigid link 434. First rigid link movably interconnects frame 410 and payload support structure 420, e.g. as shown in FIG. 3A. A first end of second rigid link 434 is mounted to payload support structure 420 so as to pivot around a driving axle support of frame 410. A second end of second rigid link 434 is pivotally connected to frame 410. The drivetrain comprises a driving sprocket 461, a chain 463 and a driven sprocket 465. Driving sprocket 461 rotates around an axle supported by the driving axle support. Driven sprocket 465 rotates around an axle supported by the driven axle support. Drivetrain tensioning device 467 comprises a roller 469 that, in the operating state depicted in FIG. 4A, is resiliently biased against chain 463 by an arm of drivetrain tensioning device 467 that acts as a spring. Drivetrain tensioning device 467 is connected to frame 410 exclusively via second rigid link 434. Moreover, drivetrain tensioning device 467 is connected to second rigid link 434 such that at least a portion of drivetrain tensioning device 467 moves in conjunction with second rigid link 434, a position of drivetrain tensioning device 467 thus being dependent on a position of second rigid link 434.

Figure 4B:
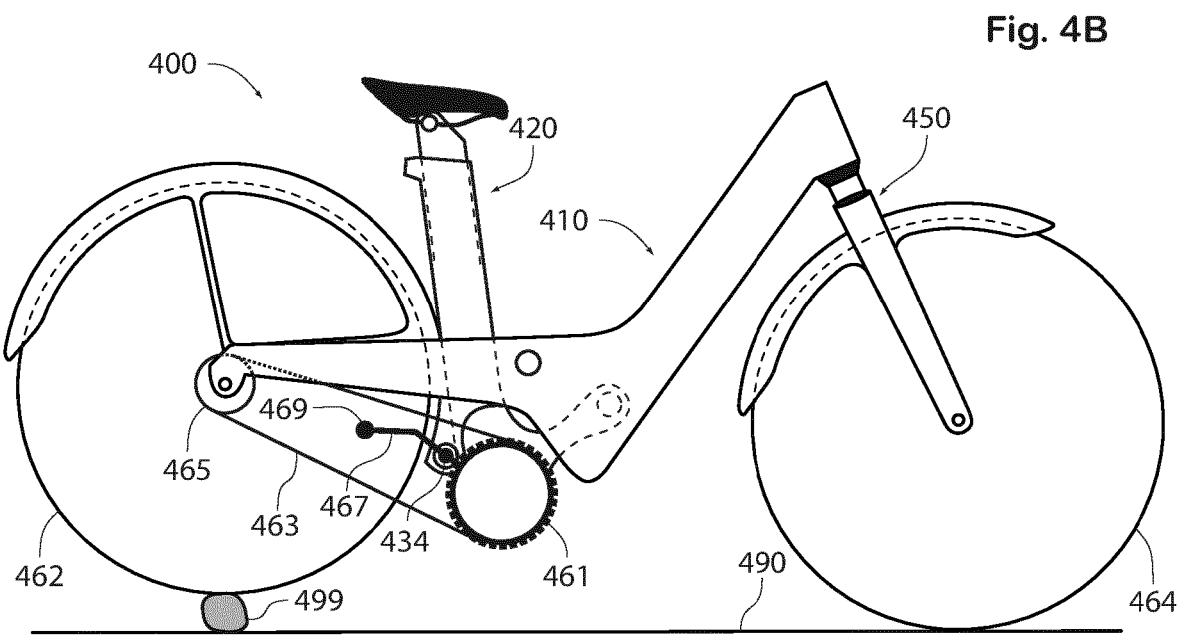
FIG. 4B a schematic depiction of the vehicle of FIG. 4A in another operating state.

FIG. 4B schematically depicts vehicle 400 of FIG. 4A in another operating state. In the operating state illustrated in FIG. 4B, rear wheel 462 of vehicle 400 is passing over obstacle 499, the motion control system moving to allow frame 410 to move relative to payload support structure 420. As shown in FIG. 4B, the motion of second rigid link 434 alters a position of drivetrain tensioning device 467 such that roller 469 is no longer biased against chain 463, thus compensating for so-called "chain growth" arising on account a change in distance from driving sprocket 461 to driven sprocket 465 resulting from the motion of frame 410 relative to payload support structure 420.

Figure 5:
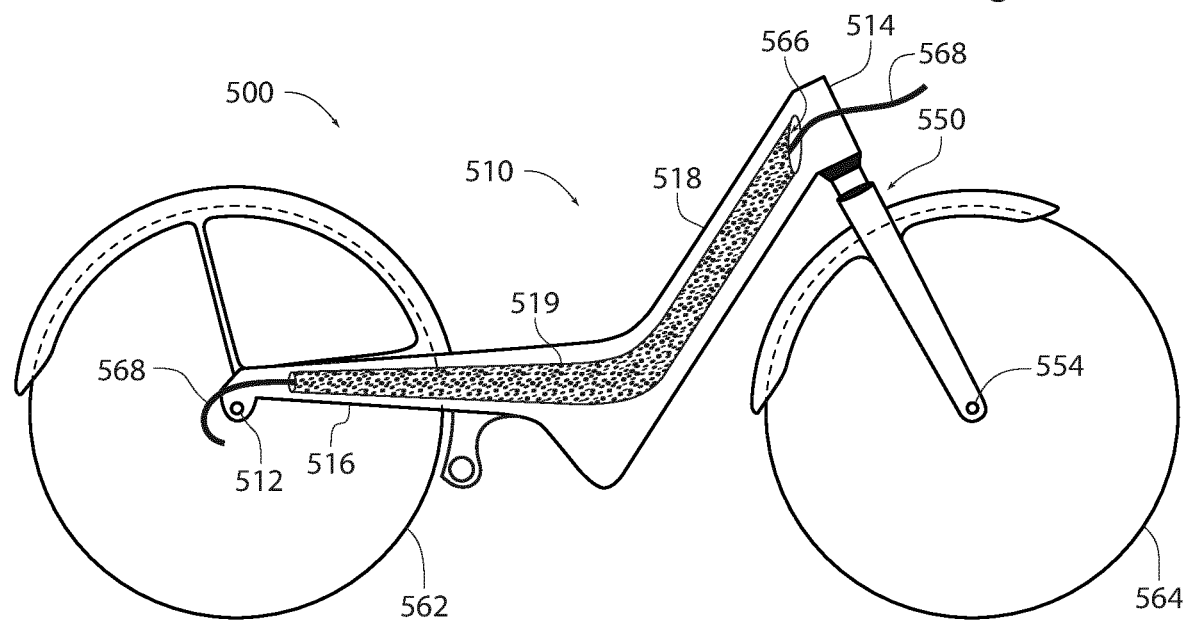
FIG. 5 a schematic depiction of a fourth exemplary embodiment of a vehicle of the first category in accordance with the present disclosure.

FIG. 5 schematically depicts a fourth exemplary embodiment of a vehicle 500 of the first category in accordance with the present disclosure, e.g. as described above.

In the illustrated embodiment, vehicle 500 comprises a frame 510, i.e. a driving frame portion, a front fork 550, a rear wheel 562 sand a front wheel 564. Front fork 550 comprises a front axle support 554 that supports front wheel 564. Frame 510 comprises a driven axle support 512 that supports an axle of rear wheel 562, a head tube 514, a rearward portion 516 and a forward portion 518 in the form of a down tube. Frame 510 furthermore comprises a panel 519 that snappingly fastens to frame 510 in a manually releasable manner, panel 519 extending along rearward portion 516 and forward portion 518 of the frame at least 70% of a distance from head tube 514 to driven axle support 512. Panel 519 and frame 510 cooperatively form a tubular channel 566 that opens to an ambient exterior environment of vehicle 500 at a forward and a rearward end of panel 519. In the illustrated embodiment, a derailleur cable 568 extends through tubular channel 566.

Figure 6A:
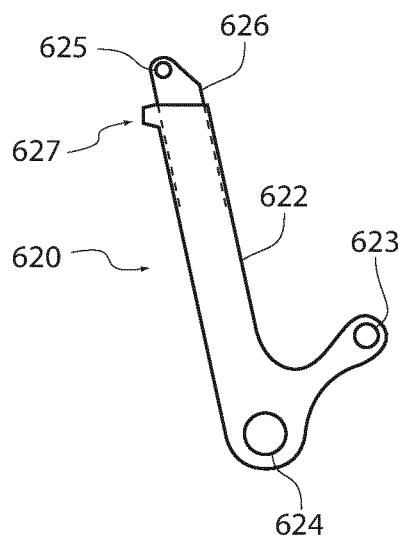
FIG. 6A another schematic depiction of the first exemplary embodiment of a payload support structure in accordance with the present disclosure.

Like FIG. 2A, FIG. 6A schematically depicts a first exemplary embodiment of a payload support structure 620, i.e. of a driven frame portion, in accordance with the present disclosure, e.g. as described above.

In the illustrated embodiment, payload support structure 620 comprises a seat tube 622 and a seat post 626. Seat tube 622 comprises a receptacle 623, e.g. for receiving a shaft that pivotally connects a rigid link (not shown in FIG. 6A) to payload support structure 620, a driving axle support 624, i.e. a bottom bracket, as well as a light 627. Seat post 626 comprises a mounting hole 625 for mounting a saddle (not shown) to seat post 626.

Figure 6B:
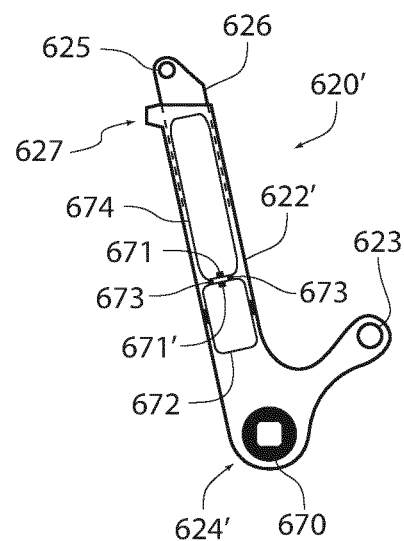
FIG. 6B a schematic depiction of the second exemplary embodiment of a payload support structure in accordance with the present disclosure.

FIG. 6B schematically depicts a second exemplary embodiment of a payload support structure 620', i.e. of a driven frame portion, in accordance with the present disclosure, e.g. as described above.

In the illustrated embodiment, payload support structure 620' comprises a seat tube 622' and a seat post 626. Seat tube 622' comprises a receptacle 623, e.g. for receiving a shaft that pivotally connects a rigid link (not shown in FIG. 6B) to payload support structure 620', a light 627 as well as a driving axle support 624' that supports a motor 670. Seat post 626 comprises a mounting hole 625 for mounting a saddle (not shown) to seat post 626. Payload support structure 620' furthermore comprises a motor controller 672 and power supply in the form of a rechargeable battery 674, rechargeable battery 674 being slidably received in a hollow defined by seat tube 622' and seat post 626. In the illustrated embodiment, rechargeable battery 674 electrically connects to motor controller 672 via a plurality of contacts 673. Rechargeable battery 674 and motor controller 672 comprise magnets 671, 671' (of opposite polarity) that inhibit disengagement of rechargeable battery 674 from contacts 673.

As exemplified by FIG. 3A, payload support structure 620 as shown in FIG. 6A can be mounted to frame 110 as shown in FIG. 1. Yet as exemplified by FIGS. 6A and 6B, payload support structures 620 and 620' bear sufficient similarity to permit payload support structure 620' as shown in FIG. 6B to be mounted to frame 110 as shown in FIG. 1 in lieu of payload support structure 620 as shown in FIG. 6A. In other words, payload support structure 620 can be disassembled from frame 110 and replaced by payload support structure 620' that has components, e.g. motor 670 and a power supply in the form of rechargeable battery 674, not comprised by payload support structure 620. As such, vehicle 300 as shown in FIG. 3A can be easily retrofitted from a human-powered vehicle to a motor-powered vehicle, i.e. an e-bike, or vice-versa.

FIG. 7A schematically depicts a fifth exemplary embodiment of a vehicle 700 of the first category in accordance with the present disclosure, e.g. as described above.

In the illustrated embodiment, vehicle 700 comprises a frame 710, a payload support structure 720, a motion control system, an energy management system (not shown), a front fork 750, a rear wheel 762 and a front wheel 764. Frame 710 comprises a head tube 714 and a driven axle support 712 that supports an axle of rear wheel 762. Payload support structure 720 comprises a seat tube 722, a driving axle support 724, a seat post 726 and a saddle 728.

The motion control system comprises a rigid link 734 as well as a sleeve 736 that slidably receives a slider 738. A first end of rigid link 734 is pivotally connected to frame 710 via a pivot 735 and a second end of rigid link 734 is pivotally connected to payload support structure 720 via a pivot 737. Sleeve 736 is rigidly fixed to frame 710. An end of slider 738 that protrudes from sleeve 736 is pivotally connected to payload support structure 720 via a pivot 739.

In the operating state illustrated in FIG. 7A, vehicle 700 is traveling on level terrain 790, approaching an obstacle 799. A mounting point 725 of saddle 728 is a height H above terrain 790.

FIG. 78 schematically depicts vehicle 700 of FIG. 7A in another operating state. In the operating state illustrated in FIG. 7B, rear wheel 762 of vehicle 700 is passing over obstacle 799. The motion control system allows frame 710 to move relative to payload support structure 720. Due to the ability of frame 710 to move relative to payload support structure 720, mounting point 725 of saddle 728 remains essentially at height H above terrain 790. As such, the encounter with obstacle 799 does not substantially disrupt the inertial trajectory of the payload mass supported by payload support structure 720.

Figure 7C:
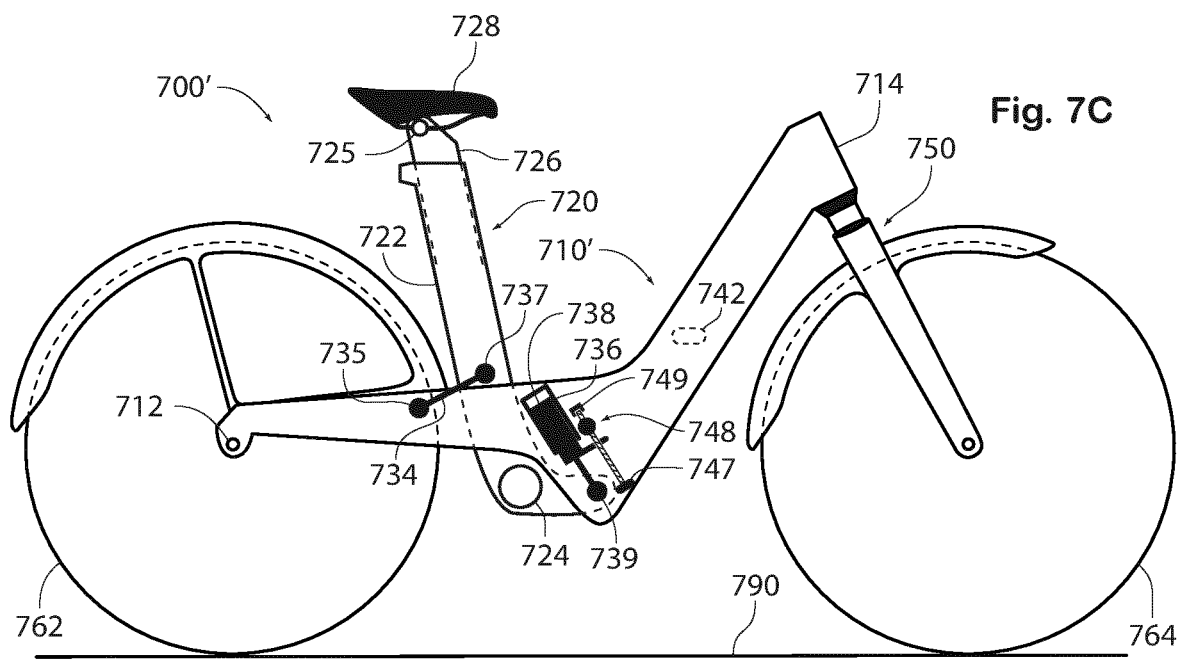
FIG. 7C a schematic depiction of an alternative embodiment of the vehicle of FIG. 7A in a first operating state.

FIG. 7C schematically depicts the vehicle of FIG. 7A in a first operating state, albeit comprising additional, optional features.

In the illustrated embodiment, vehicle 700' differs from vehicle 700 of FIG. 7A in that frame 710' additionally comprises a vehicle controller 742, a motor 747, a ball-screw mechanism 748 and a mount 749. Vehicle controller 742 comprises an accelerometer and a wireless data interface (not shown), e.g. as described supra, that allows vehicle controller 742 to determine whether vehicle 700' is nearing a stopped condition and/or has decelerated to a stopped condition. In response to a determination that vehicle 700' is nearing a stopped condition and/or has decelerated to a stopped condition, vehicle controller 742 effects actuation of motor 747 that, in turn, actuates ball-screw mechanism 748 in a manner that effects a lowering of payload support structure 320 toward terrain 790. Specifically, in the illustrated embodiment, motor 747 effects a rotation of a screw of ball-screw mechanism 748, which rotation transports a ball of ball-screw mechanism 748 against a flange of slider 738, thus moving slider 738 relative to sleeve 736 of frame 710' by increasing a distance between mount 749 and the ball/flange. As such, the rotational energy provided by motor 747 may overcome forces, e.g. emanating from the energy management system, that urge the vehicle toward the neutral, payload-bearing state.

In response to a determination that the vehicle has accelerated from a stopped condition, vehicle controller 742 effects actuation of motor 747 that, in turn, actuates ball-screw mechanism 748 in a manner that effects a raising of payload support structure 720 away from terrain 790. Specifically, in the illustrated embodiment, motor 747 effects a rotation of a screw of ball-screw mechanism 748, which rotation transports a ball of ball-screw mechanism 748 away from the flange of slider 738, thus decreasing a distance between mount 749 and the ball/flange and allowing—e.g. by virtue of forces, e.g. emanating from the energy management system, that urge the vehicle toward the neutral, payload-bearing state—slider 738 to move relative to sleeve 736 of frame 710'.

Figure 7D:
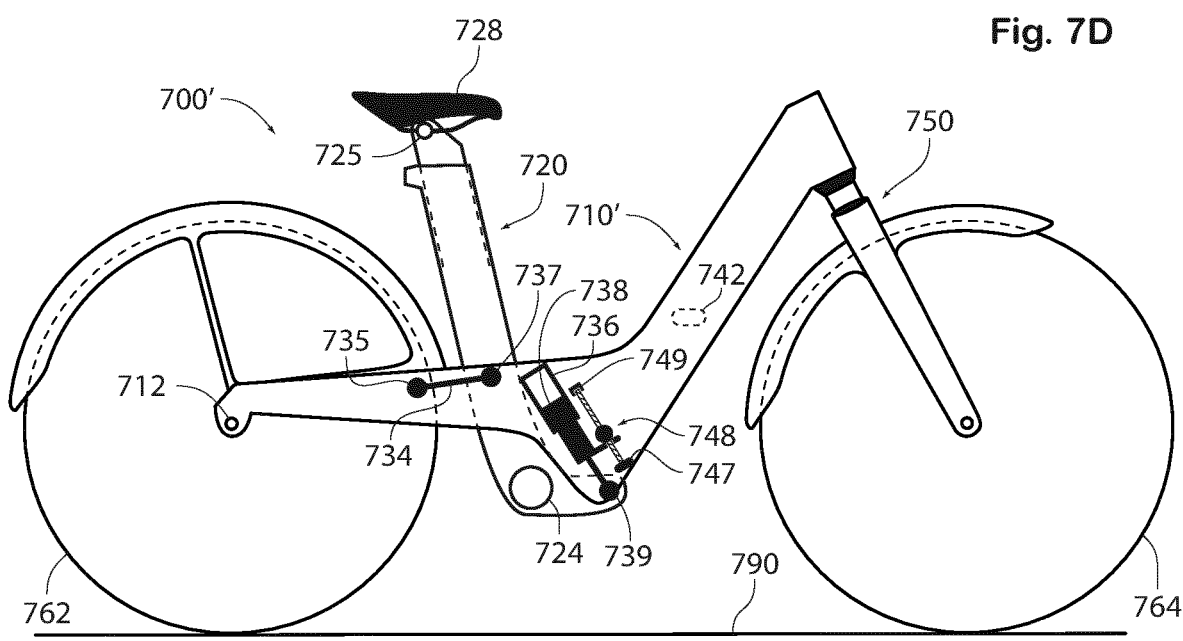
FIG. 7D a schematic depiction of the vehicle of FIG. 7A in a second operating state.

FIG. 7D schematically depicts vehicle 700' of FIG. 7A in a second operating state, i.e. a state in which payload support structure 720 has been lowered toward terrain 790 as described above.

Figure 8A:
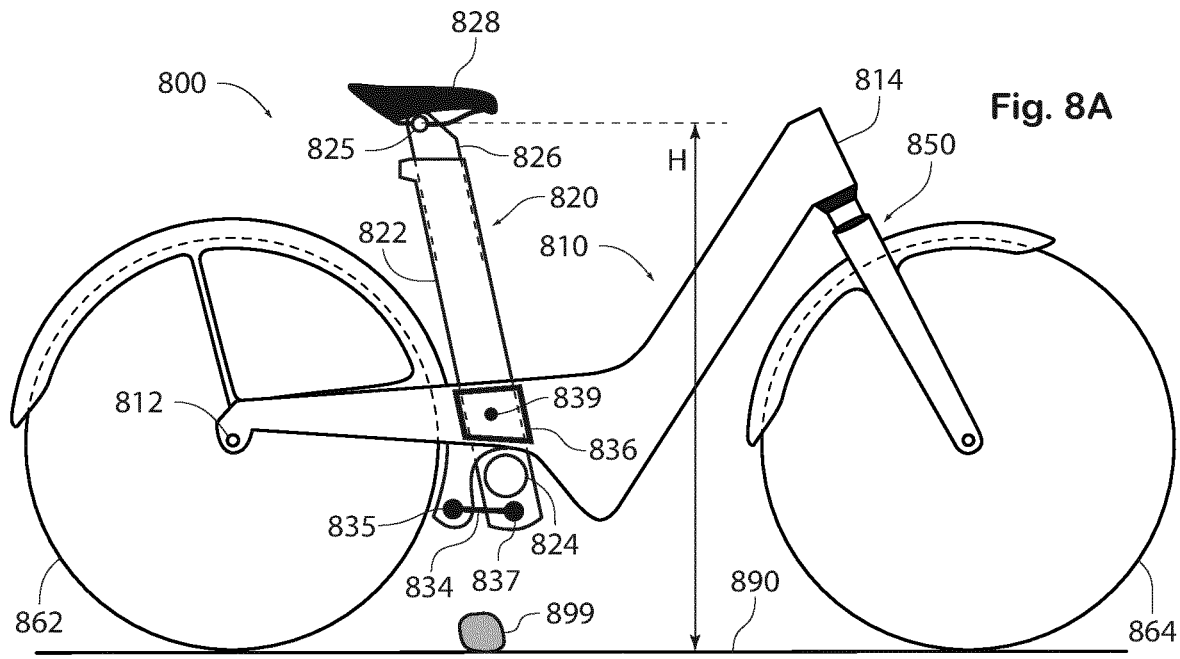
FIG. 8A a schematic depiction of a sixth exemplary embodiment of a vehicle of the first category in accordance with the present disclosure.

FIG. 8A schematically depicts a sixth exemplary embodiment of a vehicle 800 of the first category in accordance with the present disclosure, e.g. as described above.

In the illustrated embodiment, vehicle 800 comprises a frame 810, a payload support structure 820, a motion control system, an energy management system (not shown), a front fork 850, a rear wheel 862 and a front wheel 864. Frame 810 comprises a head tube 814 and a driven axle support 812 that supports an axle of rear wheel 862. Payload support structure 820 comprises a seat tube 822, a driving axle support 824, a seat post 826 and a saddle 828.

The motion control system comprises a rigid link 834 as well as a sleeve 836 that slidably receives a portion of seat tube 822. As such, seat tube 822 acts as a slider, e.g. as described above. Sleeve 836 is pivotally connected to frame 810 via a pivot 839. A first end of rigid link 834 is pivotally connected to frame 810 via a pivot 835 and a second end of rigid link 834 is pivotally connected to payload support structure 820 via a pivot 837.

In the operating state illustrated in FIG. 8A, vehicle 800 is traveling on level terrain 890, approaching an obstacle 899. A mounting point 825 of saddle 828 is a height H above terrain 890.

Figure 8B:
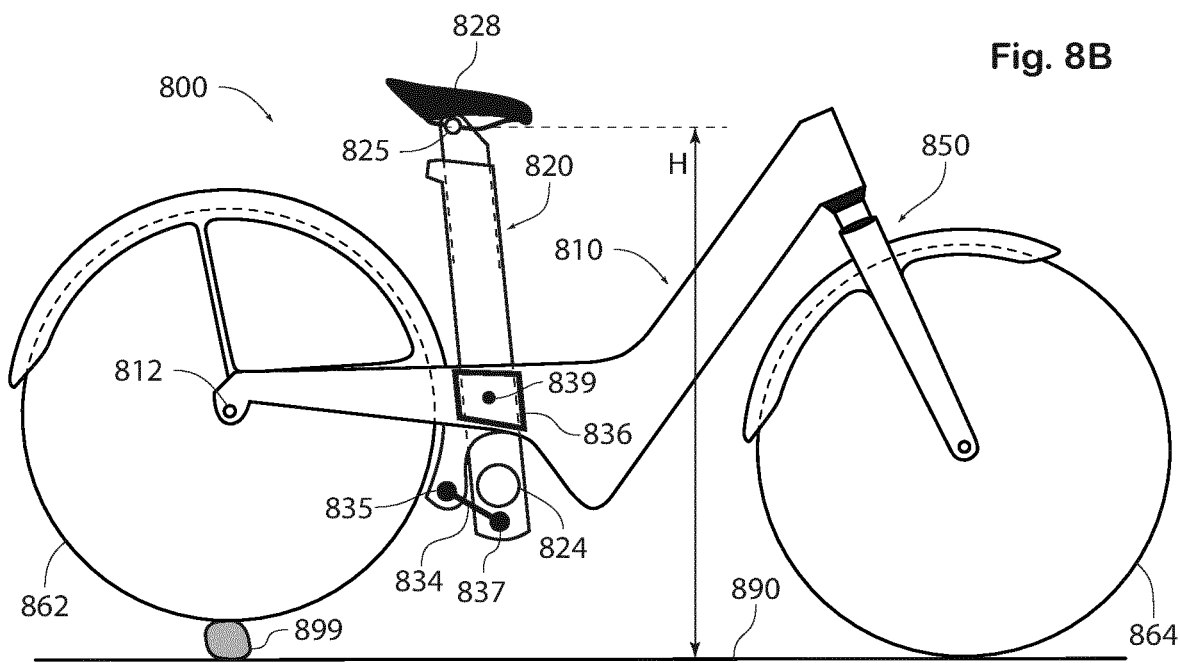
FIG. 8B a schematic depiction of the vehicle of FIG. 8A in another operating state.

FIG. 8B schematically depicts vehicle 800 of FIG. 8A in another operating state. In the operating state illustrated in FIG. 8B, rear wheel 862 of vehicle 800 is passing over obstacle 899. The motion control system allows frame 810 to move relative to payload support structure 820. Due to the ability of frame 810 to move relative to payload support structure 820, mounting point 825 of saddle 828 remains essentially at height H above terrain 890. As such, the encounter with obstacle 899 does not substantially disrupt the inertial trajectory of the payload mass supported by payload support structure 820.

Figure 9A:
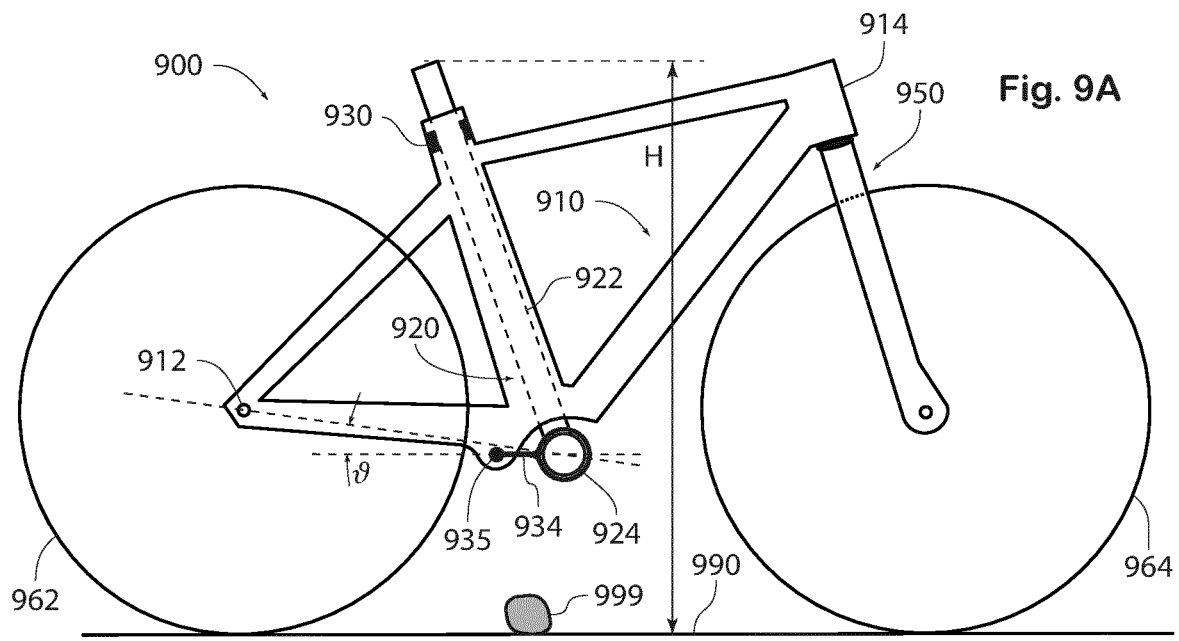
FIG. 9A a schematic depiction of a seventh exemplary embodiment of a vehicle of the first category in accordance with the present disclosure.

FIG. 9A schematically depicts a seventh exemplary embodiment of a vehicle 900 of the first category in accordance with the present disclosure, e.g. as described above.

In the illustrated embodiment, vehicle 900 comprises a frame 910, a payload support structure 920, a motion control system, an energy management system (not shown), a front fork 950, a rear wheel 962 and a front wheel 964. Frame 910 comprises a head tube 914 and a driven axle support 912 that supports an axle of rear wheel 962. Payload support structure 920 comprises a seat tube 922 and a driving axle support 924.

The motion control system comprises a rigid link 934 as well as a bushing 930 that slidably receives a portion of seat tube 922. A first end of rigid link 934 is pivotally connected to frame 910 via a pivot 935 and a second end of rigid link 934 is mounted to payload support structure 920 so as to pivot around driving axle support 924.

In the operating state illustrated in FIG. 9A, vehicle 900 is traveling on level terrain 990, approaching an obstacle 999. An uppermost end of seat tube 922 is a height H above terrain 990. As depicted in FIG. 9A, a longitudinal axis of rigid link 934 is aligned (to within) 20° with an imaginary straight line through the driving axle and the driven axle in the operating state of FIG. 9A. In other words, in the operating state of FIG. 9A an angle $\vartheta$ between a longitudinal axis of rigid link 934 and an imaginary straight line through the driving axle and the driven axle is less than 20°.

Figure 9B:
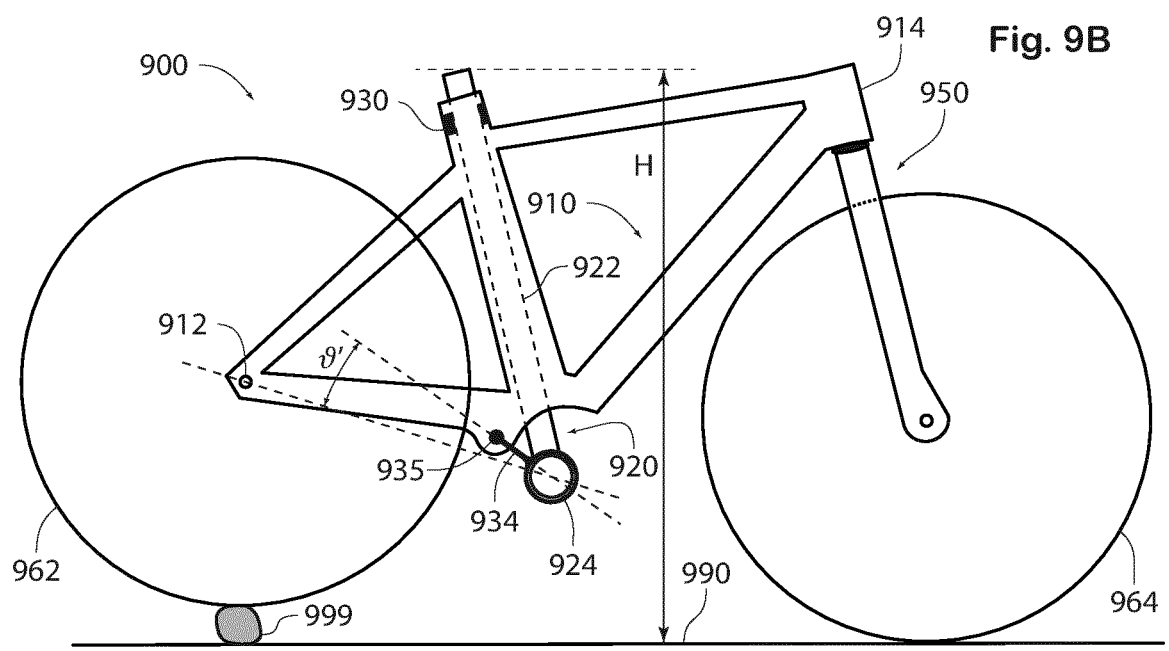
FIG. 9B a schematic depiction of the vehicle of FIG. 9A in another operating state.

FIG. 9B schematically depicts vehicle 900 of FIG. 9A in another operating state. In the operating state illustrated in FIG. 9B, rear wheel 962 of vehicle 900 is passing over obstacle 999. The motion control system allows frame 910 to move relative to payload support structure 920. Due to the ability of frame 910 to move relative to payload support structure 920, the uppermost end of seat tube 922 remains essentially at height H above terrain 990. As such, the encounter with obstacle 999 does not substantially disrupt the inertial trajectory of the payload mass supported by payload support structure 920. As depicted in FIG. 9B, a longitudinal axis of rigid link 934 is aligned (to within) 20° with an imaginary straight line through the driving axle and the driven axle in the operating state of FIG. 9B. In other words, in the operating state of FIG. 9B an angle $\vartheta'$ between a longitudinal axis of rigid link 934 and an imaginary straight line through the driving axle and the driven axle is less than 20°.

Figure 10A:
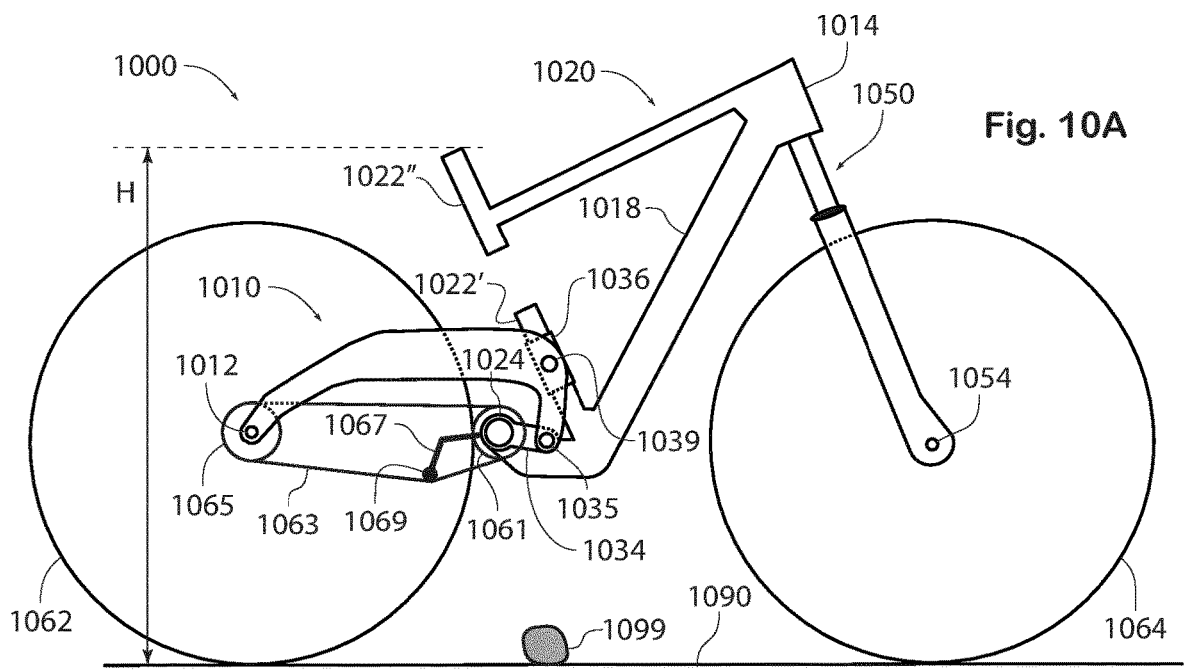
FIG. 10A a schematic depiction of a first exemplary embodiment of a vehicle of the second category in accordance with the present disclosure.

FIG. 10A schematically depicts a first exemplary embodiment of a vehicle 1000 of the second category in accordance with the present disclosure, e.g. as described above.

In the illustrated embodiment, vehicle 1000 comprises a driving frame portion 1010, a driven frame portion 1020, a motion control system, an energy management system (not shown), a front fork 1050, a rear wheel 1062, a front wheel 1064, a drivetrain and a drivetrain tensioning device 1067. Front fork 1050 comprises a front axle support 1054 that supports front wheel 1064. Driving frame portion 1010 comprises a driven axle support 1012 that supports an axle of rear wheel 1062. Driven frame portion 1020 comprises a head tube 1014, a down tube 1018, a lower seat tube portion 1022', an upper seat tube portion 1022" and a driving axle support 1024.

The motion control system comprises a rigid link 1034 as well as a sleeve 1036 that slidingly receives a portion of lower seat tube portion 1022'. As such, seat tube 822 acts as a slider, e.g. as described above. Sleeve 1036 is pivotally connected to driving frame portion 1010 via a pivot 1039. A first end of rigid link 1034 is pivotally connected to driving frame portion 1010 via a pivot 1035 and a second end of rigid link 1034 is mounted to driven frame portion 1020 so as to pivot around driving axle support 1024.

The drivetrain comprises a driving sprocket 1061, a chain 1063 and a driven sprocket 1065. Driving sprocket 1061 rotates around an axle supported by the driving axle support 1024. Driven sprocket 1065 rotates around an axle supported by the driven axle support 1012. Drivetrain tensioning device 1067 comprises a roller 1069 that, in the operating state depicted in FIG. 10A, is resiliently biased against chain 1063 by an arm of drivetrain tensioning device 1067 that acts as a spring. Drivetrain tensioning device 1067 is connected to driven frame portion 1020 exclusively via rigid link 1034. Moreover, drivetrain tensioning device 1067 is connected to rigid link 1034 such that at least a portion of drivetrain tensioning device 1067 moves in conjunction with rigid link 1034, a position of drivetrain tensioning device 1067 thus being dependent on a position of rigid link 1034.

In the operating state illustrated in FIG. 10A, vehicle 1000 is traveling on level terrain 1090, approaching an obstacle 1099. An uppermost end of upper seat tube portion 1022" is a height H above terrain 1090.

Figure 10B:
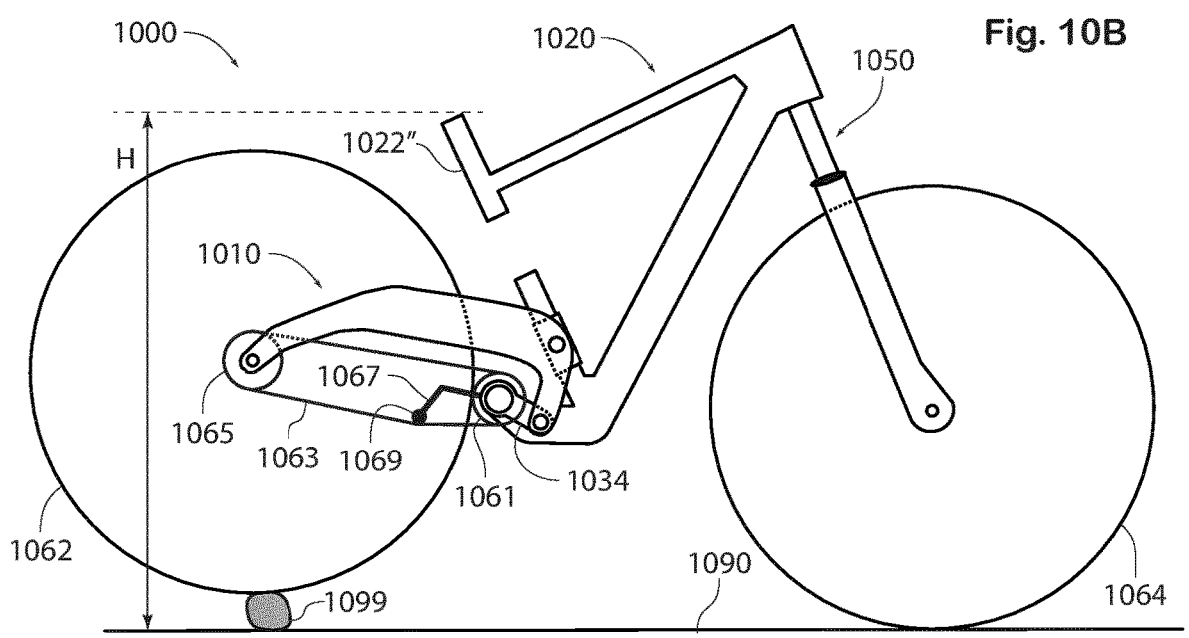
FIG. 10B a schematic depiction of the vehicle of FIG. 10A in another operating state.

FIG. 10B schematically depicts vehicle 1000 of FIG. 10A in another operating state. In the operating state illustrated in FIG. 10B, rear wheel 1062 of vehicle 1000 is passing over obstacle 1099. The motion control system allows driving frame portion 1010 to move relative to driven frame portion 1020. Due to the ability of driving frame portion 1010 to move relative to driven frame portion 1020, the uppermost end of upper seat tube portion 1022" remains essentially at height H above terrain 1090. As such, the encounter with obstacle 1099 does not substantially disrupt the inertial trajectory of the payload mass supported by driven frame portion 1020.

As shown in FIG. 10B, the motion of rigid link 1034 alters a position of drivetrain tensioning device 1067 such that roller 1069 is not as strongly biased against chain 1063 as in the operating state depicted in FIG. 10A, thus compensating for so-called "chain growth" arising on account a change in distance from driving sprocket 1061 to driven sprocket 1065 resulting from the motion of driving frame portion 1010 relative to driven frame portion 1020.

Figure 11A:
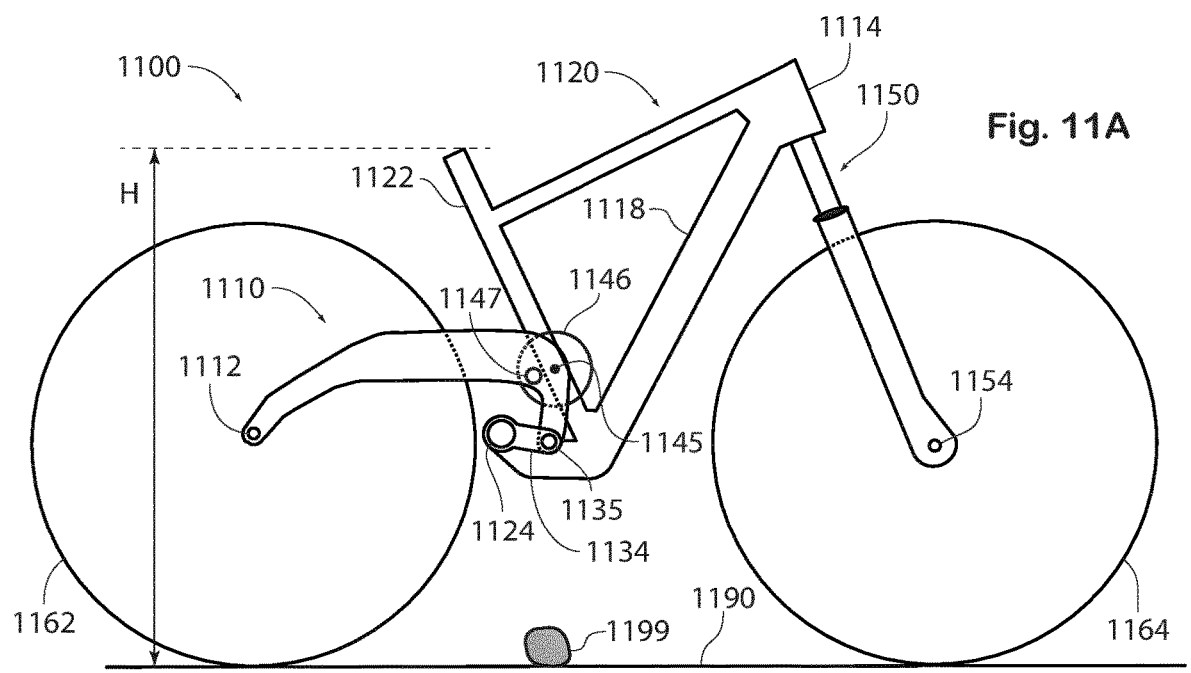
FIG. 11A a schematic depiction of a second exemplary embodiment of a vehicle of the second category in accordance with the present disclosure.

FIG. 11A schematically depicts a second exemplary embodiment of a vehicle 1100 of the second category in accordance with the present disclosure, e.g. as described above.

In the illustrated embodiment, vehicle 1100 comprises a driving frame portion 1110, a driven frame portion 1120, a motion control system, an energy management system (not shown), a front fork 1150, a rear wheel 1162 and a front wheel 1164. Front fork 1150 comprises a front axle support 1154 that supports front wheel 1164. Driving frame portion 1110 comprises a driven axle support 1112 that supports an axle of rear wheel 1162. Driven frame portion 1120 comprises a head tube 1114, a down tube 1118, a seat tube 1022 and a driving axle support 1124.

The motion control system comprises a single rigid link 1134 as well as two eccentrics 1146 (only one of which is visible in FIG. 11A) in parallel arrangement relative to a major plane of symmetry of driven frame portion 1120. In other words, in the embodiment shown in FIGS. 11A and 11B the motion control system is devoid of a rigid link in mirror symmetric arrangement to rigid link 1134. Rigid link 1134 is offset from the major plane of symmetry of the driven frame portion by at least 2 cm and pivots in a plane offset from the major plane of symmetry of the vehicle by at least 2 cm. Eccentrics 1146 are rotatably mounted on driven frame portion 1120 via a first axis of rotation 1145 and are rotatably connected to driving frame portion 1110 via a second axis of rotation 1147. A first end of rigid link 1134 is pivotally connected to driving frame portion 1110 via a pivot 1135 and a second end of rigid link 1134 is mounted to driven frame portion 1120 so as to pivot around driving axle support 1124.

In the operating state illustrated in FIG. 11A, vehicle 1100 is traveling on level terrain 1190, approaching an obstacle 1199. An uppermost end of seat tube 1022 is a height H above terrain 1190.

Figure 11B:
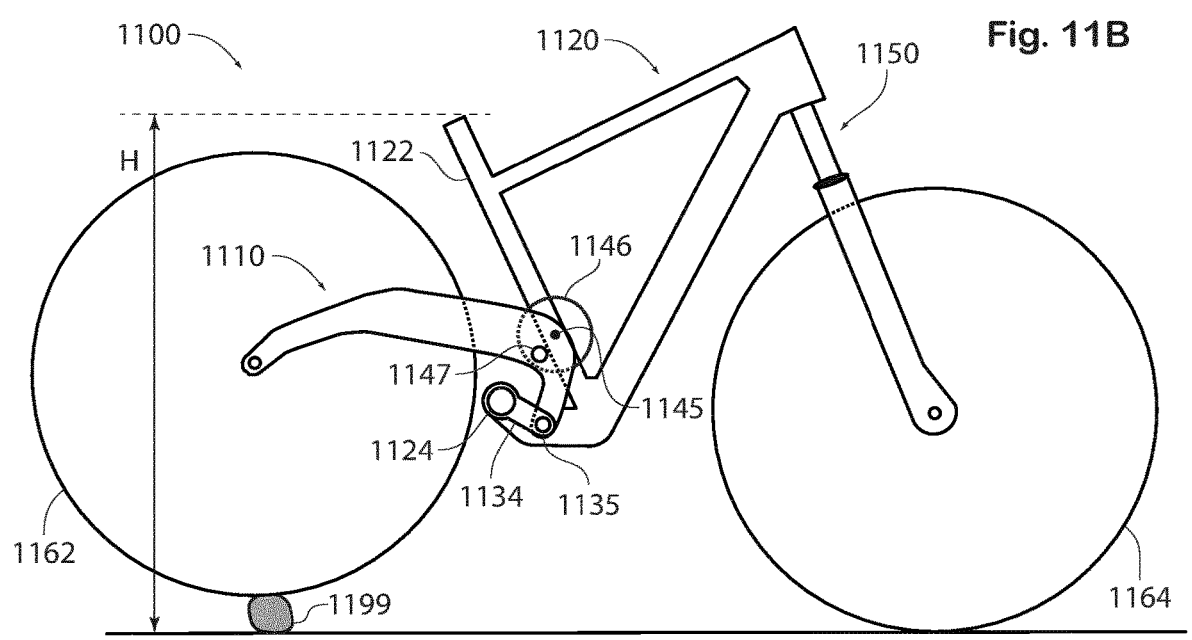
FIG. 11B a schematic depiction of the vehicle of FIG. 11A in another operating state.

FIG. 11B schematically depicts vehicle 1100 of FIG. 11A in another operating state. In the operating state illustrated in FIG. 11B, rear wheel 1162 of vehicle 1100 is passing over obstacle 1199. The motion control system allows driving frame portion 1110 to move relative to driven frame portion 1120. Due to the ability of driving frame portion 1110 to move relative to driven frame portion 1120, the uppermost end of seat tube 1022 remains essentially at height H above terrain 1190. As such, the encounter with obstacle 1199 does not substantially disrupt the inertial trajectory of the payload mass supported by driven frame portion 1120.

Figure 12:
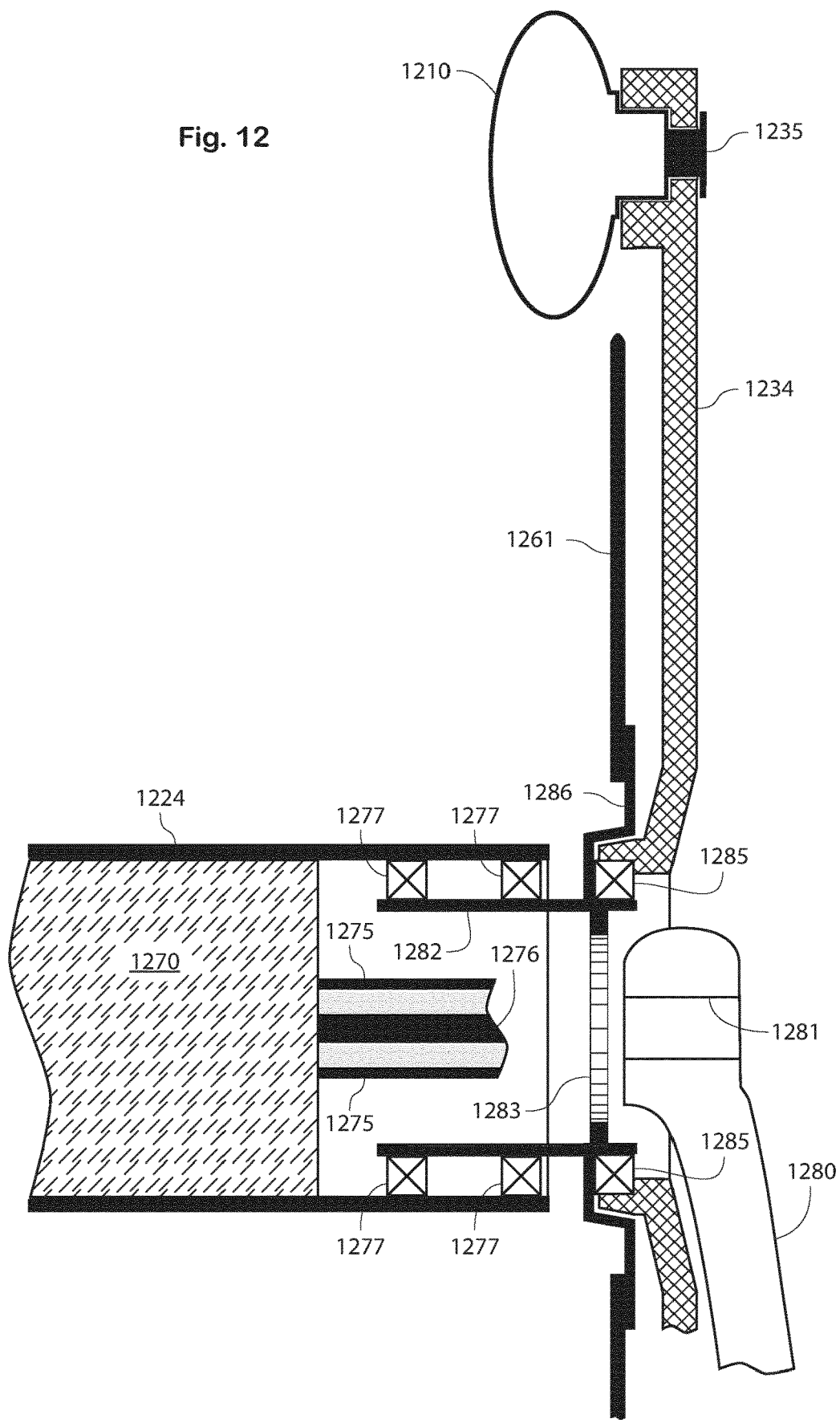
FIG. 12 a schematic depiction of exemplary embodiment of a rigid link in accordance with the present disclosure.

FIG. 12 schematically depicts an exemplary embodiment of a rigid link 1234 in accordance with the present disclosure, e.g. as described above.

In the illustrated embodiment, a first end of rigid link 1234 is pivotally connected to driving frame portion 1210 via a pivot 1235 and a second end of rigid link 1234 is mounted so as to pivot around driving axle support 1224 of the driven frame portion. More specifically, rigid link 1234 is mounted on bearings 1285 that rotate on a surface of a drive component 1282 that rotates on bearings 1277 that rotate on a surface of driving axle support 1224. As shown in FIG. 12, bearings 1285 are situated laterally outside driving axle support 1224.

In the illustrated embodiment, driving axle support 1224 supports a motor 1270 that comprises an input shaft 1276 that connects (not shown) to a socket 1281 of a crankarm 1280. Motor 1270 furthermore comprises an output shaft 1275 that, in the illustrated embodiment, is coaxial to and radially outward of input shaft 1276. Output shaft 1275 engages (not shown) a toothed section 1283 of drive component 1282. A driving sprocket 1261 is attached to a flange 1286 of drive component 1282, thus allowing power output from motor 1270 via output shaft 1275 to be transferred to driving sprocket 1261.

Figure 13A:
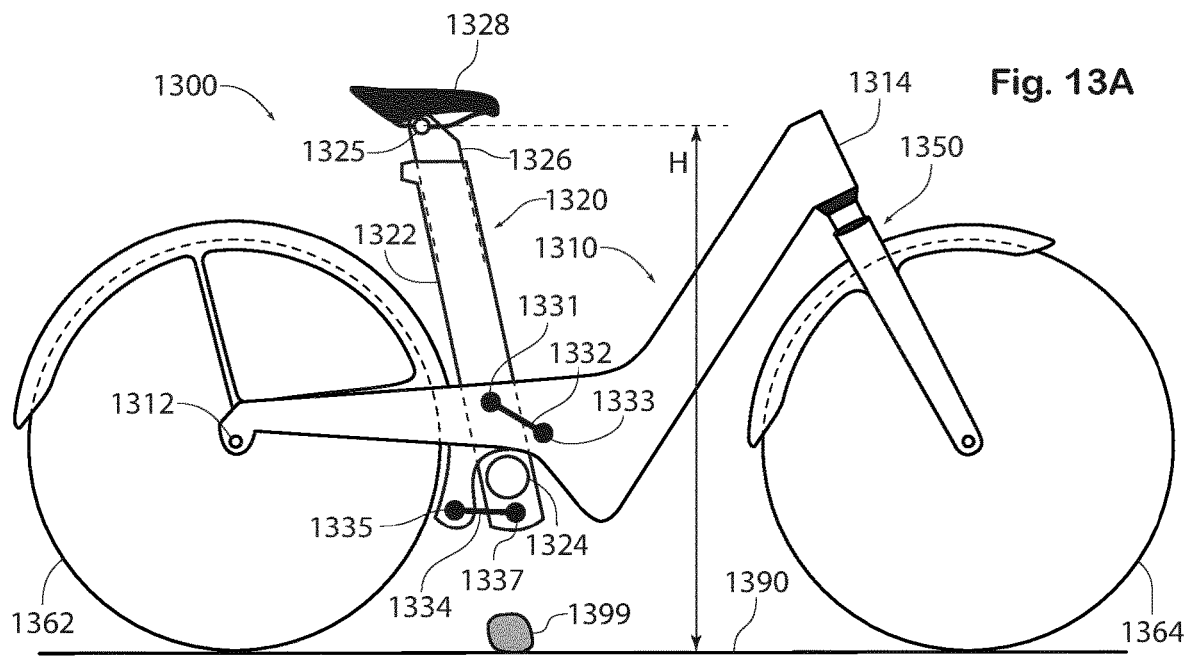
FIG. 13A a schematic depiction of an eighth exemplary embodiment of a vehicle of the first category in accordance with the present disclosure.

FIG. 13A schematically depicts an eighth exemplary embodiment of a vehicle 1300 of the first category in accordance with the present disclosure, e.g. as described above.

In the illustrated embodiment, vehicle 1300 comprises a frame 1310, a payload support structure 1320, a motion control system, a front fork 1350, a rear wheel 1362 and a front wheel 1364. Frame 1310 comprises a head tube 1314 and a driven axle support 1312 that supports an axle of rear wheel 1362. Payload support structure 1320 comprises a seat tube 1322, a driving axle support 1324, a seat post 1326 and a saddle 1328.

The motion control system comprises a first flexing element 1332 and a second flexing element 1334. A first end of first flexing element 1332 is pivotally connected to payload support structure 1320 via a pivot 1331 and a second end of first flexing element 1332 is rigidly connected to frame 1310 at a connection point 1333. A first end of second flexing element 1334 is rigidly connected to frame 1310 at a connection point 1335 and a second end of second flexing element 1334 is pivotally connected to payload support structure 1320 via a pivot 1337.

In the operating state illustrated in FIG. 13A, vehicle 1300 is traveling on level terrain 1390, approaching an obstacle 1399. A mounting point 1325 of saddle 1328 is a height H above terrain 1390.

Figure 13B:
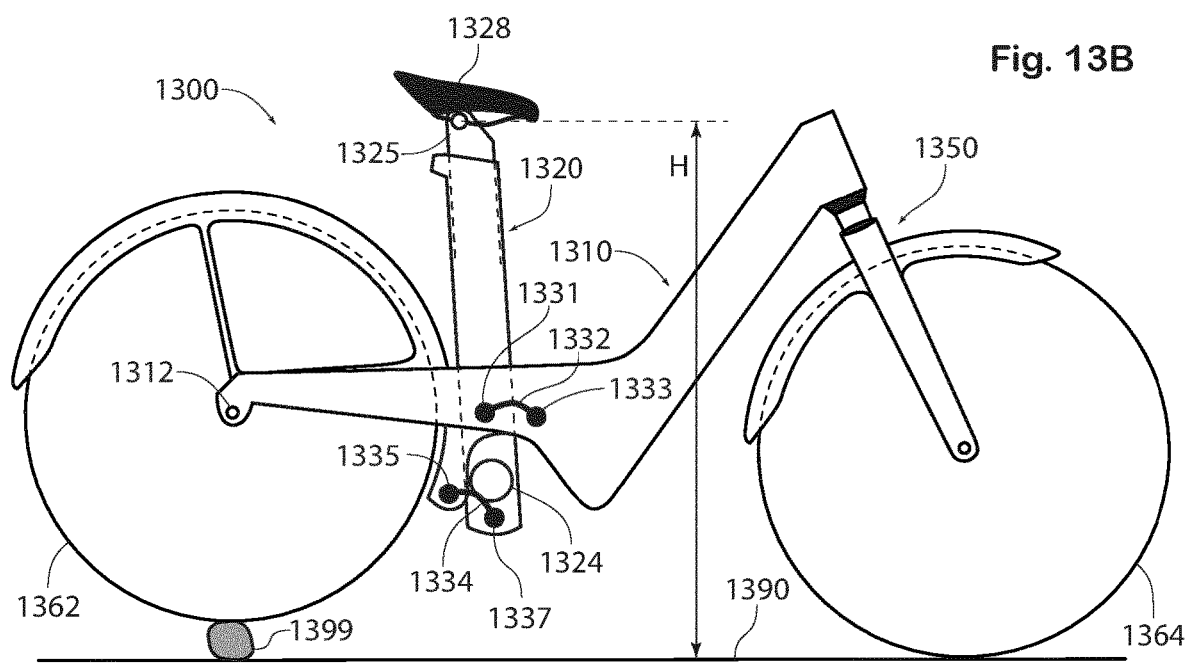
FIG. 13B a schematic depiction of the vehicle of FIG. 13A in another operating state.

FIG. 13B schematically depicts vehicle 1300 of FIG. 13A in another operating state. In the operating state illustrated in FIG. 13B, rear wheel 1362 of vehicle 1300 is passing over obstacle 1399. The motion control system allows frame 1310 to move relative to payload support structure 1320. Due to the ability of frame 1310 to move relative to payload support structure 1320, mounting point 1325 of saddle 1328 remains essentially at height H above terrain 1390. As such, the encounter with obstacle 1399 does not substantially disrupt the inertial trajectory of the payload mass supported by payload support structure 1320. Moreover, the flexing of first flexing element 1332 and second flexing element 1334 as the vehicle transitions from the operating state depicted in FIG. 13A to the operating state depicted in FIG. 13B stores potential energy that assists the motion control system in returning the vehicle to the operating state depicted in FIG. 13A once the vehicle has passed over obstacle 1399, e.g. in lieu of an energy management system.

Figure 14:
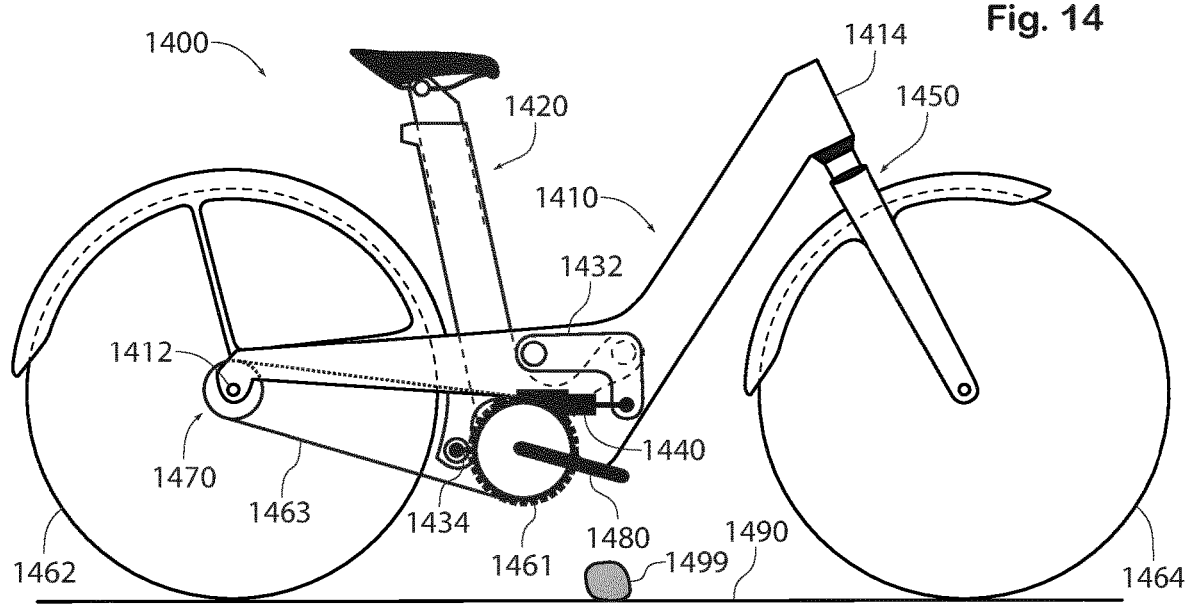
FIG. 14 a schematic depiction of an ninth exemplary embodiment of a vehicle of the first category in accordance with the present disclosure.

FIG. 14 schematically depicts a ninth exemplary embodiment of a vehicle 1400 of the first category in accordance with the present disclosure, e.g. as described above.

In the illustrated embodiment, vehicle 1400 comprises a frame 1410 as depicted in FIG. 1, a payload support structure 1420, a motion control system and an energy management system 1440 as depicted in FIG. 2B, a front fork 1450, a rear wheel 1462, a front wheel 1464, a motor 1470 and a drivetrain. Frame 1410 comprises a head tube 1414 and a driven axle support 1412 that supports an axle of rear wheel 1462. Payload support structure 1420 is essentially identical to payload support structure 1420 depicted in FIG. 2A, albeit comprising a saddle 1428 in the embodiment of FIG. 14. The motion control system comprises a first rigid link 1432 and a second rigid link 1434. First rigid link 1432 is L-shaped and is pivotally connected to payload support structure 1420 via a pivot situated at the bend in L-shaped rigid link 1432. First rigid link 1432 is moreover pivotally connected to a first end of energy management system 1440 via a pivot situated at a first end of first rigid link 1432 and is pivotally connected to frame 1410 via a pivot situated at a second end of first rigid link 1432. A second end of energy management system 1440 is pivotally connected to first rigid link 1432. A first end of second rigid link 1434 is mounted to payload support structure 1420 so as to pivot around a driving axle support (not visible in FIG. 14). A second end of second rigid link 1434 is pivotally connected to frame 1410.

The drivetrain comprises a driving sprocket 1461 and a chain 1463. Driving sprocket 461 rotates around an axle supported by the driving axle support. Power for propelling the vehicle may be input to driving sprocket 1461 by a user via a crankarm 1480 that is attached to driving sprocket 1461. Chain 1463 transfers the power from driving sprocket 1461 to rear wheel 1462, e.g. via a driven sprocket (not shown) configured to transfer power to a hub of rear wheel 1462 as known in the art. Power for propelling the vehicle may be likewise provided to rear wheel 1462 by motor 1470 provided within the hub of rear wheel 1462. As such, vehicle 1400 may be propelled by motor 1470 and/or by a user.

In the operating state illustrated in FIG. 14, vehicle 1400 is traveling on level terrain 1490, approaching an obstacle 1499. Like vehicle 300 shown in FIGS. 3A and 3B, vehicle 1400 can adopt other operating states to permit rear wheel 1462 of vehicle 1400 to pass over obstacle 1499.

Figure 15:
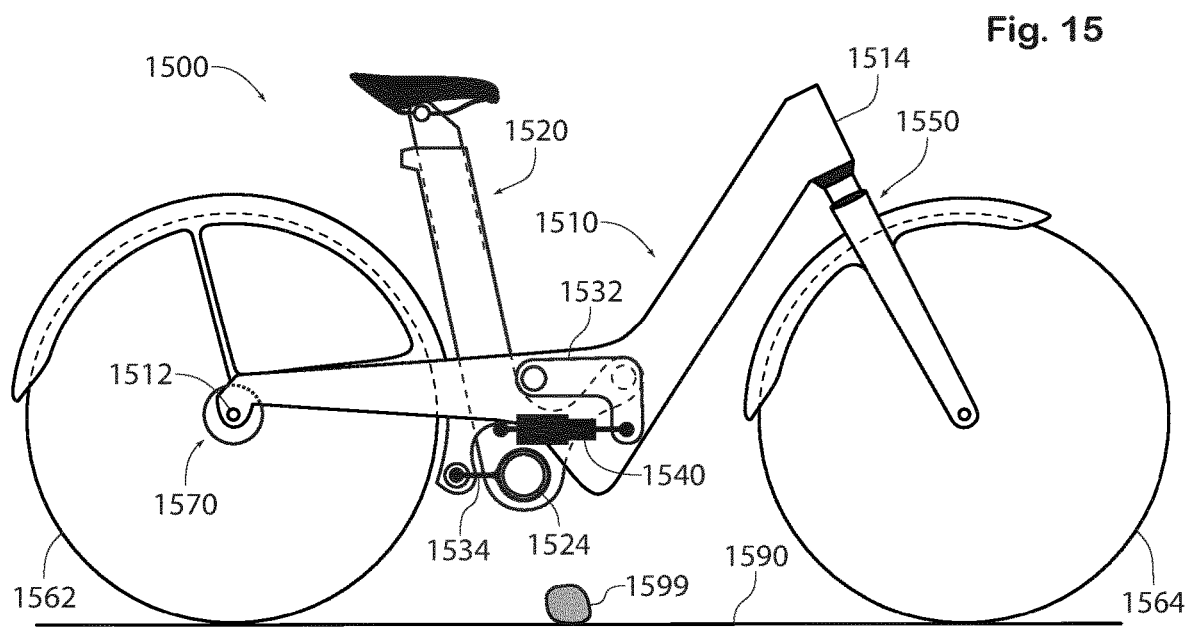
FIG. 15 a schematic depiction of a tenth exemplary embodiment of a vehicle of the first category in accordance with the present disclosure.

FIG. 15 schematically depicts a tenth exemplary embodiment of a vehicle 1500 of the first category in accordance with the present disclosure, e.g. as described above.

In the illustrated embodiment, vehicle 1500 comprises a frame 1510 as depicted in FIG. 1, a payload support structure 1520, a motion control system and an energy management system 1540 as depicted in FIG. 2B, a front fork 1550, a rear wheel 1562, a front wheel 1564 and a motor 1570. Frame 1510 comprises a head tube 1514 and a driven axle support 1512 that supports an axle of rear wheel 1562. Payload support structure 1520 is essentially identical to payload support structure 1520 depicted in FIG. 2A, albeit comprising a saddle 1528 in the embodiment of FIG. 15. The motion control system comprises a first rigid link 1532 and a second rigid link 1534. First rigid link 1532 is L-shaped and is pivotally connected to payload support structure 1520 via a pivot situated at the bend in L-shaped rigid link 1532. First rigid link 1532 is moreover pivotally connected to a first end of energy management system 1540 via a pivot situated at a first end of first rigid link 1532 and is pivotally connected to frame 1510 via a pivot situated at a second end of first rigid link 1532. A second end of energy management system 1540 is pivotally connected to first rigid link 1532. A first end of second rigid link 1534 is mounted to payload support structure 1520 so as to pivot around a driving axle support 1524. A second end of second rigid link 1534 is pivotally connected to frame 1510. Power for propelling the vehicle is provided to rear wheel 1562 by motor 1570 provided within a hub of rear wheel 1562. Since vehicle 1500 does not comprise a driving axle that necessitates provision of driving axle support 1524 on payload support structure 1520, driving axle support 1524 may be replaced by another form of pivot for the first end of second rigid link 1534. Nonetheless, it can be of utility for payload support structure 1520 to comprise driving axle support 1524 as schematically illustrated, e.g. for the sake of retrofitability.

In the operating state illustrated in FIG. 15, vehicle 1500 is traveling on level terrain 1590, approaching an obstacle 1599. Like vehicle 300 shown in FIGS. 3A and 3B, vehicle 1500 can adopt other operating states to permit rear wheel 1562 of vehicle 1500 to pass over obstacle 1599.

In the present disclosure, the verb "may" is used to designate optionality/noncompulsoriness. In other words, something that "may" can, but need not. In the present disclosure, the verb "comprise" may be understood in the sense of including. Accordingly, the verb "comprise" does not exclude the presence of other elements/actions. In the present disclosure, relational terms such as "first," "second," "top," "bottom" and the like may be used solely to distinguish one entity or action from another entity or action without necessarily requiring or implying any actual such relationship or order between such entities or actions.

In the present disclosure, the term "any" may be understood as designating any number of the respective elements, e.g. as designating one, at least one, at least two, each or all of the respective elements. Similarly, the term "any" may be understood as designating any collection(s) of the respective elements, e.g. as designating one or more collections of the respective elements, wherein a (respective) collection may comprise one, at least one, at least two, each or all of the respective elements. The respective collections need not comprise the same number of elements.

In the present disclosure, the expression "at least one" is used to designate any (integer) number or range of (integer) numbers (that is technically reasonable in the given context). As such, the expression "at least one" may, inter alia, be understood as one, two, three, four, five, ten, fifteen, twenty or one hundred. Similarly, the expression "at least one" may, inter alia, be understood as "one or more," "two or more" or "five or more."

In the present disclosure, expressions in parentheses may be understood as being optional. As used in the present disclosure, quotation marks may emphasize that the expression in quotation marks may also be understood in a figurative sense. As used in the present disclosure, quotation marks may identify a particular expression under discussion.

In the present disclosure, many features are described as being optional, e.g. through the use of the verb "may" or the use of parentheses. For the sake of brevity and legibility, the present disclosure does not explicitly recite each and every combination and/or permutation that may be obtained by choosing from the set of optional features. However, the present disclosure is to be interpreted as explicitly disclosing all such combinations/permutations. For example, a system described as having three optional features may be embodied in seven different ways, namely with just one of the three possible features, with any two of the three possible features or with all three of the three possible features.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of the invention, even those disclosed solely in combination with other features of the invention, may be combined in any configuration excepting those readily apparent to the person skilled in the art as nonsensical. Likewise, use of the singular and plural is solely for the sake of illustration and is not to be interpreted as limiting. Except where the contrary is explicitly noted, the plural may be replaced by the singular and vice-versa.

The above disclosure may be summarized as comprising the following embodiments.

Embodiment 1

A vehicle, comprising:
a frame that defines an upward direction; and
a structure movably connected to said frame such that said structure moves non-linearly relative to said frame, said structure comprising a seat support and an axle support, wherein
said structure is movably connected to said frame such that, in at least one operating state of said vehicle, a drivetrain force yields a force on said structure in said upward direction.

Embodiment 2

The vehicle of embodiment 1, wherein:
a frame comprises a head tube and a rear driven axle support;

Embodiment 3

The vehicle of embodiment 2, wherein:
said frame rigidly connects said head tube and said rear driven axle support;

Embodiment 4

A vehicle, comprising:
a frame comprising a head tube and a rear driven axle support;
a motion control system comprising a link; and
a payload support movably connected to said frame via said motion control system, wherein
said link, in a first operating state of said vehicle, transmits a driving force imparted into said link from said frame to said payload support, and
a deflecting force imparted into said link, in said first operating state, from said frame as a result of said vehicle encountering an obstacle acts on said link in a direction orthogonal to said driving force.

Embodiment 5

The vehicle of embodiment 4, comprising:
an energy management system, wherein
in said first operating state, a driven acceleration of said frame imparts no forces on said energy management system.

Embodiment 6

The vehicle of embodiment 4, comprising:
an energy management system, wherein
in said first operating state, transmission of all driving forces to said payload support resulting from a driven acceleration of said frame imparts no forces on said energy management system.

Embodiment 7

The vehicle of embodiment 5 or 6, wherein:
said energy management system, in response to movement of said payload support relative to said frame resulting from a transition from said first operating state to a second operating state, stores potential energy.

Embodiment 8

A vehicle, comprising:
a frame comprising a head tube and a rear driven axle support;
a motion control system comprising a link;
an energy management system; and
a payload support movably connected to said frame via said motion control system, wherein
said link, in a first operating state of said vehicle, instantaneously transmits energy imparted into said link from said frame, as a result of a driven acceleration of said frame, to said payload support, and
said energy management system, in a second operating state of said vehicle, acts to restore said vehicle to said first operating state.

Embodiment 9

The vehicle of embodiment 8, wherein:
in said first operating state, a driven acceleration of said frame imparts no forces on said energy management system.

Embodiment 10

The vehicle of embodiment 8, wherein:
in said first operating state, transmission of all driving forces to said payload support resulting from a driven acceleration of said frame imparts no forces on said energy management system.

Embodiment 11

The vehicle of embodiment 9 or 10, wherein:
said energy management system, in response to movement of said payload support relative to said frame resulting from a transition from said first operating state to said second operating state, stores potential energy.

Embodiment 12

The vehicle of any one of embodiments 4-11, comprising:
a bushing that movably connects said payload support to said frame, wherein
said bushing is selected from the group consisting of a slide bushing and an elastomeric bushing.

Embodiment 13

The vehicle of any one of embodiments 4-12, comprising:
a component that movably connects said payload support to said frame, wherein
said component is selected from the group consisting of a pivotable link and leaf spring.

Embodiment 14

The vehicle of any one of embodiments 4-13, wherein:
said frame rigidly connects said rear driven axle support to said head tube.

Embodiment 15

The vehicle of any one of embodiments 4-14, wherein:
said payload support comprises at least one element selected from the group consisting of a pannier, a rack, a basket, a cargo carrier, and a pannier support, wherein
at least 80% of a weight of said at least one element is supported via said payload support.

Embodiment 16

The vehicle of any one of embodiments 4-15, wherein:
said payload support comprises a seat support and a driving axle support.

Embodiment 17

The vehicle of embodiment 16, wherein:
said payload support rigidly interconnects said seat support and said driving axle support.

Embodiment 18

The vehicle of embodiment 13, wherein:
said payload support forms a seat tube of said vehicle.

Embodiment 19

The vehicle of embodiment 16 or 17, wherein:
said frame comprises a seat tube and defines a front triangle that supports said head tube and at least one rear triangle that supports said rear driven axle support, and
at least a portion of said payload support is situated in said seat tube.

Embodiment 20

The vehicle of embodiment 19, wherein:
said payload support extends through said seat tube.

Embodiment 21

The vehicle of any one of embodiments 16-20, wherein:
said frame defines an upward direction, and
said payload support is movably connected to said frame such that, in at least one operating state of said vehicle, a drivetrain force imparts a second force onto
said payload support that acts on each of said seat support and said driving axle support, said second force comprising a component in said upward direction.

Embodiment 22

The vehicle of any one of embodiments 16-21, wherein:
said first force acts on said seat support and said driving axle support via said payload support.

Embodiment 23

The vehicle of any one of embodiments 16-22, comprising:
a drivetrain; and
a clutch that restricts a motion of said payload support relative to said frame as a function of a force transmitted by said drivetrain.

Embodiment 24

The vehicle of any one of embodiments 16-23, comprising:
a motor, wherein
at least 80% of a weight of said motor is supported via said payload support.

Embodiment 25

The vehicle of any one of embodiments 16-24, comprising:
a power supply, wherein
at least 80% of a weight of said power supply is supported via said payload support.

Embodiment 26

The vehicle of any one of embodiments 16-25, wherein:
said frame comprises a first frame portion that comprises said rear driven axle support and a second frame portion that comprises said head tube, said first frame portion extending substantially horizontally to an intersection with said second frame portion forward of said driving axle support, said intersection constituting a sole connection of said first frame portion and said second frame portion.

Embodiment 27

The vehicle of embodiment 26, wherein:
all forces transmitted by said vehicle from said rear driven axle support to said head tube are transmitted via said intersection.

Embodiment 28

A vehicle, comprising:
a frame comprising a head tube and a rear driven axle support;
a motion control system; and
a payload support movably connected to said frame via said motion control system such that said payload support moves non-linearly relative to said frame, wherein
said payload support comprises a seat support, and
in a first operating state of said vehicle, said motion control system, in response to a driven acceleration of said frame in a forward direction, imparts a force onto said payload support that accelerates said seat support in said forward direction at an acceleration no less than an acceleration of said rear driven axle support in said forward direction.

Embodiment 29

A vehicle, comprising:
a front axle;
a rear axle;
a frame comprising a head tube and a rear axle support that supports said rear axle, said frame defining a first imaginary straight line; and a seat support movably connected to said frame, said seat support defining a second imaginary straight line, wherein
said seat support is movably connected to said frame such that a first angle between said first imaginary straight line and said second imaginary straight line in a first operating state of said vehicle differs from a second angle between said first imaginary straight line and said second imaginary straight line in a second operating state of said vehicle by at least 1°, and
said seat support is movably connected to said frame such that a third angle between said first imaginary straight line and said second imaginary straight line in any third operating state of said vehicle differs from a fourth angle between said first imaginary straight line and said second imaginary straight line in any fourth operating state of said vehicle by no more than 10°.

Embodiment 30

The vehicle of embodiment 29, comprising:
said first imaginary straight line is an imaginary straight line between said rear axle support and a region of said head tube most distal from said rear axle support.

Embodiment 31

The vehicle of embodiment 29, comprising:
a driving axle, wherein
said second imaginary straight line is an imaginary straight line between said driving axle and a region of said seat support most distal from said driving axle.

Embodiment 32

A vehicle, comprising:
a frame comprising a head tube and a rear driven axle support; and
a structure comprising a seat support and a driving axle support, said structure being movably connected to said frame by a suspension mechanism, said suspension mechanism comprising a spring and two links, wherein
in a forward driven operating condition of said vehicle, said links provide a first force that, in addition to a second force provided by said spring, assist to return said vehicle to a level-surface operating state from an obstacle-avoidance state.

Embodiment 33

A vehicle, comprising:
a frame comprising a head tube and a rear driven axle support; and
a structure comprising a seat support and a driving axle support, said structure being movably connected to said frame by a suspension mechanism, wherein
said suspension mechanism is connected to said frame solely in a lower half of said frame.

Embodiment 34

A vehicle, comprising:
a frame comprising a head tube and a rear driven axle support;
a payload support structure comprising a seat support and an axle support; and
a motion control system; wherein
said motion control system, in response to a determination that said vehicle is nearing a stopped condition, lowers said payload support structure.

Embodiment 35

The vehicle of embodiment 34, wherein:
said motion control system, in response to a determination that said vehicle is accelerating from said stopped condition, raises said payload support structure.

Embodiment 36

The vehicle of embodiment 34 or 35, wherein:
said motion control system comprises a shock absorber, and
said motion control system alters a position of said payload support structure relative to said frame by altering an amount of fluid in a chamber of said shock absorber.

Embodiment 37

A vehicle modification method, comprising:
disassembling, from a frame of a vehicle, a first structure comprising a first seat support and a first axle support; and
assembling, onto said frame, a second structure comprising at least one component not comprised by said first structure, said at least one component being selected from the group consisting of a second seat support, a second axle support, a battery, a motor, a motor controller, and a suspension assembly.

Embodiment 38

The vehicle modification method of embodiment 37, wherein:
said assembling comprises securing said second structure to said frame using no more than two pins, said securing being sufficient to modify said vehicle from a first state to a safely operable state, said second structure being detached from said frame in said first state.

Embodiment 39

The vehicle modification method of embodiment 37 or 38, wherein:
said first structure is devoid of a motor and said second structure comprises a motor.

Embodiment 40

The vehicle modification method of any one of embodiments 37-39, wherein:
said second structure comprises a battery and a motor controller.

Embodiment 41

A vehicle, comprising:
a frame comprising a front frame portion and a rear frame portion, said front frame portion comprising a seat support and an axle support; and
a motion control system that movably interconnects said front frame portion and said rear frame portion; wherein
said motion control system, in response to a determination that said vehicle is nearing a stopped condition, conjunctively lowers said seat support and said axle support.

Embodiment 42

The vehicle of embodiment 41, wherein:
said motion control system, in response to a determination that said vehicle is accelerating from said stopped condition, conjunctively raises said seat support and said axle support.

Embodiment 43

The vehicle of embodiment 41 or 42, wherein:
said motion control system comprises a shock absorber, and
said motion control system alters a position of said front frame portion relative to said rear frame portion by altering an amount of fluid in a chamber of said shock absorber.

Embodiment 44

A vehicle controller, comprising:
an electronic data processing system that generates a motor drive signal using first data indicative of a first power input into a first vehicle drivetrain by a first user and second data indicative of a second power input into a second vehicle drivetrain by a second user.

Embodiment 45

The vehicle controller of embodiment 44, wherein:
said electronic data processing system uses third data indicative of a location of said first user relative to a location of said second user to generate said motor drive signal.

Embodiment 46

A motorized bicycle, comprising:
an electronic data processing system that generates a motor drive signal using data indicative of a location of said bicycle relative to a location of another bicycle.

Embodiment 47

A vehicle, comprising:
a frame comprising a head tube and a rear driven axle support; and
an assembly movably connected to said frame such that said assembly moves non-linearly relative to said frame, said assembly comprising a seat support, a power supply, a drive system and an axle support, wherein
a total mass of said assembly is at least two times a total mass of said frame.

Embodiment 48

A vehicle, comprising:
a drivetrain tensioning device;
a frame comprising first frame portion and a second frame portion, said frame comprising an axle support; and
a motion control system comprising a link, wherein
said second frame portion is movably connected to said first frame portion via said motion control system, and
said drivetrain tensioning device is connected to said frame via said link.

Embodiment 49

The vehicle of embodiment 48, wherein:
said link pivots around an axis of rotation defined by said axle support

Embodiment 50

The vehicle of embodiment 48 or 49, wherein:
said first frame portion comprises a head tube and a rear driven axle support, and
said second frame portion comprises a seat support and said axle support.

Embodiment 51

The vehicle of embodiment 48 or 49, wherein:
said first frame portion comprises a rear driven axle support, and
said second frame portion comprises a head tube, a seat support and said axle support.

Embodiment 52

The vehicle of any one of embodiments 48-51, comprising:
a chain guard connected to said frame via said link.

Embodiment 53

A vehicle, comprising:
a frame comprising first frame portion and a second frame portion; and
a motion control system comprising a first link, wherein
said second frame portion is movably connected to said first frame portion via said motion control system,
said first link is pivotally connected to said first frame portion,
said first link is pivotally connected to said second frame portion, and
said first link pivots in a first plane that is parallel to a major plane of symmetry of said first frame portion,
said first plane is offset from said major plane by at least 2 cm,
said vehicle is devoid of a second link that pivots in parallel to said first link.

Embodiment 54

The vehicle of embodiment 53, wherein:
said frame comprises an axle support, and
said first link pivots around an axis of rotation defined by said axle support.

Embodiment 55

The vehicle of embodiment 53 or 54, wherein:
said first frame portion comprises a head tube and a rear driven axle support, and
said second frame portion comprises a seat support and said axle support.

Embodiment 56

The vehicle of embodiment 53 or 54, wherein:
said first frame portion comprises a rear driven axle support, and
said second frame portion comprises a head tube, a seat support and said axle support.

Embodiment 57

A vehicle, comprising:
a frame comprising first frame portion and a second frame portion; and
a motion control system comprising a link, wherein
said first frame portion comprises a first axle support,
said second frame portion comprises a second axle support,
said second frame portion is movably connected to said first frame portion via said motion control system,
said link is pivotally connected to said first frame portion,
said link is pivotally connected to said second frame portion,
said motion control system limits a range of motion of said first frame portion relative to said second frame portion such that a difference between a minimum distance from said first axle support to said second axle support in said range of motion and a maximum distance from said first axle support to said second axle support in said range of motion is less than 4 cm.

Embodiment 58

The vehicle of embodiment 57, wherein:
said difference is less than a distance selected from the group consisting of 3.5 cm, 3 cm and 2.5 cm.

I claim:

1. A vehicle, comprising:
a frame comprising a head tube and a rear driven axle support;
a motion control system comprising a link pivotally connecting the frame and a payload support; and
the payload support movably connected to said frame via said motion control system such that said payload support moves non-linearly relative to said frame, wherein
said payload support comprises a seat support, and
in a operating state of said vehicle, said motion control system, in response to a driven acceleration of said frame in a forward direction, imparts a force onto said payload support that accelerates said seat support in said forward direction at an acceleration no less than an acceleration of said rear driven axle support in said forward direction.

2. The vehicle of claim 1, wherein
said payload support is movably connected to said frame such that a first angle between a first imaginary straight line and a second imaginary straight line in a first operating state of said vehicle differs from a second angle between said first imaginary straight line and said second imaginary straight line in a second operating state of said vehicle by at least 1°, and
said payload support is movably connected to said frame such that a third angle between said first imaginary straight line and said second imaginary straight line in any third operating state of said vehicle differs from a fourth angle between said first imaginary straight line and said second imaginary straight line in any fourth operating state of said vehicle by no more than 10°.

3. The vehicle of claim 1 wherein
said payload support comprises a driving axle support, and
said motion control system, in response to a determination that said vehicle is nearing a stopped condition, conjunctively lowers said seat support and said driving axle support.

4. The vehicle of claim 3 wherein
said motion control system comprises a shock absorber, and
said motion control system alters a position of said frame relative to said payload support by altering an amount of fluid in a chamber of said shock absorber.

5. The vehicle of claim 1 where the link is rigid.

6. The vehicle of claim 1 where the link is flexing.

7. The vehicle of claim 1 where the link is L-shaped.

8. The vehicle of claim 7 where the link connects to the payload support with a first pivot.

9. The vehicle of claim 8 where the first pivot is at a bend in the link.

10. The vehicle of claim 9 where the link connects to the frame with a second pivot.

11. The vehicle of claim 10 where the second pivot is at a first end of the link.

12. The vehicle of claim 11 where a second end of the link connects to a shock absorber.

* * * * *